(12) United States Patent
Hawkinson et al.

(10) Patent No.: US 8,850,719 B2
(45) Date of Patent: Oct. 7, 2014

(54) LAYERED THERMOPLASTIC NON-WOVEN TEXTILE ELEMENTS

(75) Inventors: Karen A. Hawkinson, Portland, OR (US); Bhupesh Dua, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 669 days.

(21) Appl. No.: 13/045,168

(22) Filed: Mar. 10, 2011

(65) Prior Publication Data

US 2012/0227282 A1 Sep. 13, 2012

Related U.S. Application Data

(63) Continuation-in-part of application No. 12/367,274, filed on Feb. 6, 2009.

(51) Int. Cl.
 *A43B 23/00* (2006.01)

(52) U.S. Cl.
 USPC .............................................. 36/45

(58) Field of Classification Search
 USPC ....................................... 36/45, 84
 See application file for complete search history.

(56) References Cited

U.S. PATENT DOCUMENTS

| | | | |
|---|---|---|---|
| 3,375,156 A | 3/1968 | Edgar, Jr. | |
| 3,617,417 A | 11/1971 | Olson | |
| 3,635,625 A | 1/1972 | Voss | |
| 3,790,439 A | 2/1974 | La Perre et al. | |
| 4,041,203 A | 8/1977 | Brock et al. | |
| 4,059,114 A | 11/1977 | Richards | |
| 4,070,217 A | 1/1978 | Smith, II et al. | |
| 4,100,319 A | 7/1978 | Schwartz | |
| 4,107,364 A | 8/1978 | Sisson | |
| 4,265,954 A | 5/1981 | Romanek | |
| 4,310,373 A | 1/1982 | Schuhmacher et al. | |
| 4,355,489 A | 10/1982 | Heyer et al. | |
| 4,486,200 A | 12/1984 | Heyer et al. | |
| 4,588,630 A | 5/1986 | Shimalla | |
| 4,621,013 A | 11/1986 | Holtrop et al. | |
| 4,647,492 A | 3/1987 | Grant et al. | |
| 4,781,296 A | 11/1988 | Morris et al. | |
| 4,980,927 A | 1/1991 | Wawiluk et al. | |

(Continued)

FOREIGN PATENT DOCUMENTS

| | | |
|---|---|---|
| CN | 2354400 | 12/1999 |
| CN | 1451330 | 10/2003 |

(Continued)

OTHER PUBLICATIONS

International Search Report and Written Opinion in PCT Application No. PCT/US2012/027974, mailed on Jul. 4, 2012.

(Continued)

*Primary Examiner* — Marie Bays
(74) *Attorney, Agent, or Firm* — Plumsea Law Group, LLC

(57) ABSTRACT

A layered non-woven textile may be incorporated into various products, including apparel. The layered non-woven textile may be formed from a first layer and a second layer. The first layer is formed from a plurality of first filaments that include a first thermoplastic polymer material with a first melting temperature. The second layer is located adjacent to the first layer and secured to the first layer. The second layer is formed from plurality of second filaments that include a second thermoplastic polymer material with a second melting temperature. The first melting temperature is lower than the second melting temperature.

24 Claims, 38 Drawing Sheets

(56) References Cited

U.S. PATENT DOCUMENTS

| | | | |
|---|---|---|---|
| 5,102,724 A | 4/1992 | Okawahara et al. | |
| 5,118,550 A | 6/1992 | Baravian et al. | |
| 5,132,160 A | 7/1992 | Bird | |
| 5,150,787 A | 9/1992 | Bird et al. | |
| 5,230,701 A | 7/1993 | Meyer et al. | |
| 5,238,733 A | 8/1993 | Joseph et al. | |
| 5,255,833 A | 10/1993 | McAllister | |
| 5,282,900 A | 2/1994 | McDonell et al. | |
| 5,316,838 A | 5/1994 | Crandall et al. | |
| 5,328,758 A | 7/1994 | Markell et al. | |
| 5,380,580 A | 1/1995 | Rogers et al. | |
| 5,415,779 A | 5/1995 | Markell et al. | |
| 5,423,783 A | 6/1995 | Battles et al. | |
| 5,458,962 A | 10/1995 | Birch | |
| 5,470,605 A | 11/1995 | Lundeen | |
| 5,478,628 A | 12/1995 | Billingsley et al. | |
| 5,482,756 A | 1/1996 | Berger et al. | |
| 5,496,507 A | 3/1996 | Angadjivand et al. | |
| 5,501,794 A | 3/1996 | Van de Graaf et al. | |
| 5,507,968 A | 4/1996 | Palaikis | |
| 5,539,042 A | 7/1996 | Birch | |
| 5,573,619 A | 11/1996 | Benedict et al. | |
| 5,586,563 A | 12/1996 | Newman | |
| 5,595,649 A | 1/1997 | Markell et al. | |
| 5,603,747 A | 2/1997 | Matuda et al. | |
| 5,604,271 A | 2/1997 | Lundeen | |
| 5,609,706 A | 3/1997 | Benedict et al. | |
| 5,624,726 A | 4/1997 | Sanocki et al. | |
| 5,629,079 A | 5/1997 | Battles et al. | |
| 5,639,287 A | 6/1997 | Van de Graaf et al. | |
| 5,641,563 A | 6/1997 | Truong et al. | |
| 5,655,833 A | 8/1997 | Raczynsky | |
| 5,682,618 A | 11/1997 | Johnson et al. | |
| 5,695,853 A | 12/1997 | Billingsley et al. | |
| 5,714,229 A * | 2/1998 | Ogden | 428/138 |
| 5,743,273 A | 4/1998 | Newman | |
| 5,744,207 A | 4/1998 | Bartusiak et al. | |
| 5,759,659 A | 6/1998 | Sanocki et al. | |
| 5,803,086 A | 9/1998 | Scholz et al. | |
| 5,858,140 A | 1/1999 | Berger et al. | |
| 5,858,515 A | 1/1999 | Stokes et al. | |
| 5,879,493 A | 3/1999 | Johnson et al. | |
| 5,883,019 A | 3/1999 | Truong et al. | |
| 5,928,070 A | 7/1999 | Lux | |
| 5,939,339 A | 8/1999 | Delmore et al. | |
| RE36,323 E | 10/1999 | Thompson et al. | |
| 5,981,033 A | 11/1999 | Haunschild et al. | |
| 6,004,642 A | 12/1999 | Langford | |
| 6,013,587 A | 1/2000 | Truong et al. | |
| 6,017,831 A | 1/2000 | Beardsley et al. | |
| 6,069,097 A | 5/2000 | Suzuki et al. | |
| 6,086,911 A | 7/2000 | Godbey | |
| 6,110,572 A | 8/2000 | Groh et al. | |
| 6,119,691 A | 9/2000 | Angadjivand et al. | |
| 6,123,752 A | 9/2000 | Wu et al. | |
| 6,174,964 B1 | 1/2001 | Jariwala et al. | |
| 6,251,154 B1 | 6/2001 | van Rossen | |
| 6,284,843 B1 | 9/2001 | Jariwala et al. | |
| 6,288,157 B1 | 9/2001 | Jariwala et al. | |
| 6,315,130 B1 | 11/2001 | Olsen | |
| 6,332,465 B1 | 12/2001 | Xue et al. | |
| 6,391,200 B2 | 5/2002 | Pulek et al. | |
| 6,391,807 B1 | 5/2002 | Jariwala et al. | |
| 6,395,211 B1 | 5/2002 | Dettmer et al. | |
| 6,406,576 B1 | 6/2002 | Benedict et al. | |
| 6,406,577 B1 | 6/2002 | Benedict et al. | |
| 6,429,159 B1 | 8/2002 | Watanabe et al. | |
| 6,492,183 B1 | 12/2002 | Perman et al. | |
| 6,503,855 B1 | 1/2003 | Menzies et al. | |
| 6,537,935 B1 | 3/2003 | Seth et al. | |
| 6,558,784 B1 | 5/2003 | Norton et al. | |
| 6,610,390 B1 | 8/2003 | Kauschke et al. | |
| 6,645,611 B2 | 11/2003 | Seth | |
| 6,715,188 B1 | 4/2004 | Jackson et al. | |
| 6,719,744 B2 | 4/2004 | Kinnear et al. | |
| 6,773,718 B2 | 8/2004 | Seth et al. | |
| 6,783,574 B1 | 8/2004 | Angadjivand et al. | |
| 6,784,125 B1 | 8/2004 | Yamakawa et al. | |
| 6,784,127 B1 | 8/2004 | Yamakawa et al. | |
| 6,835,256 B2 | 12/2004 | Menzies et al. | |
| 6,875,710 B2 | 4/2005 | Eaton et al. | |
| 6,880,211 B2 | 4/2005 | Jackson et al. | |
| 6,942,683 B2 | 9/2005 | Dunshee | |
| 6,942,894 B2 | 9/2005 | Alberg et al. | |
| 7,066,182 B1 | 6/2006 | Dunshee | |
| 7,150,774 B2 | 12/2006 | Kubokawa et al. | |
| 7,169,202 B2 | 1/2007 | Kubokawa | |
| 7,195,729 B2 | 3/2007 | Jackson et al. | |
| 7,230,043 B2 | 6/2007 | Klun et al. | |
| 7,238,314 B2 | 7/2007 | Jackson et al. | |
| 7,267,681 B2 | 9/2007 | Dunshee | |
| 7,303,805 B2 | 12/2007 | Seth et al. | |
| 7,311,880 B2 | 12/2007 | Perman et al. | |
| 7,320,719 B2 | 1/2008 | van de Graaf et al. | |
| 7,390,451 B2 | 6/2008 | Jackson et al. | |
| 7,393,371 B2 | 7/2008 | O'Gary et al. | |
| 7,709,075 B2 * | 5/2010 | Suzuki | 428/95 |
| 2001/0008683 A1 | 7/2001 | Takai et al. | |
| 2002/0137418 A1 | 9/2002 | Seth | |
| 2002/0150610 A1 | 10/2002 | Kono et al. | |
| 2003/0091617 A1 | 5/2003 | Mrozinski et al. | |
| 2003/0119411 A1 | 6/2003 | Yamakawa et al. | |
| 2003/0171051 A1 | 9/2003 | Bergsten et al. | |
| 2004/0060858 A1 | 4/2004 | Lucas et al. | |
| 2004/0118018 A1 | 6/2004 | Dua | |
| 2004/0224596 A1 | 11/2004 | Mathis et al. | |
| 2004/0241399 A1 | 12/2004 | Marmon et al. | |
| 2005/0084647 A1 | 4/2005 | Menzies et al. | |
| 2005/0106326 A1 | 5/2005 | Audenaert et al. | |
| 2005/0217226 A1 | 10/2005 | Sundet et al. | |
| 2006/0036230 A1 | 2/2006 | Mills et al. | |
| 2006/0121812 A1 | 6/2006 | Suzuki et al. | |
| 2006/0141881 A1 | 6/2006 | Bergsten et al. | |
| 2006/0143947 A1 * | 7/2006 | Ellis et al. | 36/30 R |
| 2006/0169387 A1 | 8/2006 | Nayar et al. | |
| 2006/0204558 A1 | 9/2006 | Kantner et al. | |
| 2006/0223403 A1 | 10/2006 | Mahboob | |
| 2006/0246260 A1 | 11/2006 | Sundet et al. | |
| 2006/0276095 A1 | 12/2006 | Dua et al. | |
| 2007/0049646 A1 | 3/2007 | Moore et al. | |
| 2007/0129524 A1 | 6/2007 | Sunkara | |
| 2007/0176325 A1 | 8/2007 | Jackson et al. | |
| 2007/0186482 A1 | 8/2007 | Sudo | |
| 2007/0199210 A1 * | 8/2007 | Vattes et al. | 36/45 |
| 2007/0298671 A1 | 12/2007 | Noda et al. | |
| 2007/0298697 A1 | 12/2007 | Charmoille et al. | |
| 2008/0001431 A1 | 1/2008 | Thompson et al. | |
| 2008/0022642 A1 | 1/2008 | Fox et al. | |
| 2008/0022643 A1 | 1/2008 | Fox et al. | |
| 2008/0064279 A1 | 3/2008 | Browning et al. | |
| 2008/0070464 A1 | 3/2008 | Alberg et al. | |
| 2008/0139067 A1 | 6/2008 | Mukai et al. | |
| 2008/0148946 A1 | 6/2008 | Lotgerink-Bruinenberg | |
| 2008/0241476 A1 | 10/2008 | Olguin | |
| 2008/0245720 A1 | 10/2008 | Hutchinson et al. | |
| 2008/0245725 A1 | 10/2008 | Patel et al. | |
| 2008/0246182 A1 | 10/2008 | Patel et al. | |
| 2008/0276805 A1 | 11/2008 | Lotgerink-Bruinenberg | |
| 2009/0140470 A1 | 6/2009 | Dua et al. | |
| 2010/0037483 A1 * | 2/2010 | Meschter et al. | 36/47 |
| 2010/0175276 A1 * | 7/2010 | Dojan et al. | 36/47 |
| 2010/0186874 A1 | 7/2010 | Sussmann | |
| 2010/0199406 A1 * | 8/2010 | Dua et al. | 2/115 |
| 2010/0199520 A1 | 8/2010 | Dua et al. | 36/87 |
| 2010/0287790 A1 * | 11/2010 | Sokolowski et al. | 36/47 |
| 2010/0325916 A1 * | 12/2010 | Dua et al. | 36/47 |
| 2012/0291314 A1 * | 11/2012 | Sokolowski et al. | 36/87 |
| 2013/0067639 A1 * | 3/2013 | Dua et al. | 2/227 |
| 2013/0067768 A1 | 3/2013 | Dua et al. | |
| 2013/0068378 A1 | 3/2013 | Dua et al. | |
| 2013/0069266 A1 | 3/2013 | Dua et al. | |
| 2013/0232815 A1 * | 9/2013 | Meythaler et al. | 36/45 |

(56) References Cited

U.S. PATENT DOCUMENTS

FOREIGN PATENT DOCUMENTS

| | | |
|---|---|---|
| CN | 1571871 | 1/2005 |
| DE | 2109143 | 10/1972 |
| DE | 29911710 | 12/1999 |
| DE | 102007004146 | 7/2008 |
| DE | 102007035729 | 2/2009 |
| EP | 0264132 A1 | 4/1988 |
| EP | 0304301 | 2/1989 |
| EP | 0327402 | 8/1989 |
| EP | 0559969 | 9/1993 |
| EP | 1068889 | 1/2001 |
| EP | 1167606 | 1/2002 |
| EP | 1264561 A1 | 12/2002 |
| EP | 1340848 | 9/2003 |
| EP | 1342825 | 9/2003 |
| EP | 1418092 A1 | 5/2004 |
| EP | 1589140 | 10/2005 |
| EP | 1884582 A1 | 2/2008 |
| EP | 2407302 | 1/2012 |
| EP | 2488685 | 8/2012 |
| EP | 2393972 | 1/2013 |
| EP | 2397593 | 7/2013 |
| EP | 2397594 | 11/2013 |
| EP | 2453048 | 11/2013 |
| EP | 2683866 | 1/2014 |
| GB | 1353183 | 5/1974 |
| GB | 1384326 | 2/1975 |
| GB | 1491602 | 11/1977 |
| GB | 2115741 | 9/1983 |
| JP | 61-000655 | 1/1986 |
| JP | 61-111993 | 7/1986 |
| JP | 62203211 | 12/1987 |
| JP | 62203212 | 12/1987 |
| JP | 257993 | 4/1990 |
| JP | 3200885 | 9/1991 |
| JP | 3224421 | 10/1991 |
| JP | 04-108152 | 4/1992 |
| JP | H04108152 | 4/1992 |
| JP | 05-022792 | 1/1993 |
| JP | 5321119 | 12/1993 |
| JP | 07-197355 | 1/1995 |
| JP | 7157957 | 6/1995 |
| JP | 3016014 | 7/1995 |
| JP | 07-252762 | 10/1995 |
| JP | 8104164 | 4/1996 |
| JP | 8296161 | 11/1996 |
| JP | 8323903 | 12/1996 |
| JP | 09-013252 | 1/1997 |
| JP | 0965907 | 3/1997 |
| JP | 9058200 | 3/1997 |
| JP | 9188951 | 7/1997 |
| JP | 09-267456 | 10/1997 |
| JP | 10-245760 | 9/1998 |
| JP | 10-273868 | 10/1998 |
| JP | 10-292271 | 11/1998 |
| JP | H10292271 | 11/1998 |
| JP | 11-061616 | 3/1999 |
| JP | 11-090836 | 4/1999 |
| JP | 11-217799 | 8/1999 |
| JP | H11217799 | 8/1999 |
| JP | 11-320800 | 11/1999 |
| JP | 2000-248454 | 9/2000 |
| JP | 10-77566 | 7/2001 |
| JP | 1077556 | 7/2001 |
| JP | 2001179889 | 7/2001 |
| JP | 2001181905 | 7/2001 |
| JP | 2001523772 | 11/2001 |
| JP | 2002234547 | 8/2002 |
| JP | 2002317367 | 10/2002 |
| JP | 3093555 | 2/2003 |
| JP | 2003310331 | 11/2003 |
| JP | 2004150008 | 5/2004 |
| JP | 2004-192182 | 8/2004 |
| JP | 2004244791 | 9/2004 |
| JP | 2004306149 | 11/2004 |
| JP | 2005029907 | 2/2005 |
| JP | 2005187954 | 7/2005 |
| JP | 2005212055 | 8/2005 |
| JP | 2006-511306 | 4/2006 |
| JP | 2006511306 | 4/2006 |
| JP | 2006-192723 | 7/2006 |
| JP | 2006274453 | 10/2006 |
| JP | 2007-516046 | 6/2007 |
| JP | 2007522908 | 8/2007 |
| JP | 2007537372 | 12/2007 |
| JP | 2008007930 | 1/2008 |
| JP | 2008101285 A | 5/2008 |
| JP | 2008138908 | 6/2008 |
| JP | 2009538197 | 11/2009 |
| JP | 2010-534535 | 11/2010 |
| JP | 5226844 | 3/2013 |
| JP | 5411906 | 11/2013 |
| WO | WO0145927 | 6/2001 |
| WO | WO02054894 | 7/2002 |
| WO | W003007864 | 1/2003 |
| WO | WO03021024 | 3/2003 |
| WO | WO2004060093 | 7/2004 |
| WO | WO2005063071 | 7/2005 |
| WO | WO2005082188 | 9/2005 |
| WO | WO2005112677 | 12/2005 |
| WO | WO2007103244 | 9/2007 |
| WO | WO2007139567 | 12/2007 |
| WO | WO2007140054 | 12/2007 |
| WO | WO2008069280 | 6/2008 |
| WO | 2008077785 | 7/2008 |
| WO | WO2008077785 | 7/2008 |
| WO | WO2013181082 | 12/2013 |

OTHER PUBLICATIONS

Office Action mailed on Jan. 22, 2013 in Chinese Application No. 20108005095.6, filed Dec. 12, 2012.
International Search Report and Written Opinion mailed Dec. 6, 2010 in PCT Application No. PCT/US2010/022216.
International Search Report and Written Opinion mailed Mar. 18, 2011 in PCT Application No. PCT/US2010/051149.
International Preliminary Report and Written Opinion mailed Apr. 26, 2012 in PCT Application No. PCT/US2010/051149.
European Search Report mailed on Jan. 30, 2012 in European Patent Application No. 11174750.7.
Response to European Search Report filed Aug. 16, 2012 in European Patent Application No. 11174750.7.
European Search Report mailed on Jan. 30, 2012 in European Patent Application No. 11175063.4.
Response to European Search Report filed Aug. 13, 2012 in European Patent Application No. 11175063.4.
European Search Report and Written Opinion mailed on Mar. 6, 2012 in European Patent Application No. 11174751.5.
Response to European Search Report and Written Opinion filed Sep. 21, 2012 in European Patent Application No. 11174751.5.
Partial European Search Report mailed on Nov. 4, 2011 in European Patent Application No. 11174751.5.
European Search Report mailed on Apr. 17, 2012 in European Patent Application No. 11174753.1.
European Search Report mailed on Jun. 11, 2012 in European Patent Application No. 11174747.3.
Response to European Search Report mailed on Jan. 11, 2013 in European Patent Application No. 11174747.3.
European Search Report mailed on Nov. 25, 2011 in European Patent Application No. 11174747.3.
Response to European Search Report filed Dec. 23, 2011 in European Patent Application No. 11174747.3.
Partial European Search Report mailed on Nov. 4, 2011 in European Patent Application No. 11174750.7.
Office Action mailed on Jun. 14, 2012 in U.S. Appl. No. 12/579,838, filed Oct. 15, 2009.
Response to Office Action filed Sep. 14, 2012 in U.S. Appl. No. 12/579,838, filed Oct. 15, 2009.
Final Office Action mailed on Nov. 28, 2012 in U.S. Appl. No. 12/579,838, filed Oct. 15, 2009.

(56) References Cited

OTHER PUBLICATIONS

Response to Final Office Action filed Mar. 13, 2013 in U.S. Appl. No. 12/579,838, filed Oct. 15, 2009.
Office Action mailed Jan. 24, 2013 in European Patent Application No. 11174751.5 filed Jul. 20, 2011.
Office Action mailed Feb. 7, 2013 in Japanese Patent Application No. 2011-549186, filed Aug. 1, 2011.
Office Action mailed Feb. 14, 2013 in Japanese Patent Application No. 2011-225838, filed Oct. 13, 2011.
Office Action mailed Feb. 21, 2013 in Japanese Patent Application No. 2011-225846, filed Oct. 13, 2011.
Office Action mailed Feb. 7, 2013 in Japanese Patent Application No. 2011-225849, filed Oct. 13, 2011.
International Preliminary Report mailed Aug. 18, 2011 in PCT Application No. PCT/US2010/022216.
Advisory Action mailed Aug. 1, 2012 in U.S. Appl. No. 12/367,274, filed Feb. 6, 2009.
Notice of Allowance mailed Jul. 24, 2012 in European Patent Application No. 10734588.6 filed Jun. 27, 2011.
Notice of Allowance mailed Feb. 11, 2013 in European Patent Application No. 11174750.7 filed Jul. 20, 2011.
Notice of Allowance mailed Feb. 1, 2013 in European Patent Application No. 11174753.1 filed Jul. 20, 2011.
Notice of Allowance mailed Feb. 1, 2013 in European Patent Application No. 11175063.4 filed Jul. 22, 2011.
Notice of Allowance mailed Feb. 21, 2013 in European Patent Application No. 2011-225851 filed Oct. 13, 2011.
Voluntary Amendment filed Apr. 12, 2012 in Japanese Patent Application No. 20108005095.6 filed Jul. 21, 2011.
Voluntary Amendment filed Oct. 25, 2011 in Japanese Patent Application No. 2011-549186 filed Aug. 1, 2011.
Voluntary Amendment filed Jan. 10, 2013 in Chinese Patent Application No. 2010-80046286.7 filed Apr. 13, 2012.
Voluntary Amendment filed May 15, 2012 in Japanese Patent Application No. 2012-534219 filed Apr. 11, 2012.
Partial European Search Report mailed on Nov. 4, 2011 in connection with European Patent Application No. 11175063.4.
Response to Office Action filed Aug. 6, 2013 in connection with Chinese Patent Application No. 201080005095.6 filed Jul. 21, 2011 and the English translation thereof.
Office Action mailed Dec. 1, 2011 in connection with U.S. Appl. No. 12/367,274, filed Feb. 6, 2009.
Response to Office Action filed Mar. 1, 2012 in connection with U.S. Appl. No. 12/367,274, filed Feb. 6, 2009.
Final Office Action mailed on May 9, 2012 in connection with U.S. Appl. No. 12/367,274, filed Feb. 6, 2009.
Response to Final Office Action filed Jul. 25, 2012 in connection with U.S. Appl. No. 12/367,274, filed Feb. 6, 2009.
Response to Office Action filed Aug. 2, 2013 in connection with in connection with European Patent Application No. 11174751.5.
Response to Office Action filed Aug. 7, 2013 in connection with Japanese Patent Application No. 2011-549186, filed Aug. 1, 2011 and the English translation thereof.
Office Action mailed May 9, 2013 in connection with Japanese Patent Application No. 2011-225827, filed Oct. 13, 2011 and the English translation thereof.
Response to Office Action filed Aug. 29, 2013 in connection with Japanese Patent Application No. 2011-225827, filed Oct. 13, 2011 and the English translation thereof.
Notice of Allowance mailed Oct. 10, 2013 in connection with Japanese Patent Application No. 2011-225827, filed Oct. 13, 2011 and the English translation thereof.
Response to Office Action filed Jun. 10, 2013 in connection with Japanese Patent Application No. 2011-225838, filed Oct. 13, 2011 and the English translation thereof.
Response to Office Action filed Jul. 10, 2013 in connection with Japanese Patent Application No. 2011-225846, filed Oct. 13, 2011 and the English translation thereof.
Response to Office Action filed Aug. 6, 2013 in connection with Japanese Patent Application No. 2011-225849, filed Oct. 13, 2011 and the English translation thereof.
Notice of Allowance mailed May 22, 2013 in connection with European Patent Application No. 11174753.1, filed Jul. 20, 2011.
Notice of Allowance mailed Feb. 21, 2013 in connection with Japanese Patent Application No. 2011-225851, filed Oct. 13, 2011.
Voluntary Amendment filed Apr. 12, 2012 in connection with Chinese Patent Application No. 20108005095.6, filed Jul. 21, 2011.
Voluntary Amendment filed Oct. 25, 2011 in connection with Japanese Patent Application No. 2011-549186, filed Aug. 1, 2011.
Voluntary Amendment filed Jan. 10, 2013 filed connection with Chinese Patent Application No. 201080046286.7, filed Apr. 13, 2012.
International Search Report and Written Opinion Mailed on Jan. 14, 2011 in connection with PCT Application No. PCT/US2010/034779.
International Preliminary Report mailed Sep. 19, 2013 in connection with PCT Application No. PCT/US2012/027974.
Notice of Allowance mailed Nov. 11, 2013 in connection with Chinese Patent Application No. 201080005095.6 and the English translation thereof.
Office Action mailed Jun. 13, 2013 in connection with Japanese Patent Application No. 2011-534219, filed Apr. 11, 2012 and the English translation thereof.
Response to Office Action filed Sep. 10, 2013 in connection with Japanese Patent Application No. 2011-534219, filed Apr. 11, 2012 and the English translation thereof.
International Search Report and Written Opinion mailed Sep. 30, 2013 in connection with PCT Application No. PCT/US2013/042581.
Office Action mailed Nov. 11, 2013 for European Patent Application No. 10779359.8.
Chinese Office Action dated Jan. 10, 2014 and corresponding Search Report dated Nov. 26, 2013 in Chinese Application No. 201080046286.7.

\* cited by examiner

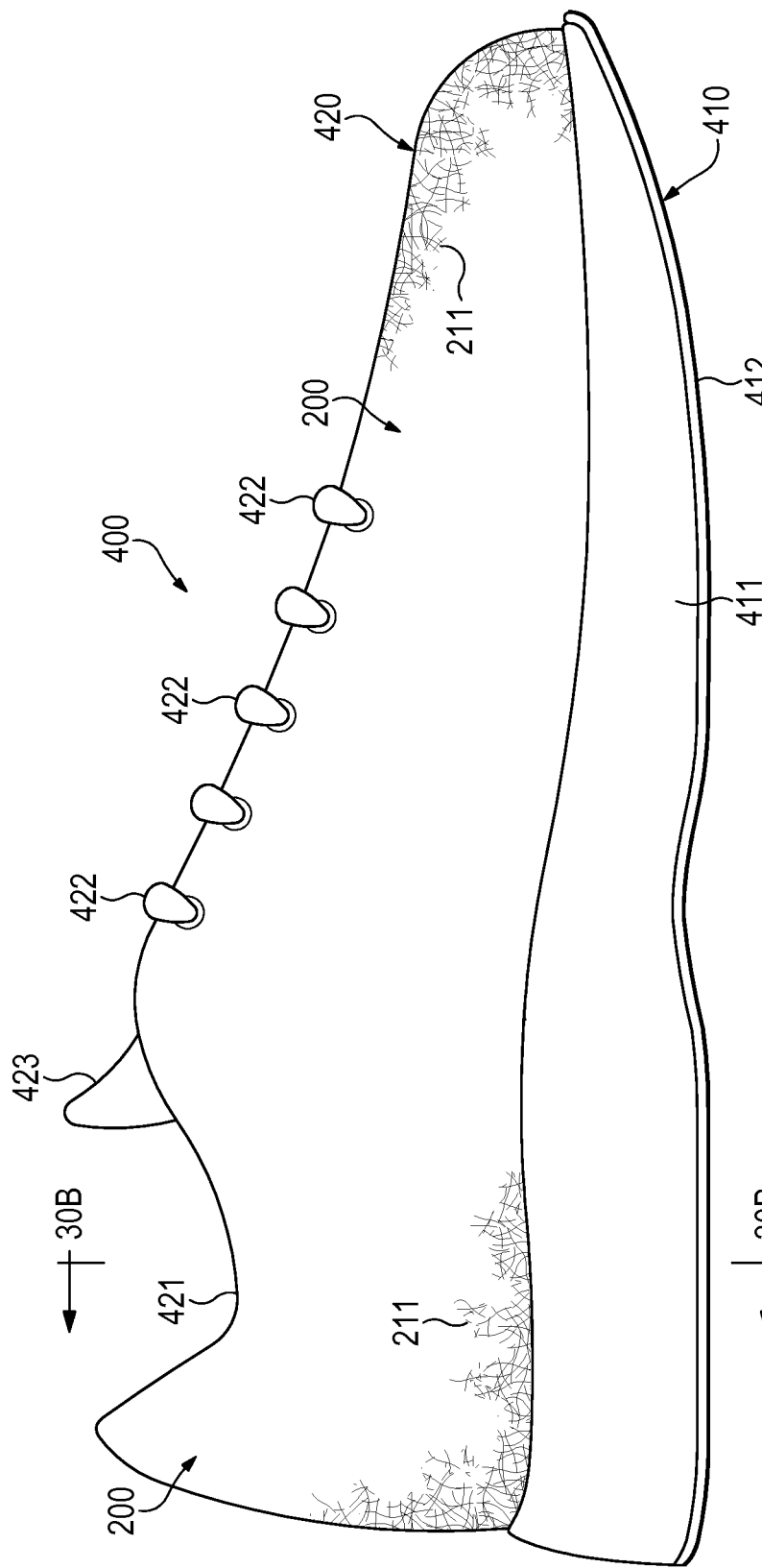

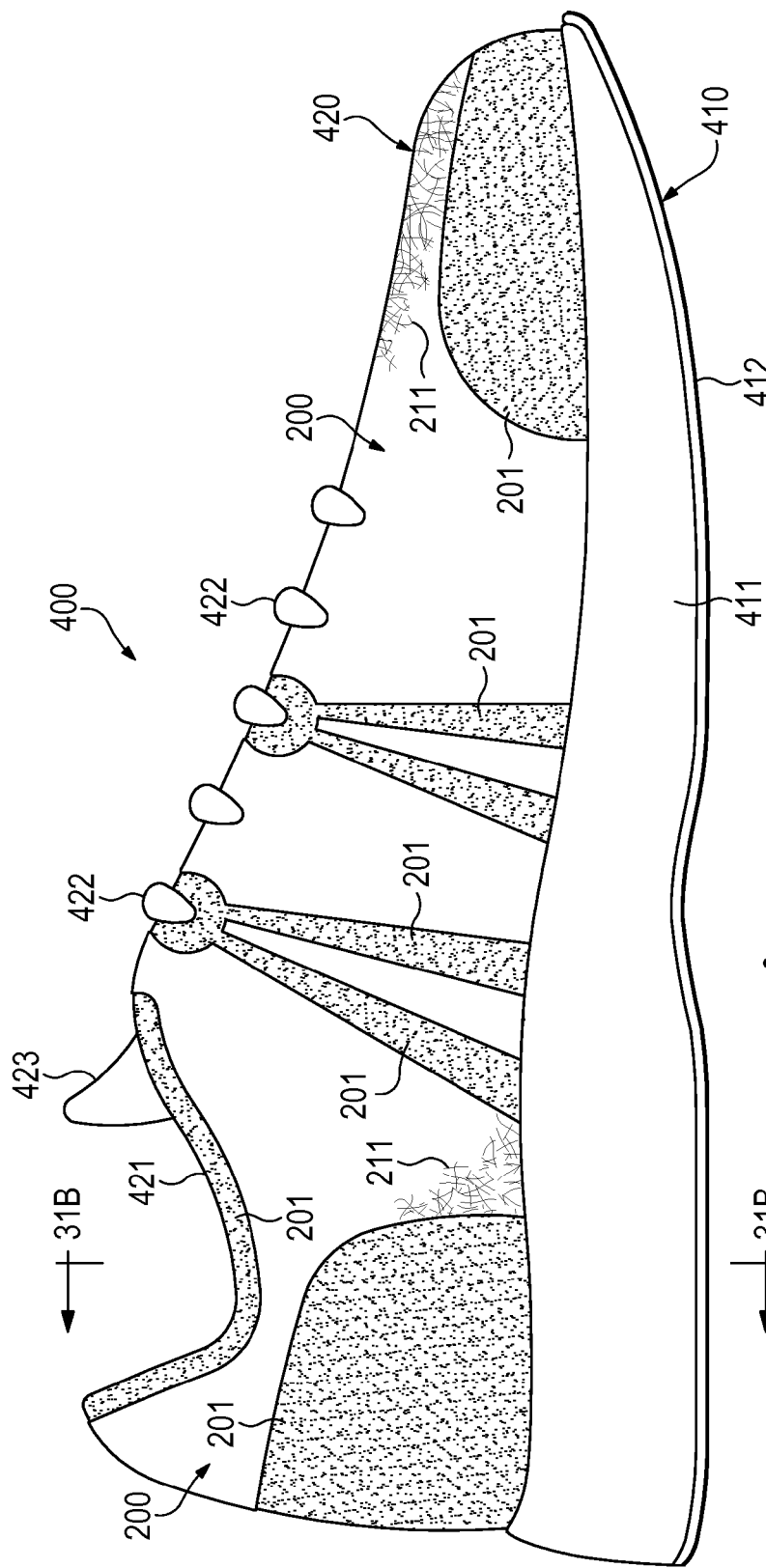

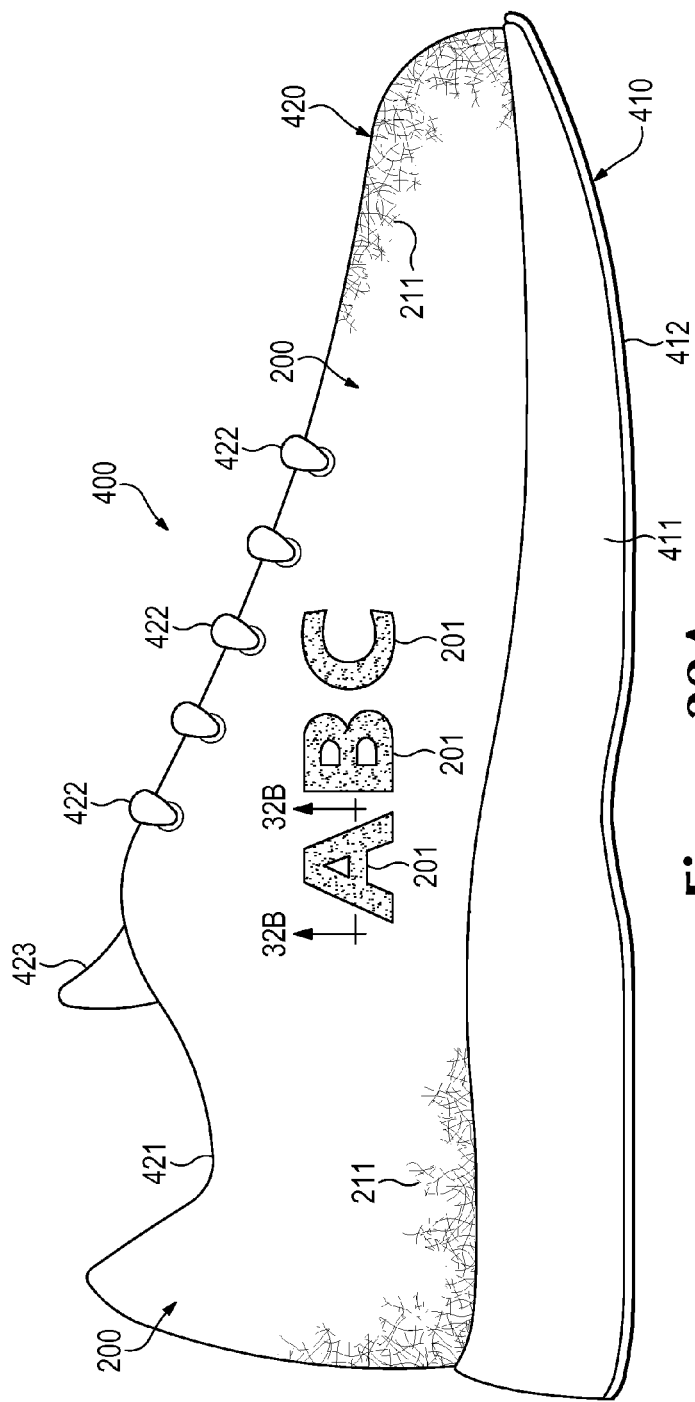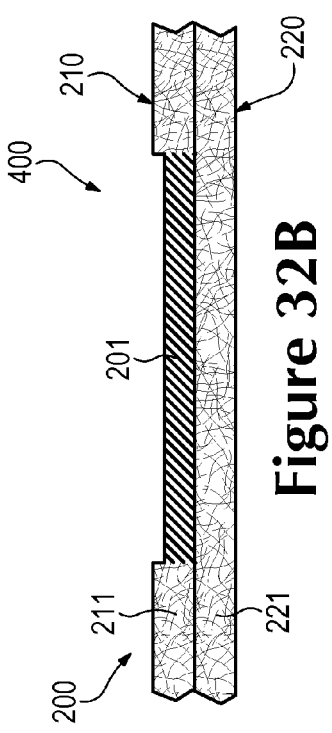
Figure 32A
Figure 32B

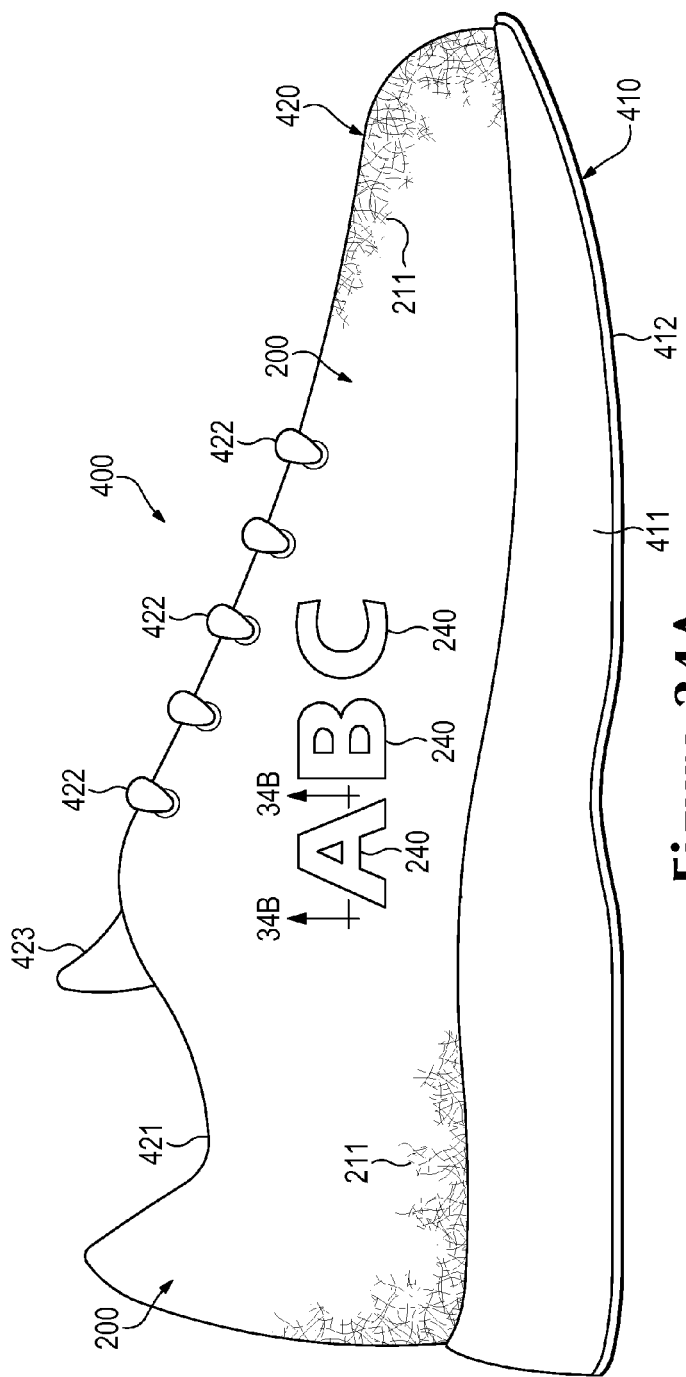
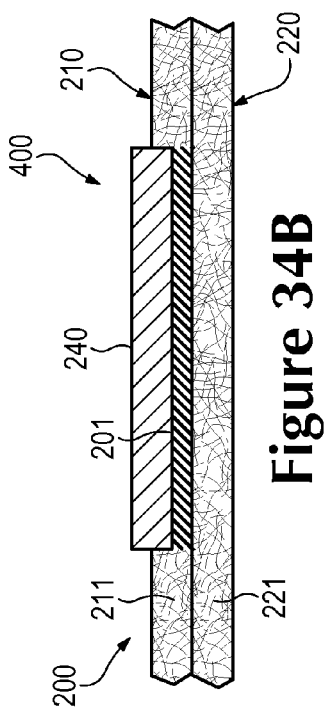
Figure 34A
Figure 34B

LAYERED THERMOPLASTIC NON-WOVEN TEXTILE ELEMENTS

BACKGROUND

A variety of products are at least partially formed from textiles. As examples, articles of apparel (e.g., shirts, pants, socks, jackets, undergarments, footwear), containers (e.g., backpacks, bags), and upholstery for furniture (e.g., chairs, couches, car seats) are often formed from various textile elements that are joined through stitching or adhesive bonding. Textiles may also be utilized in bed coverings (e.g., sheets, blankets), table coverings, towels, flags, tents, sails, and parachutes. Textiles utilized for industrial purposes are commonly referred to as technical textiles and may include structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, textiles may be incorporated into a variety of products for both personal and industrial purposes.

Textiles may be defined as any manufacture from fibers, filaments, or yarns having a generally two-dimensional structure (i.e., a length and a width that are substantially greater than a thickness). In general, textiles may be classified as mechanically-manipulated textiles or non-woven textiles. Mechanically-manipulated textiles are often formed by weaving or interlooping (e.g., knitting) a yarn or a plurality of yarns, usually through a mechanical process involving looms or knitting machines. Non-woven textiles are webs or mats of filaments that are bonded, fused, interlocked, or otherwise joined. As an example, a non-woven textile may be formed by randomly depositing a plurality of polymer filaments upon a surface, such as a moving conveyor. Various embossing or calendaring processes may also be utilized to ensure that the non-woven textile has a substantially constant thickness, impart texture to one or both surfaces of the non-woven textile, or further bond or fuse filaments within the non-woven textile to each other. Whereas spunbonded non-woven textiles are formed from filaments having a cross-sectional thickness of 10 to 100 microns, meltblown non-woven textiles are formed from filaments having a cross-sectional thickness of less than 10 microns.

Although some products are formed from one type of textile, many products may also be formed from two or more types of textiles in order to impart different properties to different areas. As an example, shoulder and elbow areas of a shirt may be formed from a textile that imparts durability (e.g., abrasion-resistance) and stretch-resistance, whereas other areas may be formed from a textile that imparts breathability, comfort, stretch, and moisture-absorption. As another example, an upper for an article of footwear may have a structure that includes numerous layers formed from various types of textiles and other materials (e.g., polymer foam, leather, synthetic leather), and some of the layers may also have areas formed from different types of textiles to impart different properties. As yet another example, straps of a backpack may be formed from non-stretch textile elements, lower areas of a backpack may be formed from durable and water-resistant textile elements, and a remainder of the backpack may be formed from comfortable and compliant textile elements. Accordingly, many products may incorporate various types of textiles in order to impart different properties to different portions of the products.

In order to impart the different properties to different areas of a product, textile elements formed from the materials must be cut to desired shapes and then joined together, usually with stitching or adhesive bonding. As the number and types of textile elements incorporated into a product increases, the time and expense associated with transporting, stocking, cutting, and joining the textile elements may also increase. Waste material from cutting and stitching processes also accumulates to a greater degree as the number and types of textile elements incorporated into a product increases. Moreover, products with a greater number of textile elements and other materials may be more difficult to recycle than products formed from few elements and materials. By decreasing the number of elements and materials utilized in a product, therefore, waste may be decreased while increasing the manufacturing efficiency and recyclability.

SUMMARY

A layered non-woven textile and products incorporating the layered non-woven textile are disclosed below. The layered non-woven textile may be formed from a first layer and a second layer. The first layer is formed from a plurality of first filaments that include a first thermoplastic polymer material with a first melting temperature. The second layer is located adjacent to the first layer and secured to the first layer. The second layer is formed from plurality of second filaments that include a second thermoplastic polymer material with a second melting temperature. The first melting temperature is lower than the second melting temperature.

The layered non-woven textile may have a fused region where the filaments are fused to a greater degree than in another region. Although the first filaments of the first layer may be fused to form a non-filamentous or partially filamentous configuration, the second filaments of the second layer may be substantially filamentous due to the differences in melting temperature. Moreover, strands or components may be incorporated into the layered non-woven textile. In some configurations, the strands or components may be heat-bonded with first thermoplastic polymer material of the first layer to join these elements to the layered non-woven textile.

A variety of products, including apparel (e.g., shirts, footwear), may incorporate the layered non-woven textile. By orienting the second layer to be inward of the first layer, fused regions, strands, and components may be placed on the exterior of the apparel. Moreover, the filamentous configuration of the second layer may be placed proximal to the wearer.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 30A is a side elevational view of a first configuration of an article of footwear.

FIG. 31A is a side elevational view of a second configuration of the article of footwear.

FIG. 32A is a side elevational view of a third configuration of the article of footwear.

FIG. 32B is a cross-sectional view of the third configuration of the article of footwear, as defined by section line 32B in FIG. 32A.

FIG. 34A is a side elevational view of a fifth configuration of the article of footwear.

FIG. 34B is a cross-sectional view of the fifth configuration of the article of footwear, as defined by section line 34B-34B in FIG. 34A.

DETAILED DESCRIPTION

The following discussion and accompanying figures disclose a non-woven textile 100 and various products incorporating non-woven textile 100. Although non-woven textile 100 is disclosed below as being incorporated into various articles of apparel (e.g., shirts, pants, footwear) for purposes of example, non-woven textile 100 may also be incorporated into a variety of other products. For example, non-woven textile 100 may be utilized in other types of apparel, containers, and upholstery for furniture. Non-woven textile 100 may also be utilized in bed coverings, table coverings, towels, flags, tents, sails, and parachutes. Various configurations of non-woven textile 100 may also be utilized for industrial purposes, as in automotive and aerospace applications, filter materials, medical textiles, geotextiles, agrotextiles, and industrial apparel. Accordingly, non-woven textile 100 may be utilized in a variety of products for both personal and industrial purposes.

I—Non-Woven Textile Configuration

Figure 1:
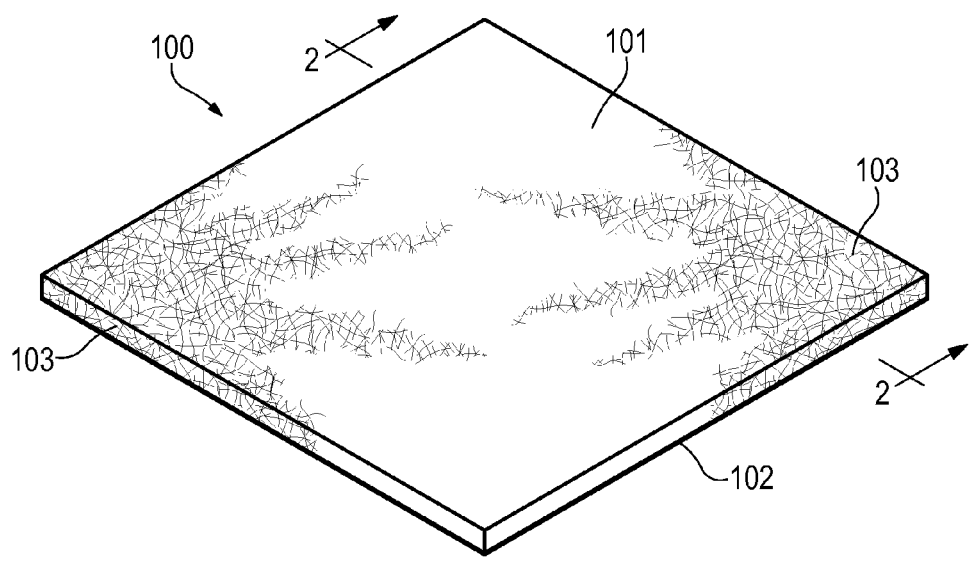
FIG. 1 is a perspective view of a non-woven textile.
Figure 2:
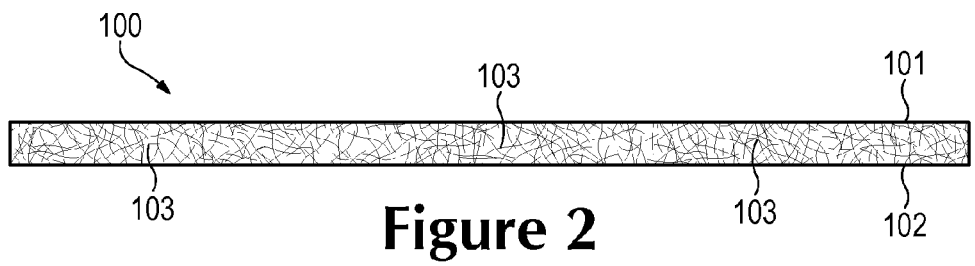
FIG. 2 is a cross-sectional view of the non-woven textile, as defined by section line 2 in FIG. 1.

Non-woven textile 100 is depicted in FIGS. 1 and 2 as having a first surface 101 and an opposite second surface 102. Non-woven textile 100 is primarily formed from a plurality of filaments 103 that include a thermoplastic polymer material. Filaments 103 are distributed randomly throughout non-woven textile 100 and are bonded, fused, interlocked, or otherwise joined to form a structure with a relatively constant thickness (i.e., distance between surfaces 101 and 102). An individual filament 103 may be located on first surface 101, on second surface 102, between surfaces 101 and 102, or on both of surfaces 101 and 102. Depending upon the manner in which non-woven textile 100 is formed, multiple portions of an individual filament 103 may be located on first surface 101, different portions of the individual filament 103 may be located on second surface 102, and other portions of the individual filament 103 may be located between surfaces 101 and 102. In order to impart an interlocking structure, the various filaments 103 may wrap around each other, extend over and under each other, and pass through various areas of non-woven textile 100. In areas where two or more filaments 103 contact each other, the thermoplastic polymer material forming filaments 103 may be bonded or fused to join filaments 103 to each other. Accordingly, filaments 103 are effectively joined to each other in a variety of ways to form a cohesive structure within non-woven textile 100.

Fibers are often defined, in textile terminology, as having a relatively short length that ranges from one millimeter to a few centimeters or more, whereas filaments are often defined as having a longer length than fibers or even an indeterminate length. As utilized within the present document, the term "filament" or variants thereof is defined as encompassing lengths of both fibers and filaments from the textile terminology definitions. Accordingly, filaments 103 or other filaments referred to herein may generally have any length. As an example, therefore, filaments 103 may have a length that ranges from one millimeter to hundreds of meters or more.

Filaments 103 include a thermoplastic polymer material. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, the thermoplastic polymer material may be melted, molded, cooled, re-melted, re-molded, and cooled again through multiple cycles. Thermoplastic polymer materials may also be welded or heat-bonded, as described in greater detail below, to other textile elements, plates, sheets, polymer foam elements, thermoplastic polymer elements, thermoset polymer elements, or a variety of other elements formed from various materials. In contrast with thermoplastic polymer materials, many thermoset polymer materials do not melt when heated, simply burning instead. Although a wide range of thermoplastic polymer materials may be utilized for filaments 103, examples of some suitable thermoplastic polymer materials include thermoplastic polyurethane, polyamide, polyester, polypropylene, and polyolefin. Although any of the thermoplastic polymer materials mentioned above may be utilized for non-woven textile 100, an advantage to utilizing thermoplastic polyurethane relates to heatbonding and colorability. In comparison with various other thermoplastic polymer materials (e.g., polyolefin), thermoplastic polyurethane is relatively easy to bond with other elements, as discussed in greater detail below, and colorants may be added to thermoplastic polyurethane through various conventional processes.

Although each of filaments 103 may be entirely formed from a single thermoplastic polymer material, individual filaments 103 may also be at least partially formed from multiple polymer materials. As an example, an individual filament 103 may have a sheath-core configuration, wherein an exterior sheath of the individual filament 103 is formed from a first type of thermoplastic polymer material, and an interior core of the individual filament 103 is formed from a second type of thermoplastic polymer material. As a similar example, an individual filament 103 may have a bi-component configuration, wherein one half of the individual filament 103 is formed from a first type of thermoplastic polymer material, and an opposite half of the individual filament 103 is formed from a second type of thermoplastic polymer material. In some configurations, an individual filament 103 may be formed from both a thermoplastic polymer material and a thermoset polymer material with either of the sheath-core or bi-component arrangements. Although all of filaments 103 may be entirely formed from a single thermoplastic polymer material, filaments 103 may also be formed from multiple polymer materials. As an example, some of filaments 103 may be formed from a first type of thermoplastic polymer material, whereas other filaments 103 may be formed from a second type of thermoplastic polymer material. As a similar example, some of filaments 103 may be formed from a thermoplastic polymer material, whereas other filaments 103 may be formed from a thermoset polymer material. Accordingly, each filaments 103, portions of filaments 103, or at least some of filaments 103 may be formed from one or more thermoplastic polymer materials.

The thermoplastic polymer material or other materials utilized for non-woven textile 100 (i.e., filaments 103) may be selected to have various stretch properties, and the materials may be considered elastomeric. Depending upon the specific product that non-woven textile 100 will be incorporated into, non-woven textile 100 or filaments 103 may stretch between ten percent to more than eight-hundred percent prior to tensile failure. For many articles of apparel, in which stretch is an advantageous property, non-woven textile 100 or filaments 103 may stretch at least one-hundred percent prior to tensile failure. As a related matter, thermoplastic polymer material or other materials utilized for non-woven textile 100 (i.e., filaments 103) may be selected to have various recovery properties. That is, non-woven textile 100 may be formed to return to an original shape after being stretched, or non-woven textile 100 may be formed to remain in an elongated or stretched shape after being stretched. Many products that incorporate non-woven textile 100, such as articles of apparel, may benefit from properties that allow non-woven textile 100 to return or otherwise recover to an original shape after being stretched by one-hundred percent or more.

A variety of conventional processes may be utilized to manufacture non-woven textile 100. In general, a manufacturing process for non-woven textile 100 includes (a) extruding or otherwise forming a plurality of filaments 103 from a thermoplastic polymer material, (b) collecting, laying, or otherwise depositing filaments 103 upon a surface, such as a moving conveyor, (c) joining filaments 103, and (d) imparting a desired thickness through compressing or other processes. Because filaments 103 may be relatively soft or partially melted when deposited upon the surface, the polymer materials from filaments 103 that contact each other may become bonded or fused together upon cooling.

Following the general manufacturing process discussed above, various post-processing operations may be performed on non-woven textile 100. For example, embossing or calendaring processes may be utilized to ensure that non-woven textile 100 has a substantially constant thickness, impart texture to one or both of surfaces 101 and 102, or further bond or fuse filaments 103 to each other. Coatings may also be applied to non-woven textile 100. Furthermore, hydrojet, hydroentanglement, needlepunching, or stitchbonding processes may also be utilized to modify properties of non-woven textile 100.

Non-woven textile 100 may be formed as a spunbonded or meltblown material. Whereas spunbonded non-woven textiles are formed from filaments having a cross-sectional thickness of 10 to 100 microns, meltblown non-woven textiles are formed from filaments having a cross-sectional thickness of less than 10 microns. Non-woven textile 100 may be either spunbonded, meltblown, or a combination of spunbonded and meltblown. Moreover, non-woven textile 100 may be formed to have spunbonded and meltblown layers, or may also be formed such that filaments 103 are combinations of spunbonded and meltblown.

In addition to differences in the thickness of individual filaments 103, the overall thickness of non-woven textile 100 may vary significantly. With reference to the various figures, the thickness of non-woven textile 100 and other elements may be amplified or otherwise increased to show details or other features associated with non-woven textile 100, thereby providing clarity in the figures. For many applications, however, a thickness of non-woven textile 100 may be in a range of 0.5 millimeters to 10.0 millimeters, but may vary considerably beyond this range. For many articles of apparel, for example, a thickness of 1.0 to 3.0 millimeters may be appropriate, although other thicknesses may be utilized. As discussed in greater detail below, regions of non-woven textile 100 may be formed such that the thermoplastic polymer material forming filaments 103 is fused to a greater degree than in other regions, and the thickness of non-woven textile 100 in the fused regions may be substantially reduced. Accordingly, the thickness of non-woven textile 100 may vary considerably.

II—Fused Regions

Figure 3:
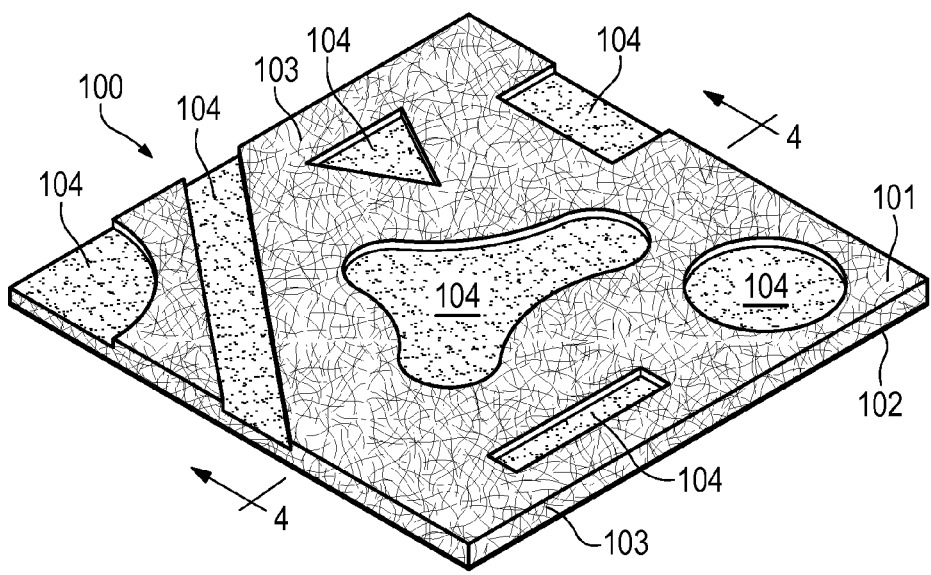
FIG. 3 is a perspective view of the non-woven textile with a plurality of fused regions.

Non-woven textile 100 is depicted as including various fused regions 104 in FIG. 3. Fused regions 104 are portions of non-woven textile 100 that have been subjected to heat in order to selectively change the properties of those fused regions 104. Non-woven textile 100, or at least the various filaments 103 forming non-woven textile 100, are discussed above as including a thermoplastic polymer material. When exposed to sufficient heat, the thermoplastic polymer material transitions from a solid state to either a softened state or a liquid state. When sufficiently cooled, the thermoplastic polymer material then transitions back from the softened state or the liquid state to the solid state. Non-woven textile 100 or regions of non-woven textile 100 may, therefore, be exposed to heat in order to soften or melt the various filaments 103. As discussed in greater detail below, exposing various regions (i.e., fused regions 104) of non-woven textile 100 to heat may be utilized to selectively change the properties of those regions. Although discussed in terms of heat alone, pressure may also be utilized either alone or in combination with heat to form fused regions 104, and pressure may be required in some configurations of non-woven textile 100 to form fused regions 104.

Fused regions 104 may exhibit various shapes, including a variety of geometrical shapes (e.g., circular, elliptical, triangular, square, rectangular) or a variety of non-defined, irregular, or otherwise non-geometrical shapes. The positions of fused regions 104 may be spaced inward from edges of non-woven textile 100, located on one or more edges of non-woven textile 100, or located at a corner of non-woven textile 100. The shapes and positions of fused regions 104 may also be selected to extend across portions of non-woven textile 100 or between two edges of non-woven textile 100. Whereas the areas of some fused regions 104 may be relatively small, the areas of other fused regions 104 may be relatively large. As described in greater detail below, two separate elements of non-woven textile 100 may be joined together, some fused regions 104 may extend across a seam that joins the elements, or some fused regions may extend into areas where other components are bonded to non-woven textile 100. Accordingly, the shapes, positions, sizes, and other aspects of fused regions 104 may vary significantly.

When exposed to sufficient heat, and possibly pressure, the thermoplastic polymer material of the various filaments 103 of non-woven textile 100 transitions from a solid state to either a softened state or a liquid state. Depending upon the degree to which filaments 103 change state, the various filaments 103 within fused regions 104 may (a) remain in a filamentous configuration, (b) melt entirely into a liquid that cools into a non-filamentous configuration, or (c) take an intermediate configuration wherein some filaments 103 or portions of individual filaments 103 remain filamentous and other filaments 103 or portions of individual filaments 103 become non-filamentous. Accordingly, although filaments 103 in fused regions 104 are generally fused to a greater degree than filaments 103 in other areas of non-woven textile 100, the degree of fusing in fused regions 104 may vary significantly.

Figure 4A:
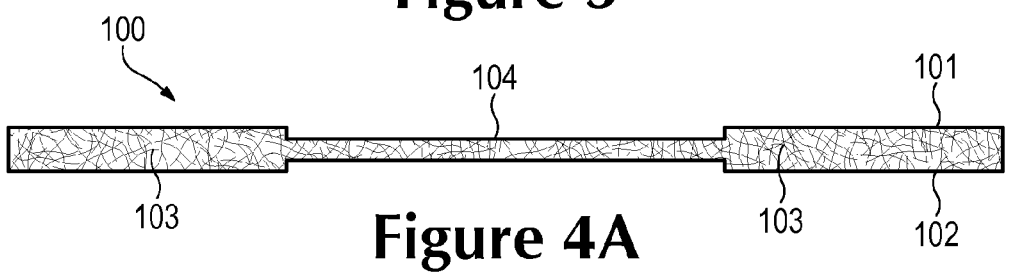
FIGS. 4A-4C are cross-sectional views, as defined by section line 4 in FIG. 3, depicting different configurations of the fused regions in the non-woven textile.
Figure 4B:
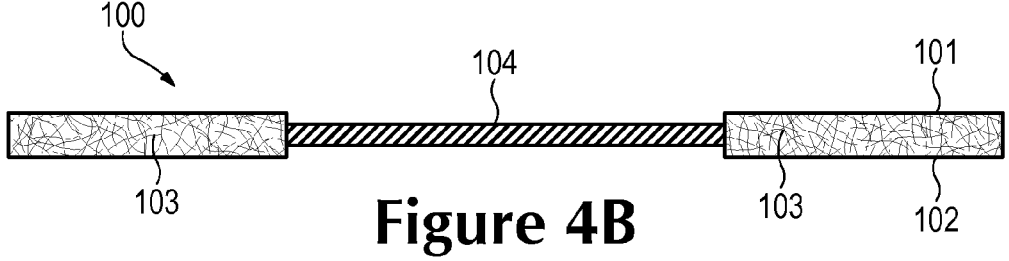
Figure 4C:
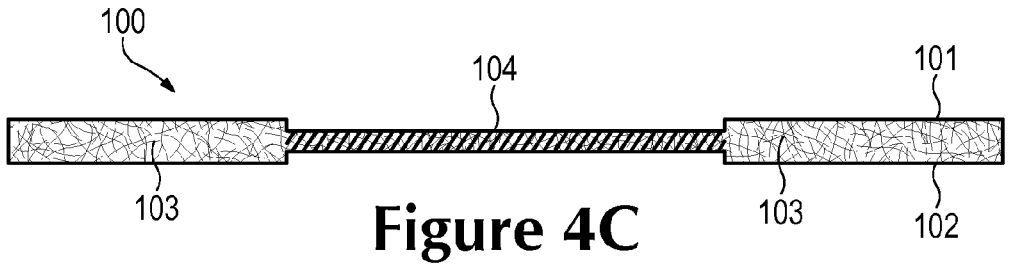

Differences between the degree to which filaments 103 may be fused in fused regions 104 are depicted in FIGS. 4A-4C. Referring specifically to FIG. 4A, the various filaments 103 within fused region 104 remain in a filamentous configuration. That is, the thermoplastic polymer material forming filaments 103 remains in the configuration of a filament and individual filaments 103 remain identifiable. Referring specifically to FIG. 4B, the various filaments 103 within fused region 104 melted entirely into a liquid that cools into a non-filamentous configuration. That is, the thermoplastic polymer material from filaments 103 melted into a non-filamentous state that effectively forms a solid polymer sheet in fused region 104, with none of the individual filaments 103 being identifiable. Referring specifically to FIG. 4C, the various filaments 103 remain in a partially-filamentous configuration. That is, some of the thermoplastic polymer material forming filaments 103 remains in the configuration of a filament, and some of the thermoplastic polymer material from filaments 103 melted into a non-filamentous state that effectively forms a solid polymer sheet in fused region 104. The configuration of the thermoplastic polymer material from filaments 103 in fused regions 104 may, therefore, be filamentous, non-filamentous, or any combination or proportion of filamentous and non-filamentous. Accordingly, the degree of fusing in each of fused regions 104 may vary along a spectrum that extends from filamentous on one end to non-filamentous on an opposite end.

A variety of factors relating to the configuration of non-woven textile 100 and the processes by which fused regions 104 are formed determine the degree to which filaments 103 are fused within fused regions 104. As examples, factors that determine the degree of fusing include (a) the particular thermoplastic polymer material forming filaments 103, (b) the temperature that fused regions 104 are exposed to, (c) the pressure that fused regions 104 are exposed to, and (d) the time at which fused regions 104 are exposed to the elevated temperature and/or pressure. By varying these factors, the degree of fusing that results within fused regions 104 may also be varied along the spectrum that extends from filamentous on one end to non-filamentous on an opposite end.

Figure 5A:
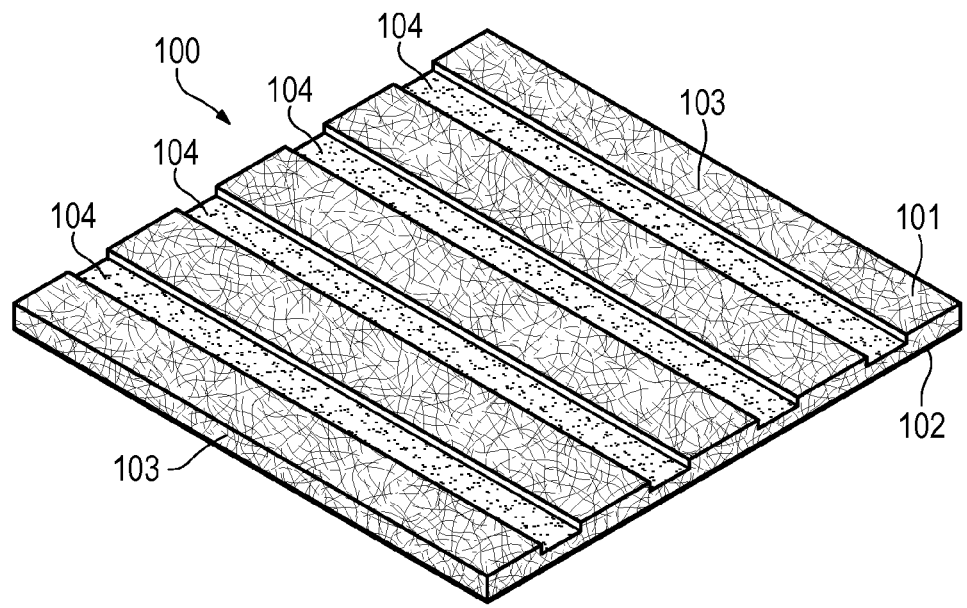
FIGS. 5A-5H are perspective views of further configurations of the fused regions in the non-woven textile.
Figure 5B:
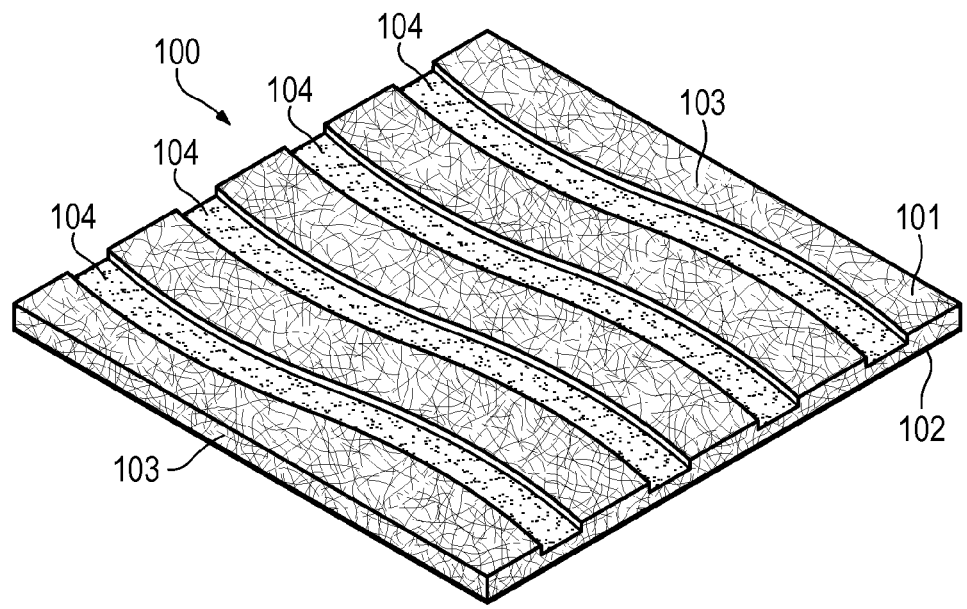
Figure 5C:
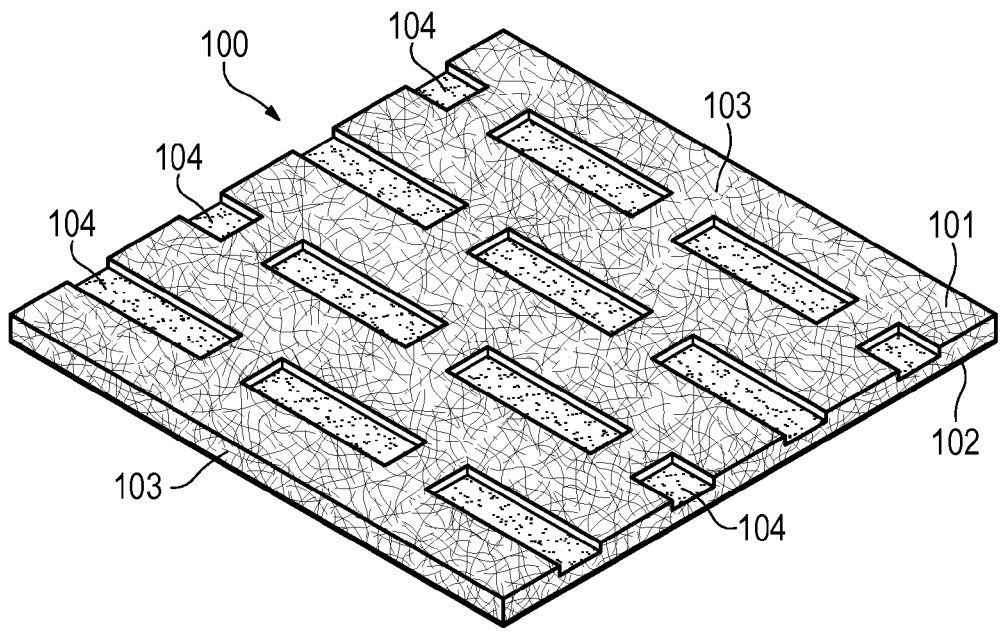
Figure 5D:
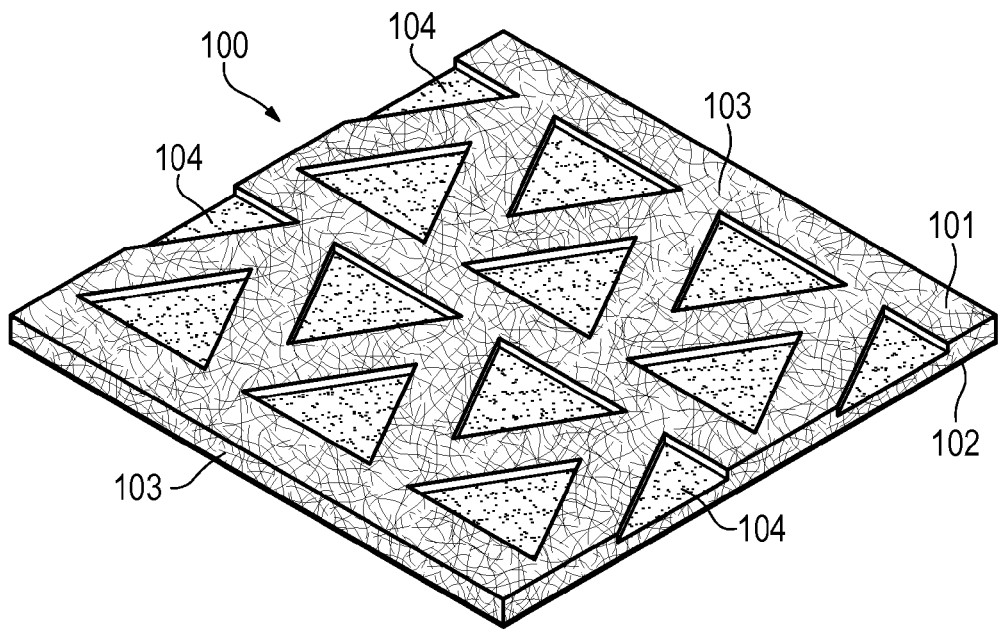
Figure 5E:
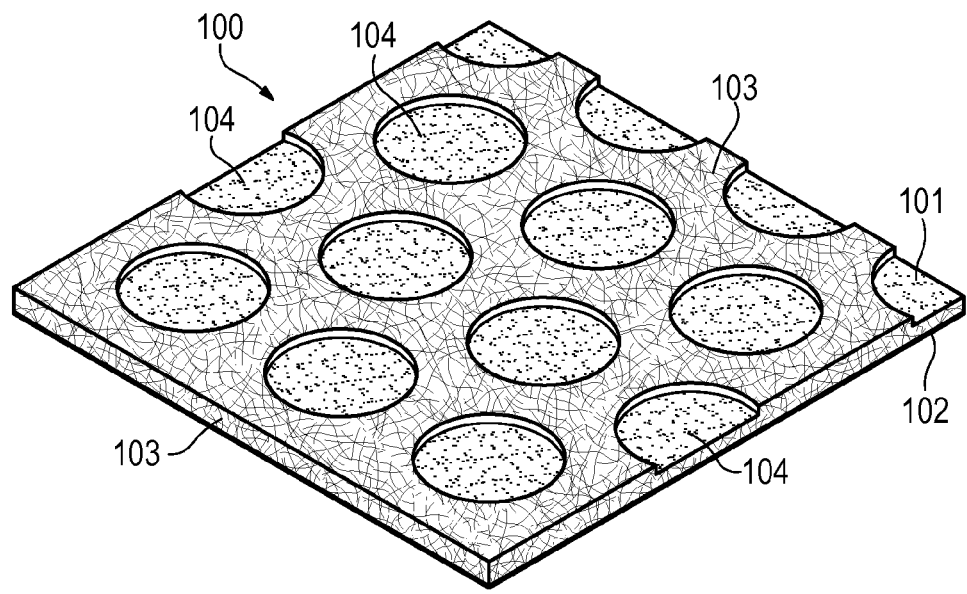
Figure 5F:
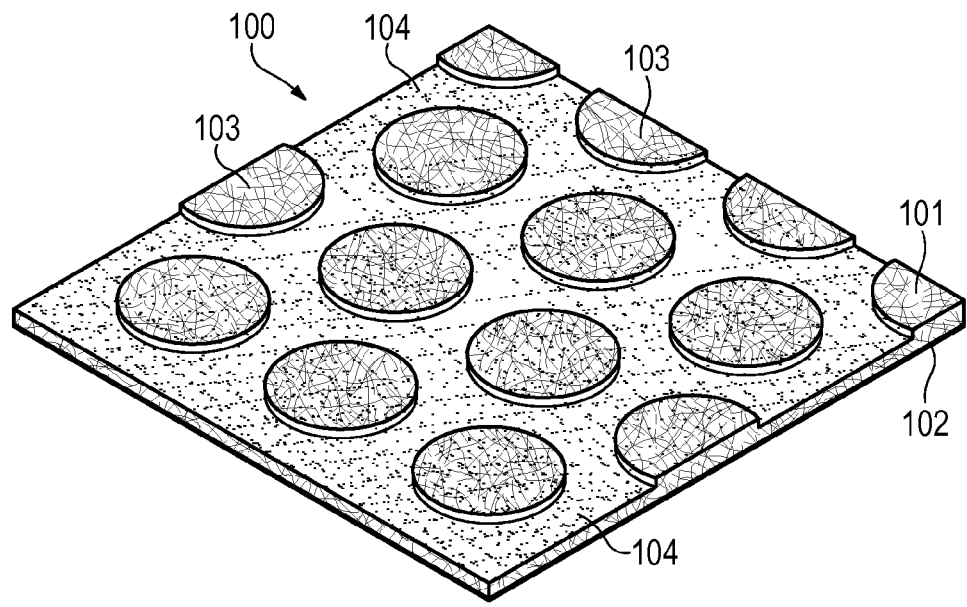
Figure 5G:
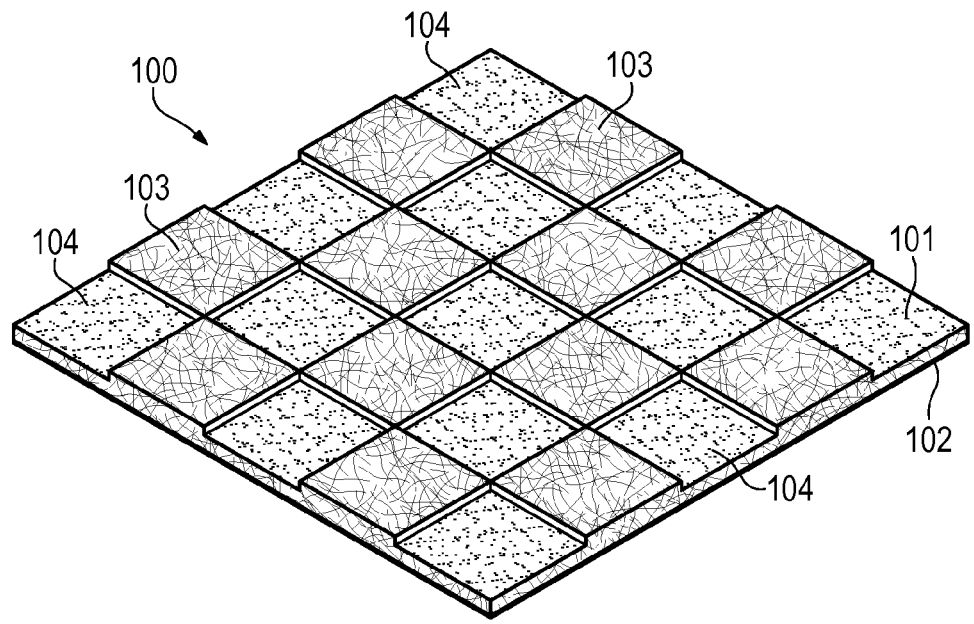
Figure 5H:
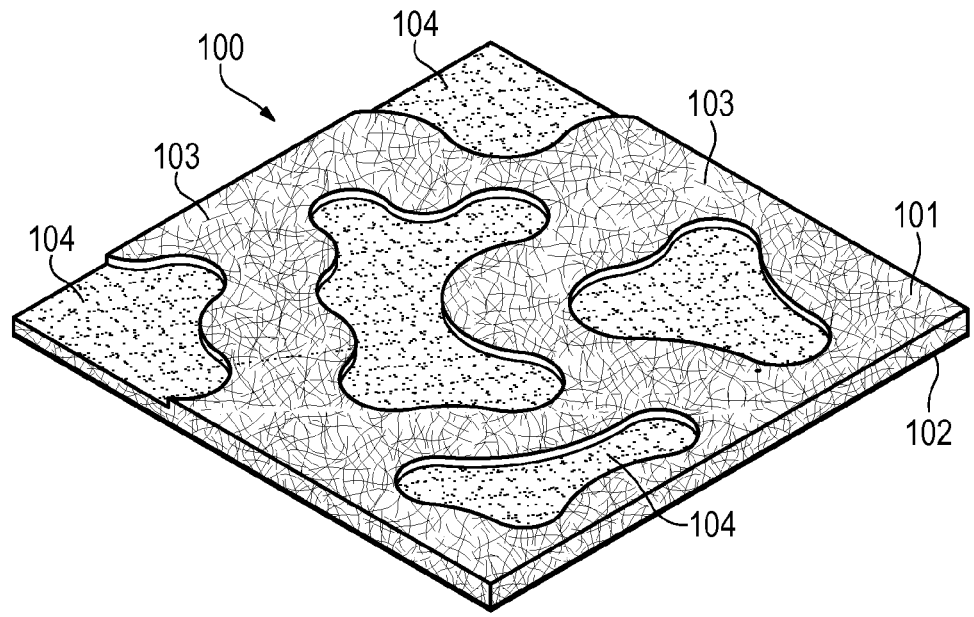

The configuration of fused regions 104 in FIG. 3 is intended to provide an example of the manner in which the shapes, positions, sizes, and other aspects of fused regions 104 may vary. The configuration of fused regions 104 may, however, vary significantly. Referring to FIG. 5A, non-woven textile 100 includes a plurality of fused regions 104 with generally linear and parallel configurations. Similarly, FIG. 5B depicts non-woven textile 100 as including a plurality of fused regions 104 with generally curved and parallel configurations. Fused regions 104 may have a segmented configuration, as depicted in FIG. 5C. Non-woven textile 100 may also have a plurality of fused regions 104 that exhibit the configuration of a repeating pattern of triangular shapes, as in FIG. 5D, the configuration of a repeating pattern of circular shapes, as in FIG. 5E, or a repeating pattern of any other shape or a variety of shapes. In some configurations of non-woven textile 100, as depicted in FIG. 5F, one fused region 104 may form a continuous area that defines discrete areas for the remainder of non-woven textile 100. Fused regions 104 may also have a configuration wherein edges or corners contact each other, as in the checkered pattern of FIG. 5G. Additionally, the shapes of the various fused regions 104 may have a non-geometrical or irregular shape, as in FIG. 5H. Accordingly, the shapes, positions, sizes, and other aspects of fused regions 104 may vary significantly.

Figure 6A:
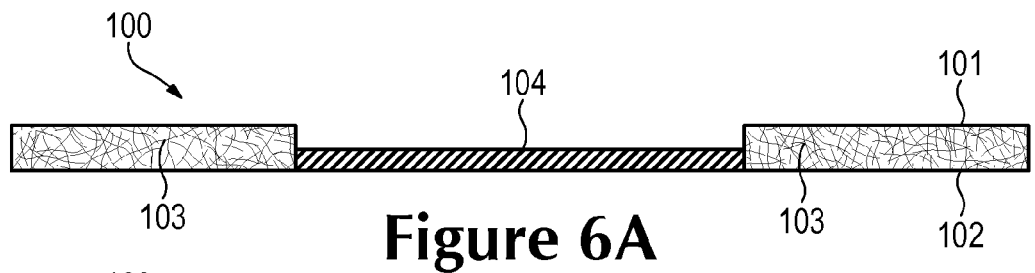
FIGS. 6A-6F are cross-sectional views corresponding with FIGS. 4A-4C and depicting further configurations of the fused regions in the non-woven textile.
Figure 6B:
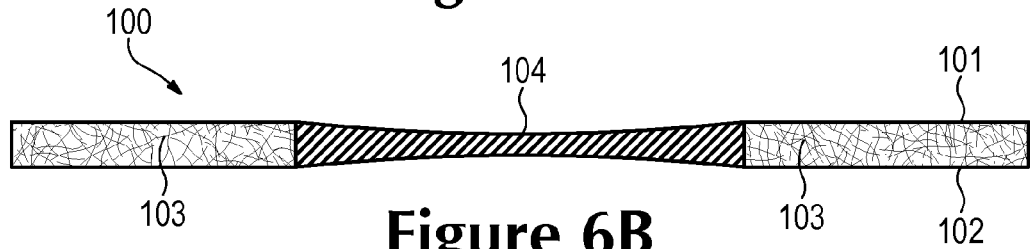
Figure 6C:
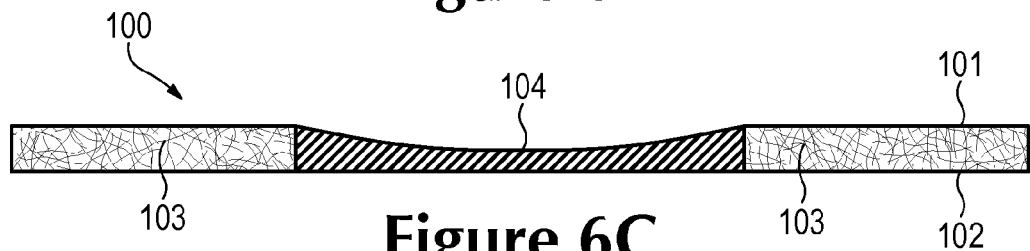
Figure 6D:
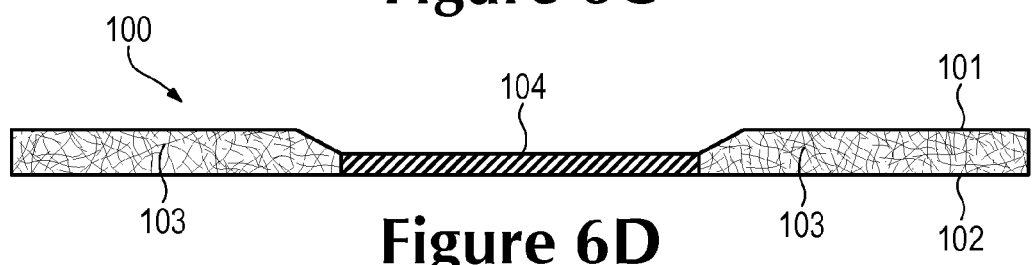
Figure 6E:
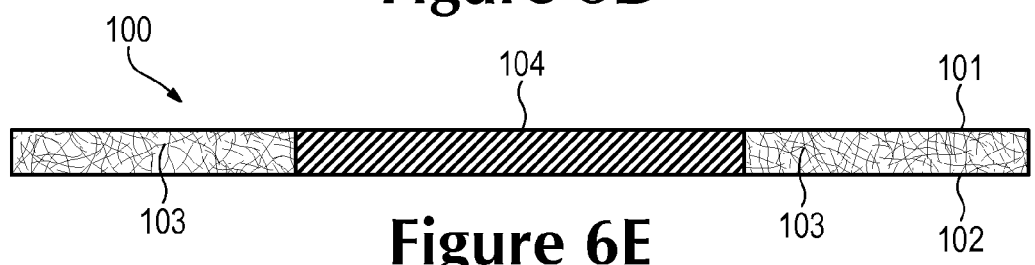
Figure 6F:
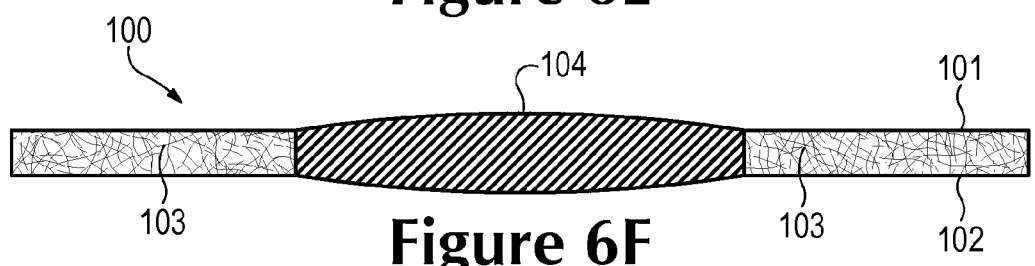

The thickness of non-woven textile 100 may decrease in fused regions 104. Referring to FIGS. 4A-4C, for example, non-woven textile 100 exhibits less thickness in fused region 104 than in other areas. As discussed above, fused regions 104 are areas where filaments 103 are generally fused to a greater degree than filaments 103 in other areas of non-woven textile 100. Additionally, non-woven textile 100 or the portions of non-woven textile 100 forming fused regions 104 may be compressed while forming fused regions 104. As a result, the thickness of fused regions 104 may be decreased in comparison with other areas of non-woven textile 100. Referring again to FIGS. 4A-4C, surfaces 102 and 103 both exhibit a squared or abrupt transition between fused regions 104 and other areas of non-woven textile 100. Depending upon the manner in which fused regions 104 are formed, however, surfaces 102 and 103 may exhibit other configurations. As an example, only first surface 101 has a squared transition to fused regions 104 in FIG. 6A. Although the decrease in thickness of fused regions 104 may occur through a squared or abrupt transition, a curved or more gradual transition may also be utilized, as depicted in FIGS. 6B and 6C. In other configurations, an angled transition between fused regions 104 and other areas of non-woven textile 100 may be formed, as in FIG. 6D. Although a decrease in thickness often occurs in fused regions 104, no decrease in thickness or a minimal decrease in thickness is also possible, as depicted in FIG. 6E. Depending upon the materials utilized in non-woven textile 100 and the manner in which fused regions 104 are formed, fused regions 104 may actually swell or otherwise increase in thickness, as depicted in FIG. 6F. In each of FIGS. 6A-6F, fused regions 104 are depicted as having a non-filamentous configuration, but may also have the filamentous configuration or the intermediate configuration discussed above.

Based upon the above discussion, non-woven textile 100 is formed from a plurality of filaments 103 that include a thermoplastic polymer material. Although filaments 103 are bonded, fused, interlocked, or otherwise joined throughout non-woven textile 100, fused regions 104 are areas where filaments 103 are generally fused to a greater degree than filaments 103 in other areas of non-woven textile 100. The shapes, positions, sizes, and other aspects of fused regions 104 may vary significantly. In addition, the degree to which filaments 103 are fused may also vary significantly to be filamentous, non-filamentous, or any combination or proportion of filamentous and non-filamentous.

III—Properties of Fused Regions

The properties of fused regions 104 may be different than the properties of other regions of non-woven textile 100. Additionally, the properties of one of fused regions 104 may be different than the properties of another of fused regions 104. In manufacturing non-woven textile 100 and forming fused regions 104, specific properties may be applied to the various areas of non-woven textile 100. More particularly, the shapes of fused regions 104, positions of fused regions 104, sizes of fused regions 104, degree to which filaments 103 are fused within fused regions 104, and other aspects of non-woven textile 100 may be varied to impart specific properties to specific areas of non-woven textile 100. Accordingly, non-woven textile 100 may be engineered, designed, or otherwise structured to have particular properties in different areas.

Examples of properties that may be varied through the addition or the configuration of fused regions 104 include permeability, durability, and stretch-resistance. By forming one of fused regions 104 in a particular area of non-woven textile 100, the permeability of that area generally decreases, whereas both durability and stretch-resistance generally increases. As discussed in greater detail below, the degree to which filaments 103 are fused to each other has a significant effect upon the change in permeability, durability, and stretch-resistance. Other factors that may affect permeability, durability, and stretch-resistance include the shapes, positions, and sizes of fused regions 104, as well as the specific thermoplastic polymer material forming filaments 103.

Permeability generally relates to ability of air, water, and other fluids (whether gaseous or liquid) to pass through or otherwise permeate non-woven textile 100. Depending upon the degree to which filaments 103 are fused to each other, the permeability may vary significantly. In general, the permeability is highest in areas of non-woven textile 100 where filaments 103 are fused the least, and the permeability is lowest in areas of non-woven textile 100 where filaments 103 are fused the most. As such, the permeability may vary along a spectrum depending upon the degree to which filaments 103 are fused to each other. Areas of non-woven textile 100 that are separate from fused regions 104 (i.e., non-fused areas of non-woven textile 100) generally exhibit a relatively high permeability. Fused regions 104 where a majority of filaments 103 remain in the filamentous configuration also exhibit a relatively high permeability, but the permeability is generally less than in areas separate from fused regions 104. Fused regions 104 where filaments 103 are in both a filamentous and non-filamentous configuration have a lesser permeability. Finally, areas where a majority or all of the thermoplastic polymer material from filaments 103 exhibits a non-filamentous configuration may have a relatively small permeability or even no permeability.

Durability generally relates to the ability of non-woven textile 100 to remain intact, cohesive, or otherwise undamaged, and may include resistances to wear, abrasion, and degradation from chemicals and light. Depending upon the degree to which filaments 103 are fused to each other, the durability may vary significantly. In general, the durability is lowest in areas of non-woven textile 100 where filaments 103 are fused the least, and the durability is highest in areas of non-woven textile 100 where filaments 103 are fused the most. As such, the durability may vary along a spectrum depending upon the degree to which filaments 103 are fused to each other. Areas of non-woven textile 100 that are separate from fused regions 104 generally exhibit a relatively low durability. Fused regions 104 where a majority of filaments 103 remain in the filamentous configuration also exhibit a relatively low durability, but the durability is generally more than in areas separate from fused regions 104. Fused regions 104 where filaments 103 are in both a filamentous and non-filamentous configuration have a greater durability. Finally, areas where a majority or all of the thermoplastic polymer material from filaments 103 exhibits a non-filamentous configuration may have a relatively high durability. Other factors that may affect the general durability of fused regions 104 and other areas of non-woven textile 100 include the initial thickness and density of non-woven textile 100, the type of polymer material forming filaments 103, and the hardness of the polymer material forming filaments 103.

Stretch-resistance generally relates to the ability of non-woven textile 100 to resist stretching when subjected to a textile force. As with permeability and durability, the stretch-resistance of non-woven textile 100 may vary significantly depending upon the degree to which filaments 103 are fused to each other. As with durability, the stretch-resistance is lowest in areas of non-woven textile 100 where filaments 103 are fused the least, and the stretch-resistance is highest in areas of non-woven textile 100 where filaments 103 are fused the most. As noted above, the thermoplastic polymer material or other materials utilized for non-woven textile 100 (i.e., filaments 103) may be considered elastomeric or may stretch at least one-hundred percent prior to tensile failure. Although the stretch-resistance of non-woven textile 100 may be greater in areas of non-woven textile 100 where filaments 103 are fused the most, fused regions 104 may still be elastomeric or may stretch at least one-hundred percent prior to tensile failure. Other factors that may affect the general stretch properties of fused regions 104 and other areas of non-woven textile 100 include the initial thickness and density of non-woven textile 100, the type of polymer material forming filaments 103, and the hardness of the polymer material forming filaments 103.

As discussed in greater detail below, non-woven textile 100 may be incorporated into a variety of products, including various articles of apparel (e.g., shirts, pants, footwear). Taking a shirt as an example, non-woven textile 100 may form a majority of the shirt, including a torso region and two arm regions. Given that moisture may accumulate within the shirt from perspiration, a majority of the shirt may be formed from portions of non-woven textile 100 that do not include fused regions 104 in order to provide a relatively high permeability. Given that elbow areas of the shirt may be subjected to relatively high abrasion as the shirt is worn, some of fused regions 104 may be located in the elbow areas to impart greater durability. Additionally, given that the neck opening may be stretched as the shirt is put on an individual and taken off the individual, one of fused regions 104 may be located around the neck opening to impart greater stretch-resistance. Accordingly, one material (i.e., non-woven textile 100) may be used throughout the shirt, but by fusing different areas to different degrees, the properties may be advantageously-varied in different areas of the shirt.

The above discussion focused primarily on the properties of permeability, durability, and stretch-resistance. A variety of other properties may also be varied through the addition or the configuration of fused regions 104. For example, the overall density of non-woven textile 100 may be increased as the degree of fusing of filaments 103 increases. The transparency of non-woven textile 100 may also be increased as the degree of fusing of filaments 103 increases. Depending upon various factors, the darkness of a color of non-woven textile 100 may also increase as the degree of fusing of filaments 103 increases. Although somewhat discussed above, the overall thickness of non-woven textile 100 may decrease as the degree of fusing of filaments 103 increases. The degree to which non-woven textile 100 recovers after being stretched, the overall flexibility of non-woven textile 100, and resistance to various modes of failure may also vary depending upon the degree of fusing of filaments 100. Accordingly, a variety of properties may be varied by forming fused regions 104.

IV—Formation of Fused Regions

Figure 7A:
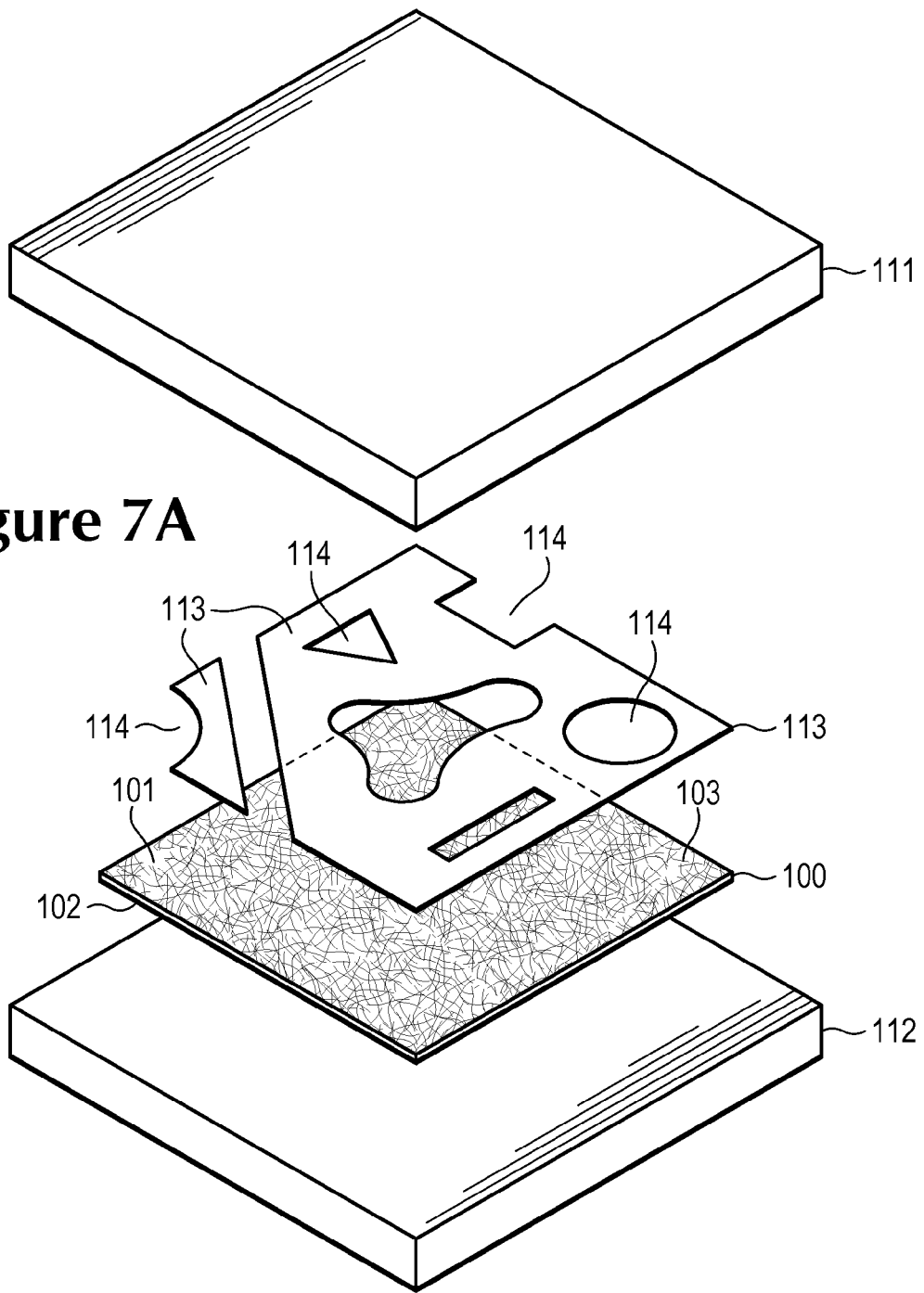
FIGS. 7A-7C are perspective views of a first process for forming the fused regions in the non-woven textile.
Figure 7B:
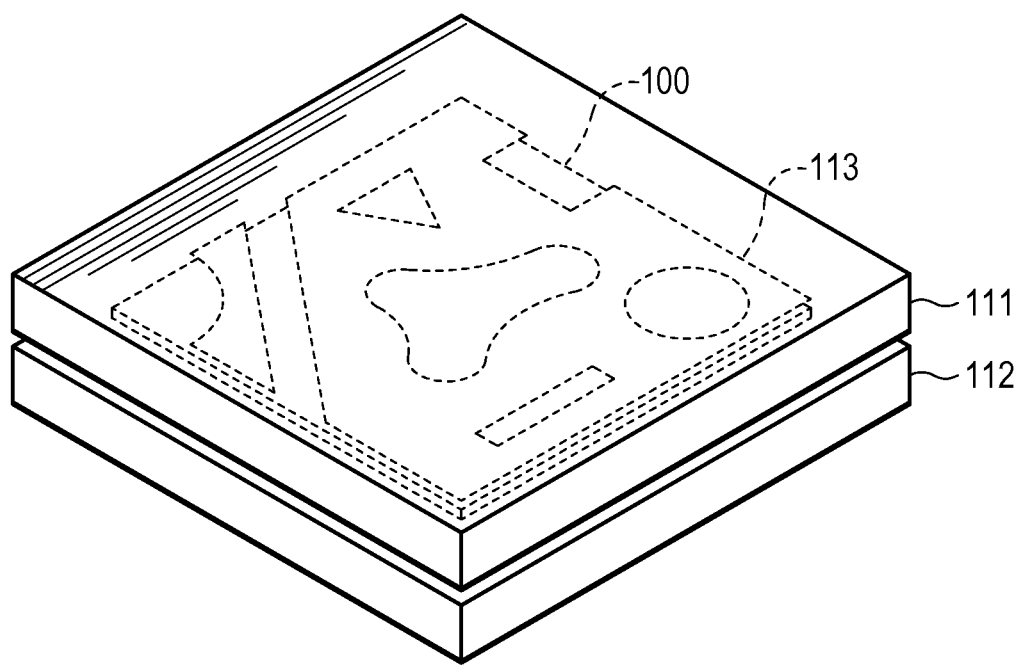
Figure 7C:
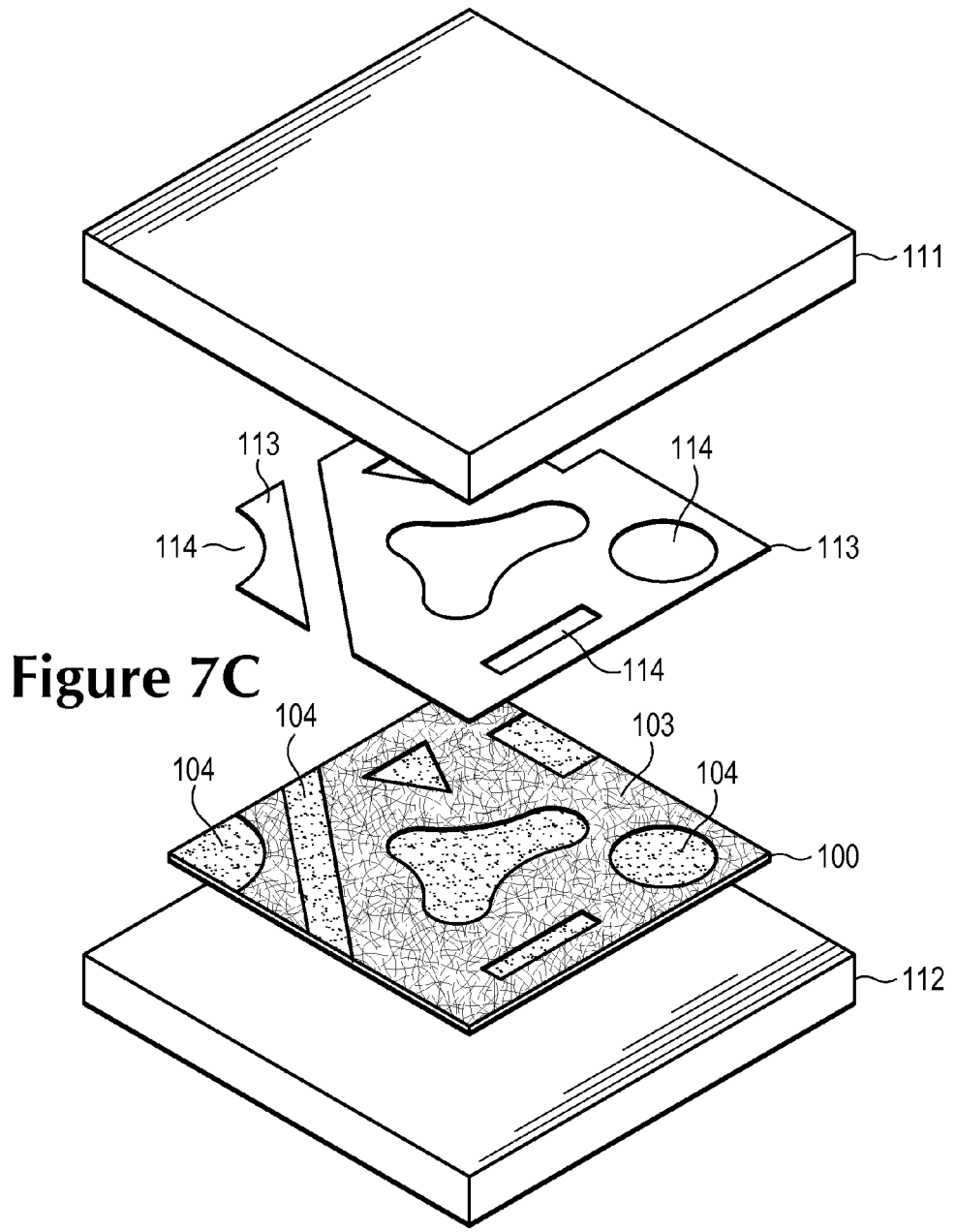

A variety of processes may be utilized to form fused regions 104. Referring to FIGS. 7A-7C, an example of a method is depicted as involving a first plate 111 and a second plate 112, which may be platens of a press. Initially, non-woven textile 100 and an insulating element 113 are located between plates 111 and 112, as depicted in FIG. 7A. Insulating element 113 has apertures 114 or other absent areas that correspond with fused regions 104. That is, insulating element 113 exposes areas of non-woven textile 100 corresponding with fused regions 104, while covering other areas of non-woven textile 100.

Plates 111 and 112 then translate or otherwise move toward each other in order to compress or induce contact between non-woven textile 100 and insulating element 113, as depicted in FIG. 7B. In order to form fused regions 104, heat is applied to areas of non-woven textile 100 corresponding with fused regions 104, but a lesser heat or no heat is applied to other areas of non-woven textile 100 due to the presence of insulating element 113. That is, the temperature of the various areas of non-woven textile 100 corresponding with fused regions 104 is elevated without significantly elevating the temperature of other areas. In this example method, first plate 111 is heated so as to elevate the temperature of non-woven textile 100 through conduction. Some areas of non-woven textile 100 are insulated, however, by the presence of insulating element 113. Only the areas of non-woven textile 100 that are exposed through apertures 114 are, therefore, exposed to the heat so as to soften or melt the thermoplastic polymer material within filaments 103. The material utilized for insulating element 113 may vary to include metal plates, paper sheets, polymer layers, foam layers, or a variety of other materials (e.g., with low thermal conductivity) that will limit the heat transferred to non-woven textile 100 from first plate 111. In some processes, insulating element 113 may be an integral portion of or otherwise incorporated into first plate 111.

Upon separating plates 111 and 112, as depicted in FIG. 7C, non-woven textile 100 and insulating element 113 are separated from each other. Whereas areas of non-woven textile 100 that were exposed by apertures 114 in insulating element 113 form fused regions 104, areas covered or otherwise protected by insulating element 113 remain substantially unaffected. In some methods, insulating element 113 may be structured to allow some of fused regions 104 to experience greater temperatures than other fused regions 104, thereby fusing the thermoplastic polymer material of filaments 103 more in some of fused regions 104 than in the other fused regions 104. That is, the configuration of insulating element 113 may be structured to heat fused regions 104 to different temperatures in order to impart different properties to the various fused regions 104.

Various methods may be utilized to apply heat to specific areas of non-woven textile 100 and form fused regions 104. As noted above, first plate 111 may be heated so as to elevate the temperature of non-woven textile 100 through conduction. In some processes, both plates 111 and 112 may be heated, and two insulating elements 113 may be located on opposite sides of non-woven textile 100. Although heat may be applied through conduction, radio frequency heating may also be used, in which case insulating element 113 may prevent the passage of specific wavelengths of electromagnetic radiation. In processes where chemical heating is utilized, insulating element 113 may prevent chemicals from contacting areas of non-woven textile 100. In other processes where radiant heat is utilized, insulating element 113 may be a reflective material (i.e., metal foil) that prevents the radiant heat from raising the temperature of various areas of non-woven textile 100. A similar process involving a conducting element may also be utilized. More particularly, the conducting element may be used to conduct heat directly to fused regions 104. Whereas insulating element 113 is absent in areas corresponding with fused regions 104, the conducting element would be present in fused regions 104 to conduct heat to those areas of non-woven textile 100.

Figure 8A:
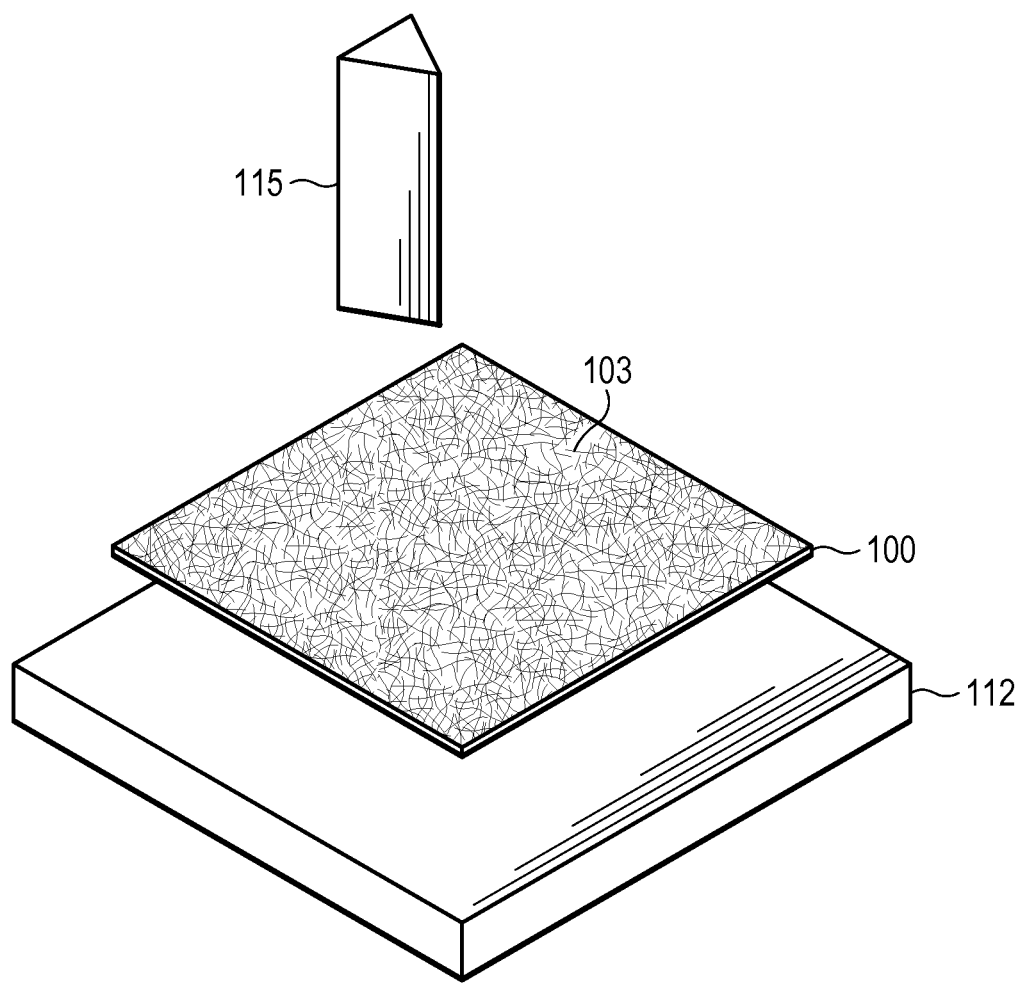
FIGS. 8A-8C are perspective views of a second process for forming the fused regions in the non-woven textile.
Figure 8B:
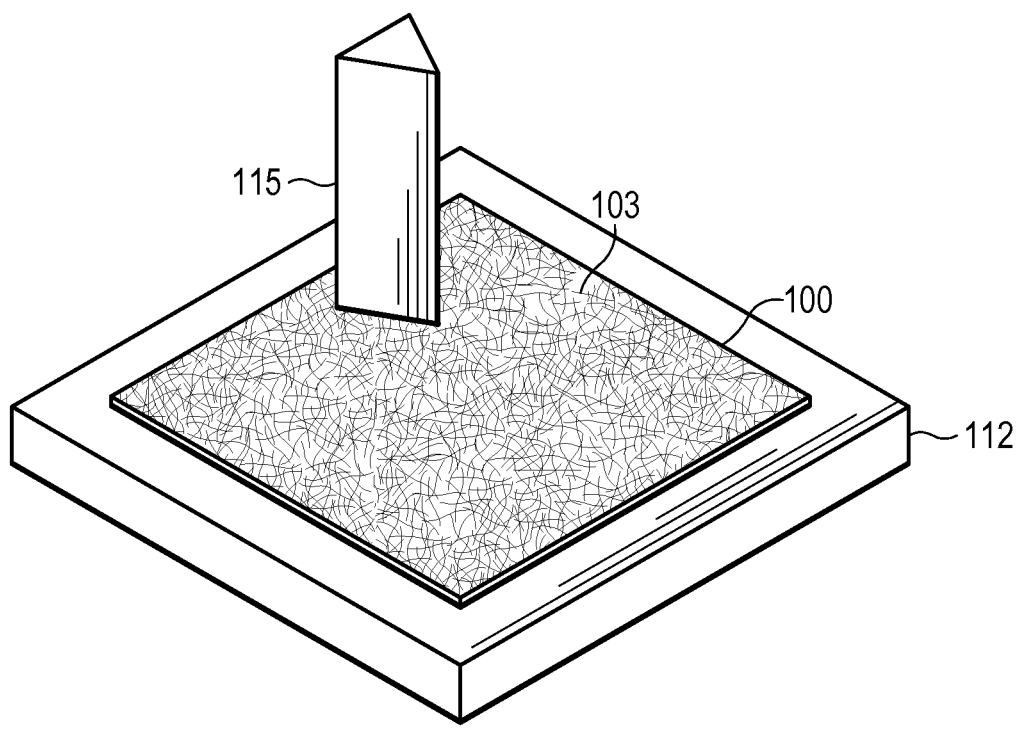
Figure 8C:
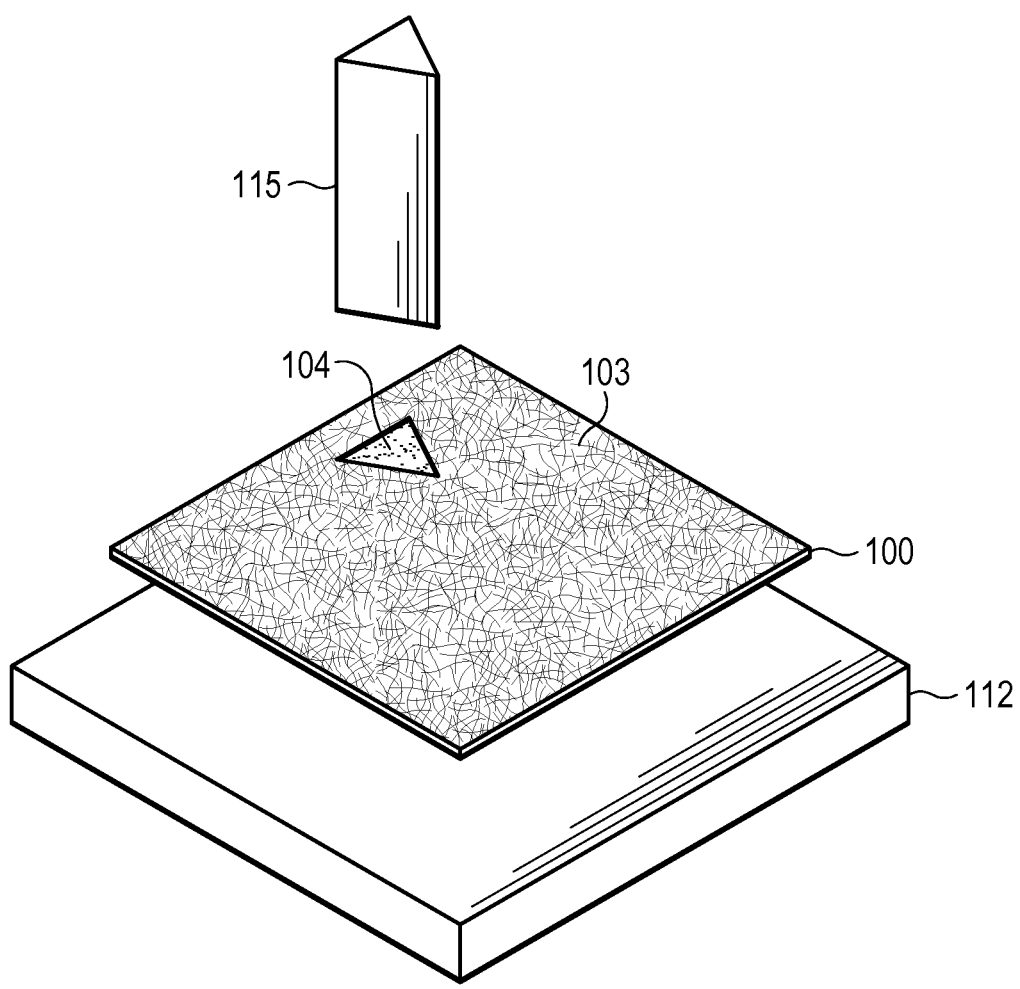

An example of another process that may be utilized to form fused regions 104 in non-woven textile 100 is depicted in FIGS. 8A-8C. Initially, non-woven textile 100 is placed adjacent to or upon second plate 112 or another surface, as depicted in FIG. 8A. A heated die 115 having the shape of one of fused regions 104 then contacts and compresses non-woven textile 100, as depicted in FIG. 8B, to heat a defined area of non-woven textile 100. Upon removal of die 115, one of fused regions 104 is exposed. Additional dies having the general shapes of other fused regions 104 may be utilized to form the remaining fused regions 104 in a similar manner. An advantage to this process is that die 115 and each of the other dies may be heated to different temperatures, held in contact with non-woven textile 100 for different periods of time, and compressed against non-woven textile 100 with different forces, thereby varying the resulting properties of the various fused regions 104.

Figure 9:
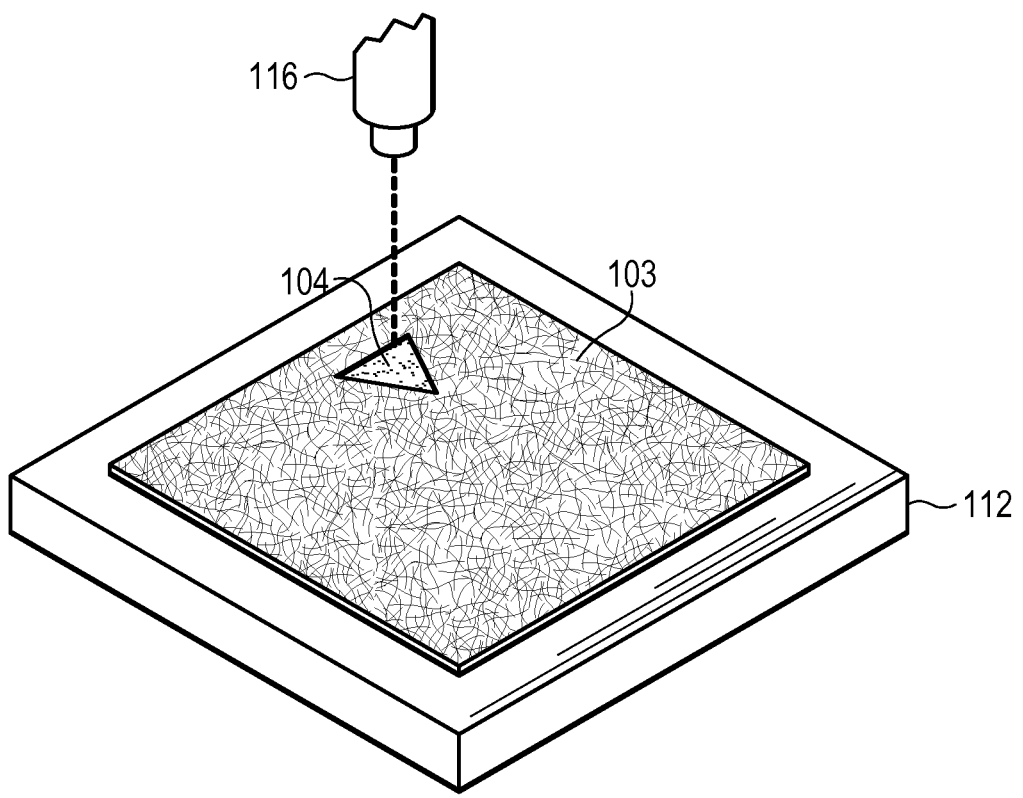
FIG. 9 is a perspective view of a third process for forming the fused regions in the non-woven textile.

An example of yet another process that may be utilized to form fused regions 104 in non-woven textile 100 is depicted in FIG. 9. In this process, non-woven textile 100 is placed upon second plate 112 or another surface, and a laser apparatus 116 is utilized to heat specific areas of non-woven textile 100, thereby fusing the thermoplastic polymer material of filaments 103 and forming fused regions 104. By adjusting any or all of the power, focus, or velocity of laser apparatus 116, the degree to which fused regions 104 are heated may be adjusted or otherwise varied. Moreover, different fused regions 104 may be heated to different temperatures to modify the degree to which filaments 103 are fused, thereby varying the resulting properties of the various fused regions 104. An example of a suitable laser apparatus 116 is any of a variety of conventional $CO_2$ or Nd:YAG laser apparatuses.

V—Composite Elements

Figure 10:
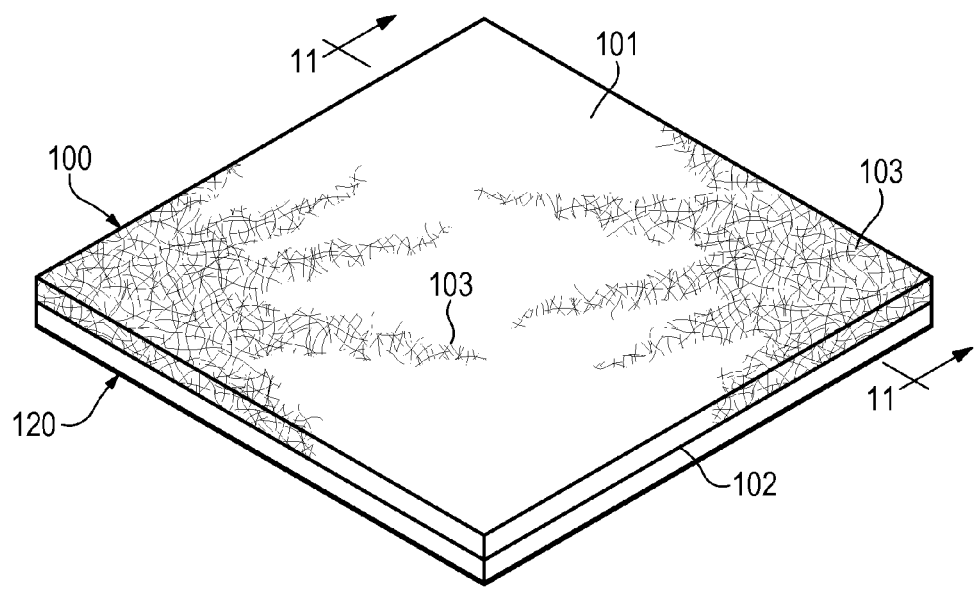
FIG. 10 is a perspective view of a composite element that includes the non-woven textile.
Figure 11:
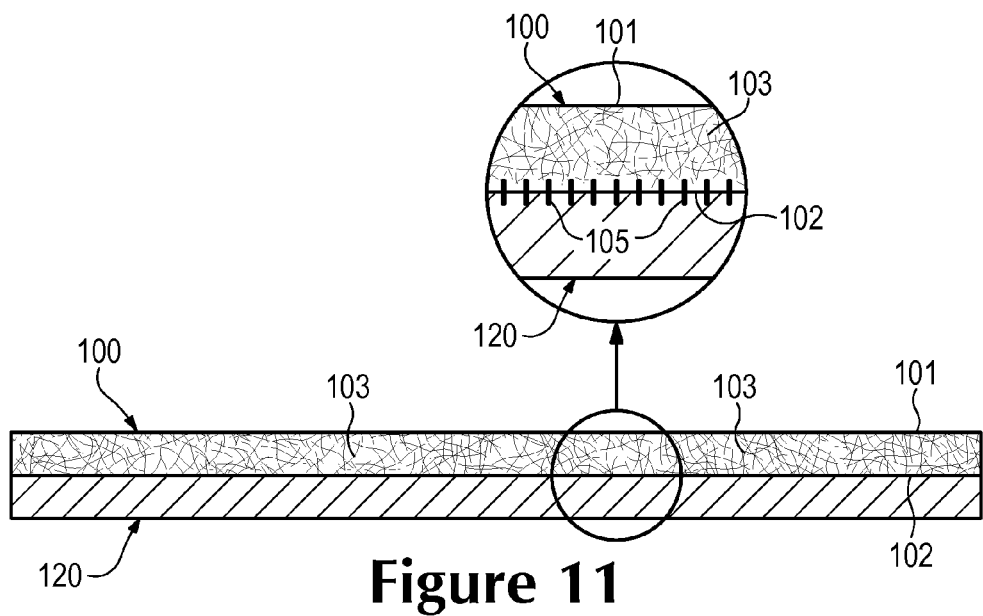
FIG. 11 is a cross-sectional view of the composite element, as defined by section line 11 in FIG. 10.

Non-woven textile 100 may be joined with various textiles, materials, or other components to form composite elements. By joining non-woven textile 100 with other components, properties of both non-woven textile 100 and the other components are combined in the composite elements. An example of a composite element is depicted in FIGS. 10 and 11, in which a component 120 is joined to non-woven textile 100 at second surface 102. Although component 120 is depicted as having dimensions that are similar to dimensions of non-woven textile 100, component 120 may have a lesser or greater length, a lesser or greater width, or a lesser or greater thickness. If, for example, component 120 is a textile that absorbs water or wicks water away, then the combination of non-woven textile 100 and component 120 may be suitable for articles of apparel utilized during athletic activities where an individual wearing the apparel is likely to perspire. As another example, if component 120 is a compressible material, such as a polymer foam, then the combination of non-woven textile 100 and component 120 may be suitable for articles of apparel where cushioning (i.e., attenuation of impact forces) is advantageous, such as padding for athletic activities that may involve contact or impact with other athletes or equipment. As a further example, if component 120 is a plate or sheet, then the combination of non-woven textile 100 and component 120 may be suitable for articles of apparel that impart protection from acute impacts. Accordingly, a variety of textiles, materials, or other components maybe joined with a surface of non-woven textile 100 to form composite elements with additional properties.

The thermoplastic polymer material in filaments 103 may be utilized to secure non-woven textile 100 to component 120 or other components. As discussed above, a thermoplastic polymer material melts when heated and returns to a solid state when cooled sufficiently. Based upon this property of thermoplastic polymer materials, heatbonding processes may be utilized to form a heatbond that joins portions of composite elements, such as non-woven textile 100 and component 120. As utilized herein, the term "heatbonding" or variants thereof is defined as a securing technique between two elements that involves a softening or melting of a thermoplastic polymer material within at least one of the elements such that the materials of the elements are secured to each other when cooled. Similarly, the term "heatbond" or variants thereof is defined as the bond, link, or structure that joins two elements through a process that involves a softening or melting of a thermoplastic polymer material within at least one of the elements such that the materials of the elements are secured to each other when cooled. As examples, heatbonding may involve (a) the melting or softening of two elements incorporating thermoplastic polymer materials such that the thermoplastic polymer materials intermingle with each other (e.g., diffuse across a boundary layer between the thermoplastic polymer materials) and are secured together when cooled; (b) the melting or softening of a first textile element incorporating a thermoplastic polymer material such that the thermoplastic polymer material extends into or infiltrates the structure of a second textile element (e.g., extends around or bonds with filaments or fibers in the second textile element) to secure the textile elements together when cooled; and (c) the melting or softening of a textile element incorporating a thermoplastic polymer material such that the thermoplastic polymer material extends into or infiltrates crevices or cavities formed in another element (e.g., polymer foam or sheet, plate, structural device) to secure the elements together when cooled. Heatbonding may occur when only one element includes a thermoplastic polymer material or when both elements include thermoplastic polymer materials. Additionally, heatbonding does not generally involve the use of stitching or adhesives, but involves directly bonding elements to each other with heat. In some situations, however, stitching or adhesives may be utilized to supplement the heatbond or the joining of elements through heatbonding. A needlepunching process may also be utilized to join the elements or supplement the heatbond.

Although a heatbonding process may be utilized to form a heatbond that joins non-woven textile 100 and component 120, the configuration of the heatbond at least partially depends upon the materials and structure of component 120. As a first example, if component 120 is at least partially formed from a thermoplastic polymer material, then the thermoplastic polymer materials of non-woven textile 100 and component 120 may intermingle with each other to secure non-woven textile 100 and component 120 together when cooled. If, however, the thermoplastic polymer material of component 120 has a melting point that is significantly higher than the thermoplastic polymer material of non-woven textile 100, then the thermoplastic polymer material of non-woven textile 100 may extend into the structure, crevices, or cavities of component 120 to secure the elements together when cooled. As a second example, component 120 may be formed from a textile that does not include a thermoplastic polymer material, and the thermoplastic polymer material of non-woven textile 100 may extend around or bond with filaments in component 120 to secure the textile elements together when cooled. As a third example, component 120 may be a polymer foam material, polymer sheet, or plate that includes a thermoplastic polymer material, and the thermoplastic polymer materials of non-woven textile 100 and component 120 may intermingle with each other to secure non-woven textile 100 and component 120 together when cooled. As a fourth example, component 120 may be a polymer foam material, polymer sheet, or plate that does not include a thermoplastic polymer material, and the thermoplastic polymer material of non-woven textile 100 may extend into or infiltrate crevices or cavities within component 120 to secure the elements together when cooled. Referring to FIG. 11, a plurality of heatbond elements 105 (e.g., the thermoplastic polymer material from one or both of non-woven textile 100 and component 120) are depicted as extending between non-woven textile 100 and component 120 to join the elements together. Accordingly, a heatbond may be utilized to join non-woven textile 100 and component 120 even when component 120 is formed from a diverse range of materials or has one of a variety of structures.

Figure 12A:
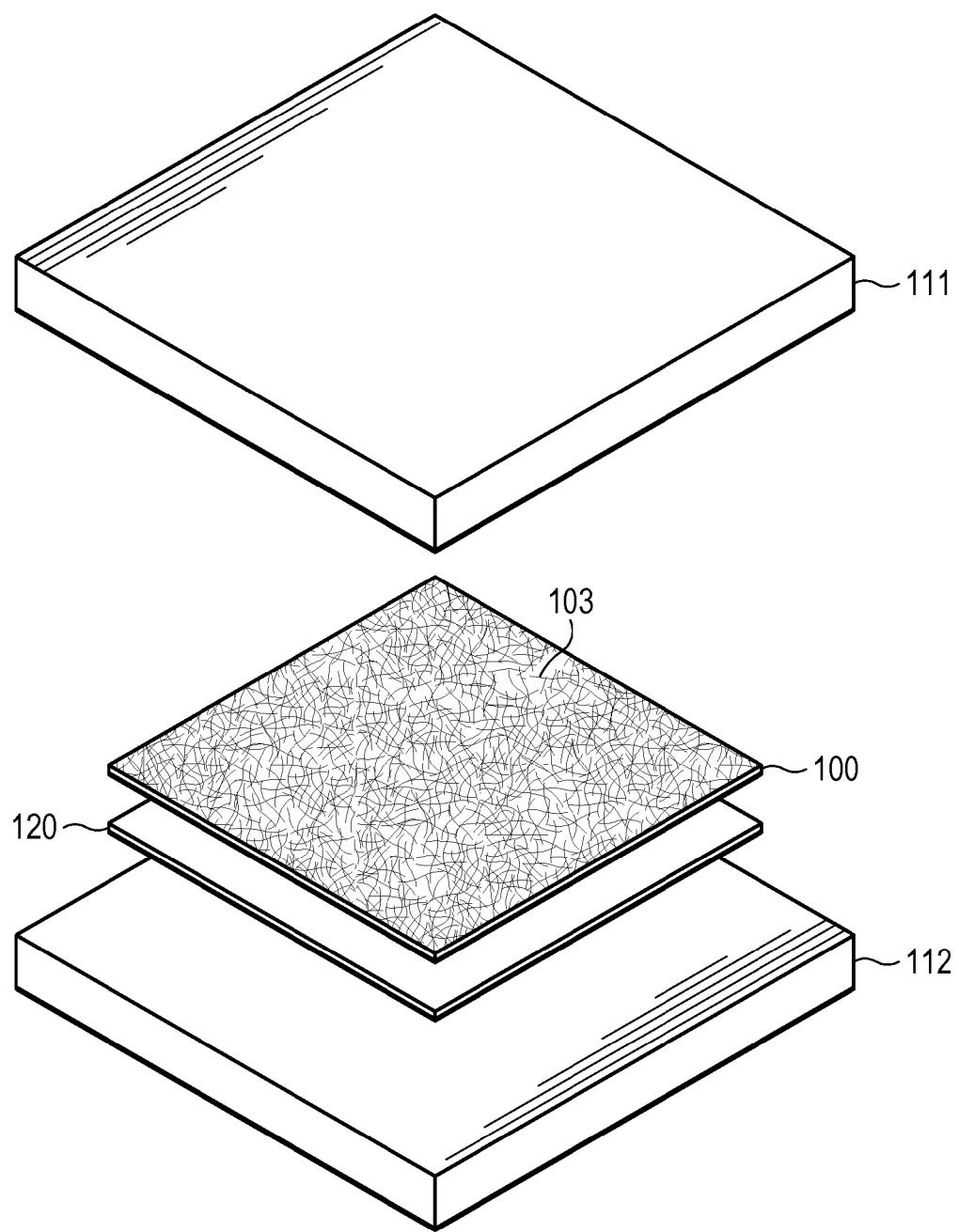
FIGS. 12A-12C are perspective views of a process for forming the composite element.
Figure 12B:
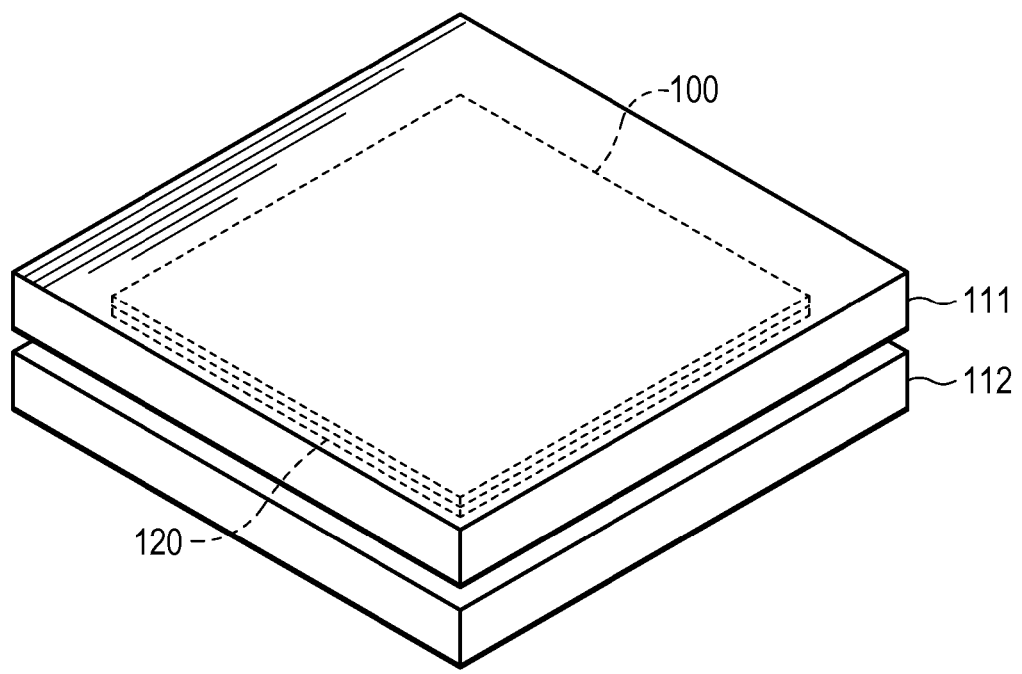
Figure 12C:
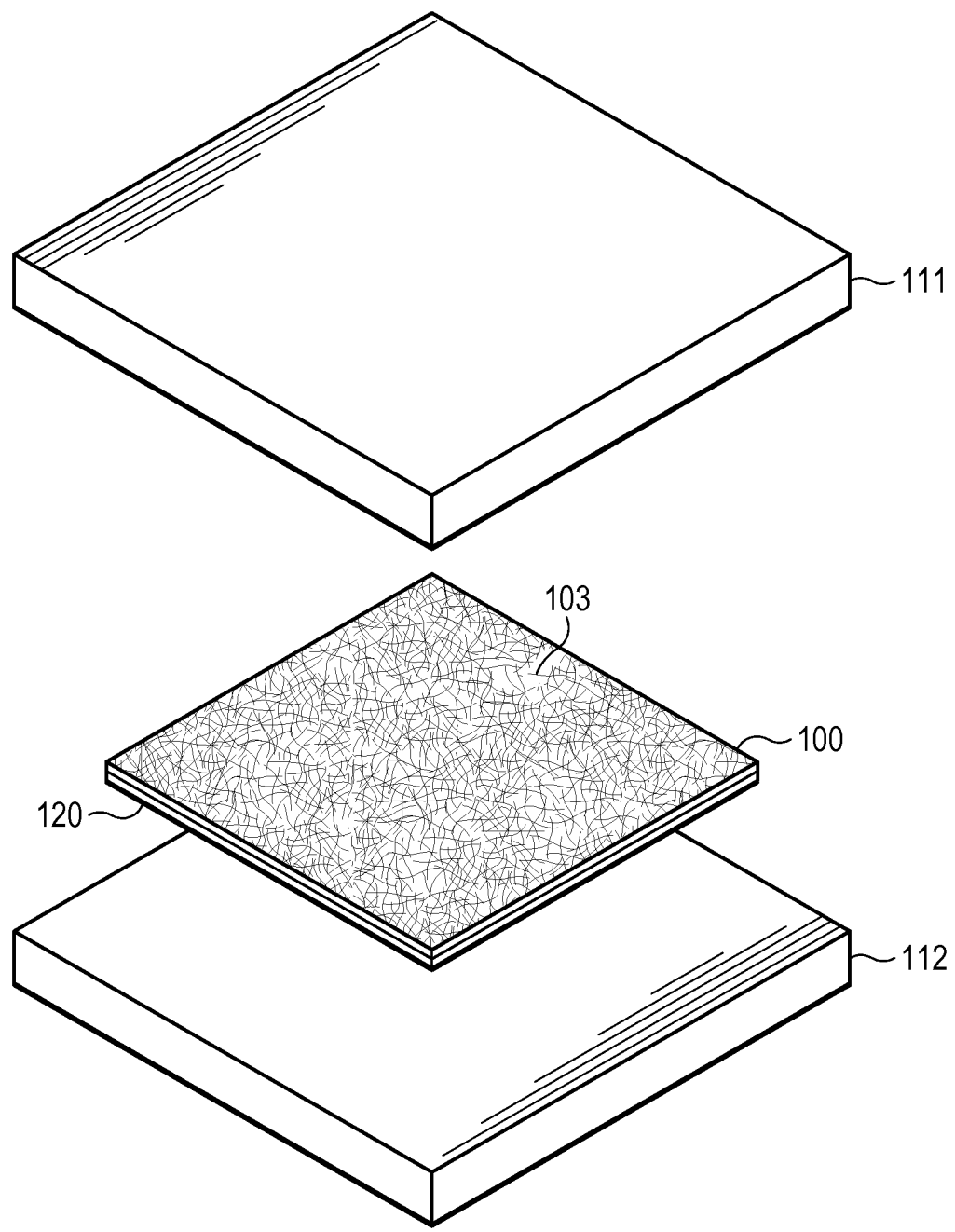

A general manufacturing process for forming a composite element will now be discussed with reference to FIGS. 12A-12C. Initially, non-woven textile 100 and component 120 are located between first plate 111 and second plate 112, as depicted in FIG. 12A. Plates 111 and 112 then translate or otherwise move toward each other in order to compress or induce contact between non-woven textile 100 and component 120, as depicted in FIG. 12B. In order to form the heatbond and join non-woven textile 100 and component 120, heat is applied to non-woven textile 100 and component 120. That is, the temperatures of non-woven textile 100 and component 120 are elevated to cause softening or melting of the thermoplastic polymer material at the interface between non-woven textile 100 and component 120. Depending upon the materials of both non-woven textile 100 and component 120, as well as the overall configuration of component 120, only first plate 111 may be heated, only second plate 112 may be heated, or both plates 111 and 112 may be heated so as to elevate the temperatures of non-woven textile 100 and component 120 through conduction. Upon separating plates 111 and 112, as depicted in FIG. 12C, the composite element formed from both non-woven textile 100 and component 120 may be removed and permitted to cool.

The manufacturing process discussed relative to FIGS. 12A-12C generally involves (a) forming non-woven textile 100 and component 120 separately and (b) subsequently joining non-woven textile 100 and component 120 to form the composite element. Although the general process discussed above may be utilized to form a composite element from non-woven textile 100 and component 120, other methods may also be utilized. As an example, a process wherein filaments 103 are deposited directly onto component 120 during the manufacture of non-woven textile 100 may be used. As a similar manufacturing process, material (e.g., foam, molten polymer, a coating) may be sprayed, deposited, or otherwise applied to a surface of non-woven textile 100 to form the composite element. Moreover, a composite element that includes two or more layers of non-woven textile 100 may be formed by repeatedly depositing layers of filaments 103. When each of the layers of filaments 103 have different properties or are formed from different polymer materials, the resulting composite element may have the combined properties of the various layers. Rather than heating non-woven textile 100 and component 120 through conduction, other methods that include radio frequency heating or chemical heating may be utilized. In some processes, second surface 102 and a surface of component 120 may be heated through radiant heating prior to being compressed between plates 111 and 112. An advantage of utilizing radiant heating to elevate the temperature of only the surfaces forming the heatbond is that the thermoplastic polymer material within other portions of non-woven textile 100 and component 120 are not heated significantly. In some processes, stitching or adhesives may also be utilized between non-woven textile 100 and component 120 to supplement the heatbond.

Figure 13:
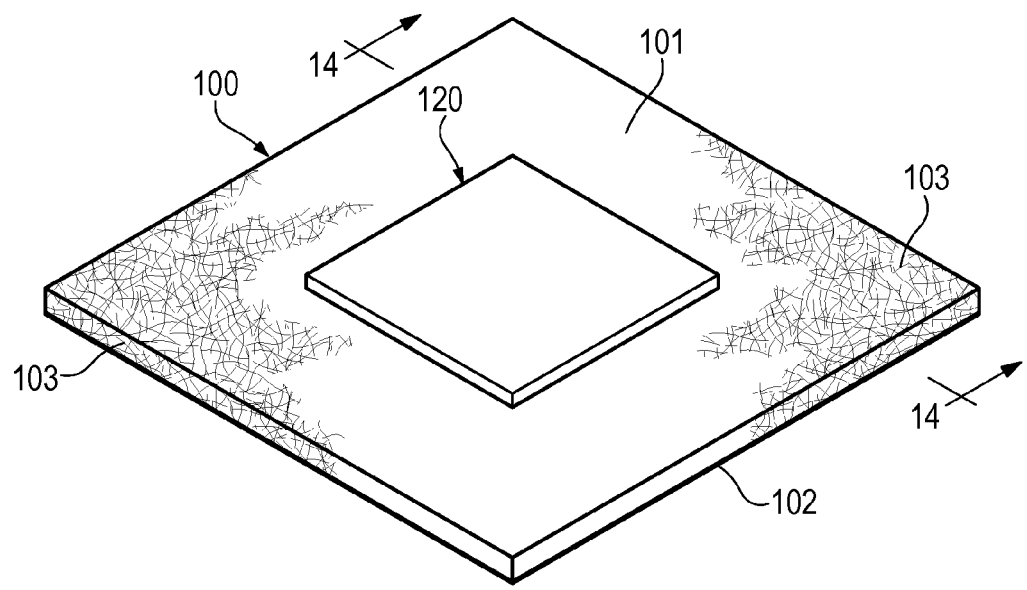
FIG. 13 is a perspective view of another configuration of the composite element.
Figure 14:
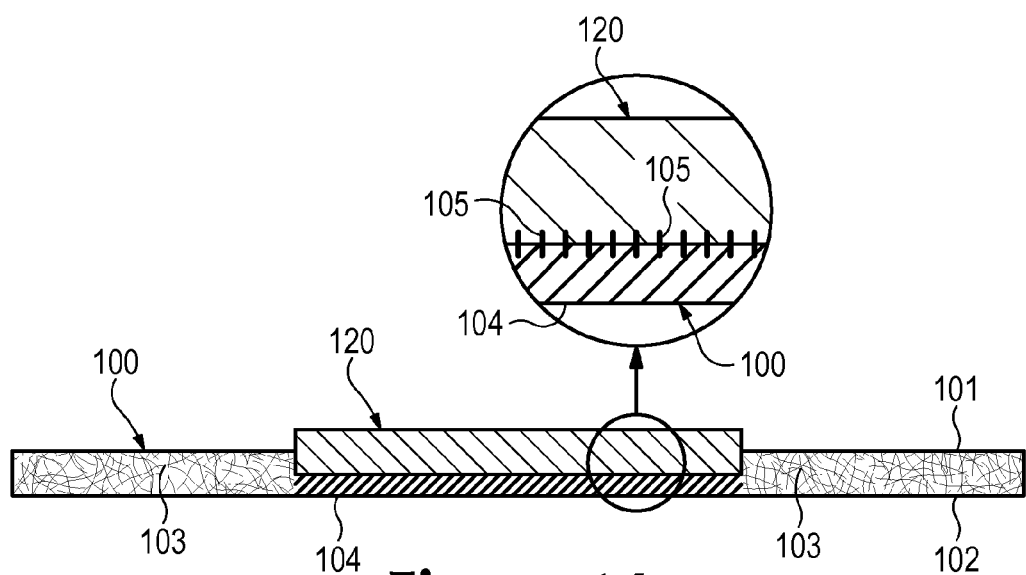
FIG. 14 is a cross-sectional view of the composite element, as defined by section line 14 in FIG. 13.

Non-woven textile 100 is depicted in FIGS. 10-12C as having a configuration that does not include fused regions 104. In order to impart varying properties to a composite element, fused regions 104 may be formed in non-woven textile 100. In some processes fused regions 104 may be formed prior to joining non-woven textile 100 with another component (e.g., component 120). In other processes, however, fused regions 104 may be formed during the heatbonding process or following the heatbonding process. Referring to FIGS. 13 and 14, another configuration of the composite element is depicted, wherein non-woven textile 100 has a greater area than component 120. As depicted in FIG. 14, however, the area of non-woven textile 100 where component 120 is heatbonded forms a fused region 104. In some manufacturing processes, therefore, fused regions 104 may be formed in areas where composite element 120 is heatbonded to non-woven textile 100. Accordingly, fused regions 104 may be formed in the manufacturing process for composite elements.

VI—Layered Configurations

Figure 15:
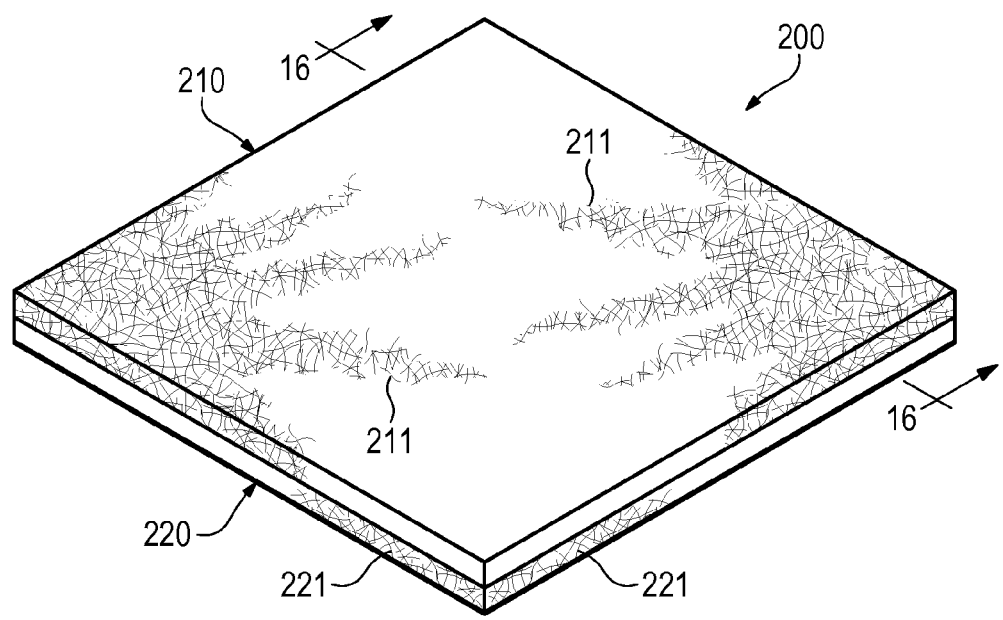
FIG. 15 is a perspective view of a layered non-woven textile.
Figure 16:
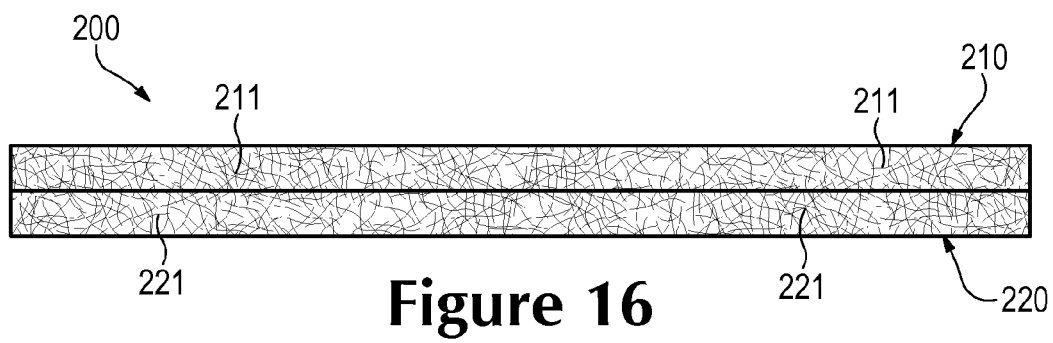
FIG. 16 is a cross-sectional view of the layered non-woven textile, as defined by section line 16 in FIG. 15.

A layered non-woven textile 200 is depicted in FIGS. 15 and 16 as including a first layer 210 and a second layer 220. First layer 210 is formed from a plurality of first filaments 211, and second layer 220 is formed from a plurality of second filaments 221. Individually, each of layers 210 and 220 have the general configuration of non-woven textile 100. Accordingly, the above discussion regarding the properties and configurations of non-woven textile 100 also applies to each of layers 210 and 220, as well as layered non-woven textile 200 generally.

Filaments 211 and 221 are formed from thermoplastic polymer materials. Notably, the melting temperature of the thermoplastic polymer material forming first filaments 211 is lower than the melting temperature of the thermoplastic polymer material forming second filaments 221. Accordingly, the thermoplastic polymer material in first layer 210 melts at a lower temperature than the thermoplastic polymer material in second layer 220. The thermoplastic polymer materials forming filaments 211 and 221 may be selected to have a difference in melting temperatures that ranges from 5 degrees centigrade to 100 degrees centigrade or more. As an example, the thermoplastic polymer material forming first filaments 211 may have a melting temperature of 140 degrees centigrade, whereas the thermoplastic polymer material forming second filaments 221 may have a higher melting temperature of 170 degrees centigrade, although the specific melting temperatures that are selected for the thermoplastic polymer materials may vary greatly depending upon the product or application utilizing or incorporating non-woven textile 200.

As noted above, each of layers 210 and 220 have the general configuration of non-woven textile 100. As such, first filaments 211 are distributed randomly throughout first layer 210 and are bonded, fused, interlocked, or otherwise joined to form a structure with a relatively constant thickness. Similarly, second filaments 221 are distributed randomly throughout second layer 220 and are bonded, fused, interlocked, or otherwise joined to form a structure with a relatively constant thickness. Additionally, the above discussion regarding the properties and configurations of filaments 103 also applies to each of filaments 211 and 221

A variety of conventional processes may be utilized to manufacture layered non-woven textile 200. In general, a manufacturing process for layered non-woven textile 200 includes (a) selecting melting temperatures for the thermoplastic polymer materials of filaments 211 and 221, (b) extruding or otherwise forming a plurality of first filaments 211 from a first thermoplastic polymer material, (c) collecting, laying, or otherwise depositing first filaments 211 upon a surface, such as a moving conveyor, to form first layer 210 (d) extruding or otherwise forming a plurality of second filaments 221 from a second thermoplastic polymer material, (e) collecting, laying, or otherwise depositing second filaments 221 upon first layer 210, and (f) imparting a desired thickness through compressing or other processes. Because filaments 211 and 221 may be relatively soft or partially melted when deposited, the polymer materials from filaments 211 and 221 that contact each other may become bonded or fused together upon cooling.

Following the general manufacturing process discussed above, various post-processing operations may be performed on layered non-woven textile 200. For example, embossing or calendaring processes may be utilized to ensure that layered non-woven textile 200 has a substantially constant thickness, impart texture to one or both surfaces, or further bond or fuse filaments 211 and 221. Coatings may also be applied to layered non-woven textile 200. Furthermore, hydrojet, hydroentanglement, needlepunching, or stitchbonding processes may also be utilized to modify properties of layered non-woven textile 200. Each of layers 210 and 220 may be formed as a spunbonded or meltblown material, or may be formed as combinations of spunbonded and meltblown materials.

The overall thickness of layered non-woven textile 200 may vary significantly. With reference to the various figures, the thickness of layered non-woven textile 200 and other elements may be amplified or otherwise increased to show details or other features associated with layered non-woven textile 200, thereby providing clarity in the figures. For many applications, however, a thickness of layered non-woven textile 200 may be in a range of 1.0 millimeters to 20.0 millimeters, but may vary considerably beyond this range. For many articles of apparel, for example, a thickness of 1.0 to 6.0 millimeters may be appropriate, although other thicknesses may be utilized. As discussed in greater detail below, regions of layered non-woven textile 200 may be formed such that the thermoplastic polymer material forming filaments 211 and 221 is fused to a greater degree than in other regions, and the thickness of layered non-woven textile 200 in the fused regions may be substantially reduced. Accordingly, the thickness of layered non-woven textile 200 may vary considerably.

VII—Fused Regions in Layered Non-Woven Textile

Figure 17:
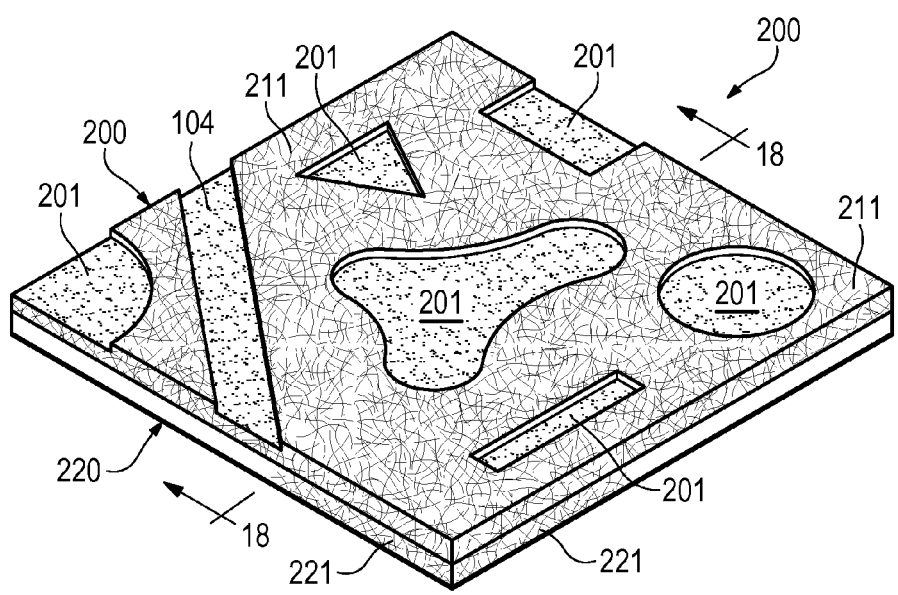
FIG. 17 is a perspective view of the layered non-woven textile with a plurality of fused regions.
Figure 18:
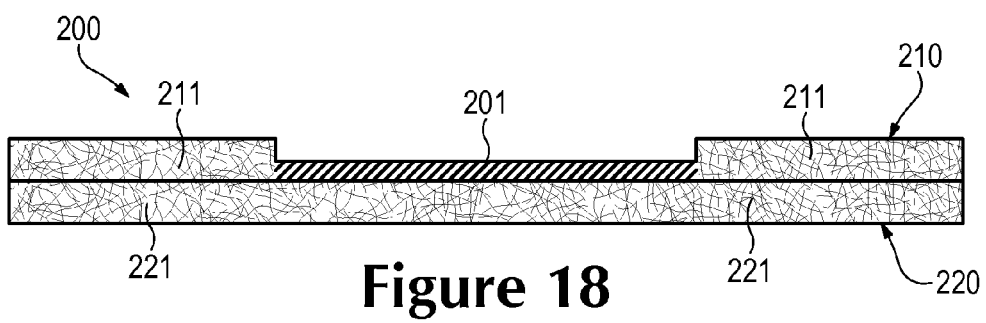
FIG. 18 is a cross-sectional view of the layered non-woven textile with fused regions, as defined by section line 18 in FIG. 17

Layered non-woven textile 200 is depicted as including various fused regions 201 in FIGS. 17 and 18. Fused regions 201 are similar to fused regions 104 in non-woven textile 100. As such, fused regions 201 are portions of layered non-woven textile 200 that have been subjected to heat in order to selectively change the properties of those fused regions 201. Layered non-woven textile 200, or at least the various filaments 211 and 221, are discussed above as including thermoplastic polymer materials. When exposed to sufficient heat, the thermoplastic polymer materials transition from a solid state to either a softened state or a liquid state. When sufficiently cooled, the thermoplastic polymer materials then transition back from the softened state or the liquid state to the solid state. Layered non-woven textile 200 or regions of layered non-woven textile 200 may, therefore, be exposed to heat in order to soften or melt the various filaments 211 and 221. As discussed in greater detail below, exposing various regions (i.e., fused regions 201) to heat may be utilized to selectively change the properties of those regions. Although discussed in terms of heat alone, pressure may also be utilized either alone or in combination with heat to form fused regions 201, and pressure may be required in some configurations of layered non-woven textile 200 to form fused regions 201.

As discussed above, the melting temperature of the thermoplastic polymer material forming first filaments 211 is lower than the melting temperature of the thermoplastic polymer material forming second filaments 221. This configuration permits the formation of fused regions 201 in first layer 210, while not significantly changing the properties of a corresponding area in second layer 220. Referring to FIG. 18, for example, fused region 201 is a non-filamentous portion of first layer 210, while the various second filaments 221 of second layer 220 remain filamentous. That is, second layer 220 includes a filamentous region adjacent to fused region 201 formed in first layer 210. By selecting the thermoplastic polymer material in first layer 210 to melt at a lower temperature than the thermoplastic polymer material in second layer 220, areas of layered non-woven textile 200 may have properties of a non-filamentous area (i.e., the fused region 201 of first layer 210) and properties of a filamentous area (i.e., the adjacent area of second layer 220). Accordingly, the different melting temperatures provides a configuration wherein fused regions 201 may be formed only in first layer 210.

As with fused regions 104, fused regions 201 may exhibit various shapes, including a variety of geometrical shapes (e.g., circular, elliptical, triangular, square, rectangular) or a variety of non-defined, irregular, or otherwise non-geometrical shapes. The positions of fused regions 201 may be spaced inward from edges of layered non-woven textile 200, located on one or more edges of layered non-woven textile 200, or located at a corner of layered non-woven textile 200. The shapes and positions of fused regions 201 may also be selected to extend across portions of layered non-woven textile 200 or between two edges of layered non-woven textile 200. Whereas the areas of some fused regions 201 may be relatively small, the areas of other fused regions 201 may be relatively large. Accordingly, the shapes, positions, sizes, and other aspects of fused regions 201 may vary significantly.

Although the sizes of fused regions 201 may vary significantly, many or all of fused regions 201 may have a continuous area of at least one square centimeter. As noted above, various embossing or calendaring processes may be utilized during the manufacturing process for layered non-woven textile 200. Some embossing or calendaring processes may form a plurality of relatively small areas (i.e., one to ten square millimeters) where filaments 211 and 221 are somewhat fused to each other. In contrast with the areas formed by embossing or calendaring, some of fused regions 201 have a larger continuous area of at least one square centimeter. As utilized herein, "continuous area" or variants thereof is defined as a relatively unbroken or uninterrupted region. That is, a continuous area is a single, discrete area of fused region 201, rather than a combination of separate areas of fused regions 201.

When exposed to sufficient heat, and possibly pressure, the thermoplastic polymer material of first filaments 211 transitions from a solid state to either a softened state or a liquid state. Depending upon the degree to which first filaments 211 change state, the various first filaments 211 within fused regions 201 may (a) remain in a filamentous configuration, (b) melt entirely into a liquid that cools into a non-filamentous configuration, or (c) take an intermediate configuration wherein some first filaments 211 or portions of individual first filaments 211 remain filamentous and other first filaments 211 or portions of individual first filaments 211 become non-filamentous. Accordingly, although first filaments 211 in fused regions 201 are generally fused to a greater degree than first filaments 211 in other areas of layered non-woven textile 200, the degree of fusing in fused regions 201 may vary significantly.

Figure 19A:
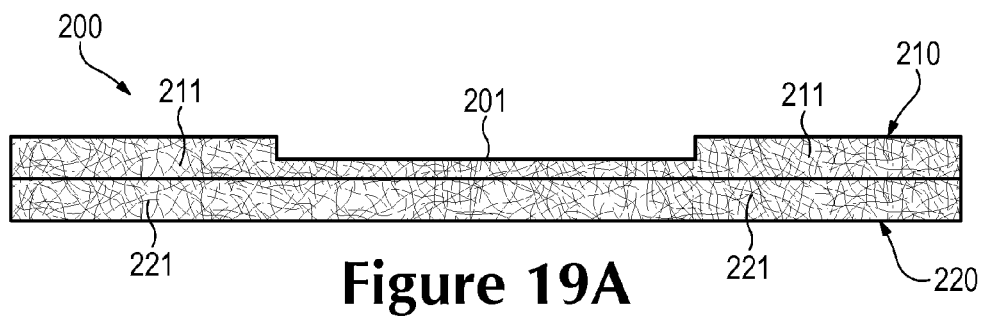
FIGS. 19A-19D are cross-sectional views corresponding with FIG. 18 and depicting further configurations of the layered non-woven textile with fused regions.
Figure 19B:
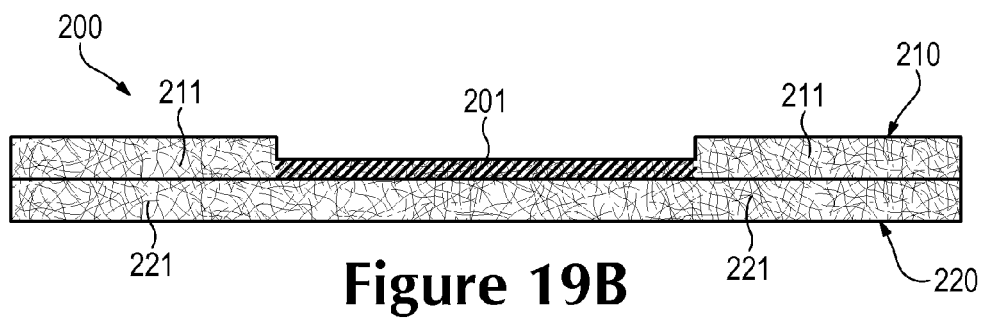

Differences between the degree to which first filaments 211 may be fused in fused regions 201 are depicted in FIGS. 18, 19A, and 19B. Referring specifically to FIG. 18, the various first filaments 211 within fused region 201 melted entirely into a liquid that cools into a non-filamentous configuration. That is, the thermoplastic polymer material from first filaments 211 melted into a non-filamentous state that effectively forms a solid polymer sheet in fused region 201, with none of the individual first filaments 211 being identifiable. Referring specifically to FIG. 19A, first filaments 211 remain in a filamentous configuration. That is, the thermoplastic polymer material forming first filaments 211 remains in the configuration of a filament and individual first filaments 211 remain identifiable. Referring specifically to FIG. 19B, the various first filaments 211 remain in a partially-filamentous configuration. That is, some of the thermoplastic polymer material forming first filaments 211 remains in the configuration of a filament, and some of the thermoplastic polymer material from first filaments 211 melted into a non-filamentous state that effectively forms a solid polymer sheet in fused region 201. The configuration of the thermoplastic polymer material from first filaments 211 in fused regions 201 may, therefore, be filamentous, non-filamentous, or any combination or proportion of filamentous and non-filamentous. Accordingly, the degree of fusing in each of fused regions 201 may vary along a spectrum that extends from filamentous on one end to non-filamentous on an opposite end. Many of the factors and processes discussed above for non-woven textile 100 may determine the degree to which first filaments 211 are fused within fused regions 201.

Figure 19C:
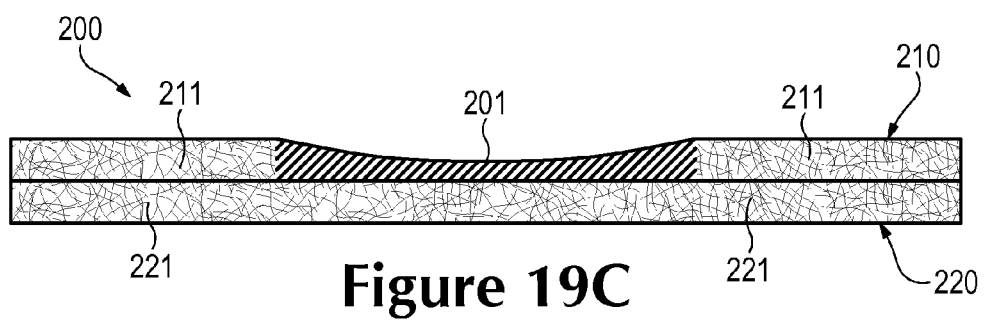
Figure 19D:
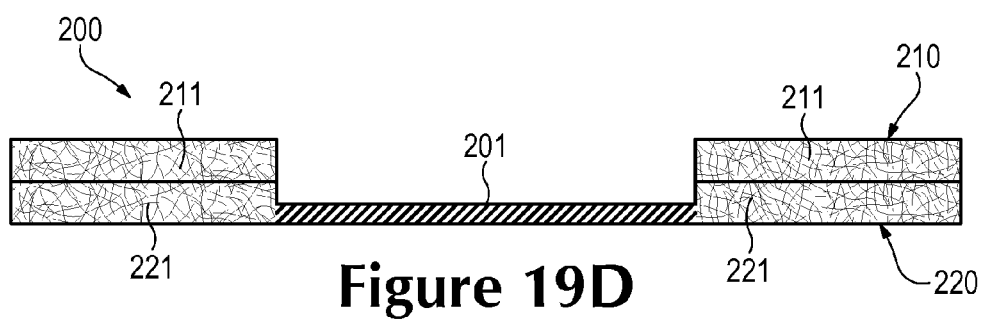

The configuration of fused regions 201 may vary considerably. For example, any of the configurations discussed above for non-woven textile 100 in FIGS. 6A-6F may also be applied to fused region 201. As an example, FIG. 19C shows a configuration similar to FIG. 6C, wherein fused region 201 has a curved or more gradual transition. In each of the configurations discussed above, second layer 220 includes a filamentous region adjacent to fused region 201 in first layer 210. That is, second layer 220 remained filamentous following the formation of fused region 201 in first layer 201. Depending upon the degree of heat and pressure applied to layered non-woven textile 200, however, fused region 201 may also be formed in second layer 220. Referring to FIG. 19D, fused region 201 forms a non-filamentous area in both layers 210 and 220 of layered non-woven textile 200.

Each of the techniques discussed above in reference to FIGS. 7A-7C, 8A-8C, and 9 may be utilized to form fused regions 201. In general, therefore, heat and pressure are applied to areas of layered non-woven textile 200 to form fused regions 201. Given that the melting temperatures for the thermoplastic polymer materials in layers 210 and 220 are different, varying the temperature utilized during the formation of fused regions 201 may result in different configurations for fused region 201. For example, when the temperature utilized to form fused regions 201 is higher than the melting temperature of first layer 210 and lower than the melting temperature of second layer 220, the configuration of FIGS. 18 and 19A-19C may be formed. However, when the temperature utilized to form fused regions 201 is higher than the melting temperatures of both layers 210 and 220, the configuration of FIG. 19D may be formed.

The properties of fused regions 201 may be different than the properties of other regions of layered non-woven textile 200. As with non-woven textile 100, examples of properties that may be varied through the addition or the configuration of fused regions 201 include permeability, durability, stretch-resistance, density, transparency, color, recovery after stretch, and flexibility.

VIII—Composite Elements with Layered Non-Woven Textile

Layered non-woven textile 200 may be joined with various strands, textiles, materials, or other components to form composite elements. By joining layered non-woven textile 200 with other components, properties of both layered non-woven textile 200 and the other components are combined in the composite elements.

Figure 20:
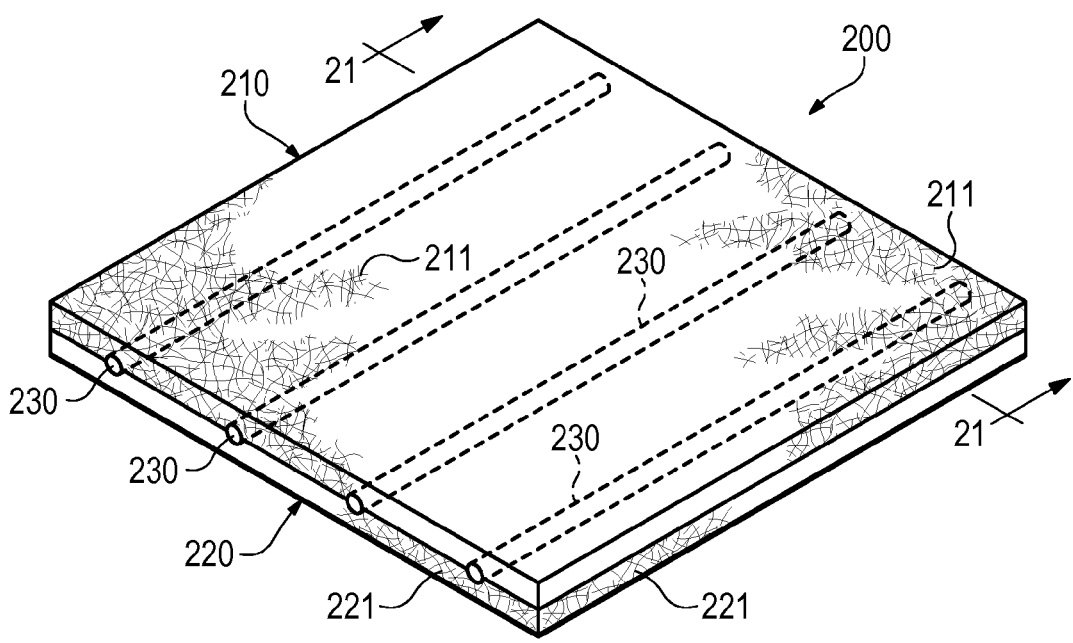
FIG. 20 is a perspective view of a first composite element formed with the layered non-woven textile.
Figure 21:
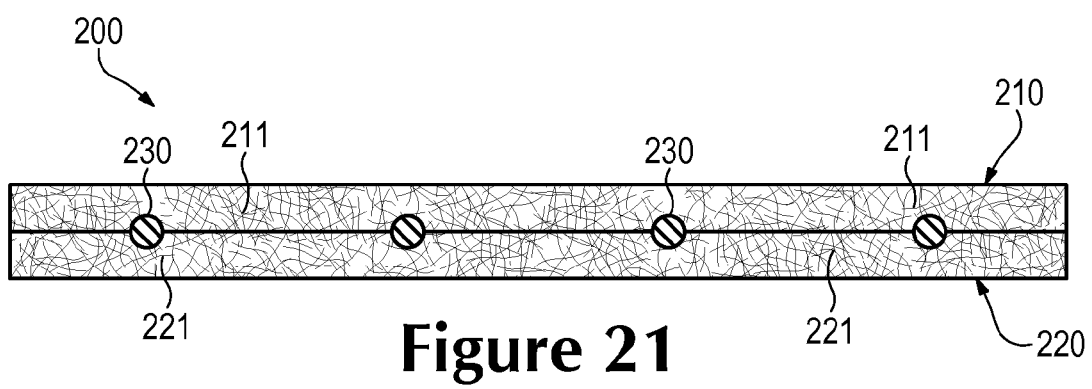
FIG. 21 is a cross-sectional view of the first composite element formed with the layered non-woven textile, as defined by section line 21 in FIG. 20.

An example of a composite element is depicted in FIGS. 20 and 21, in which various strands 230 are embedded within layered non-woven textile 200 and extend substantially parallel to layers 210 and 220 for a distance of at least five centimeters. Strands 230 extend in a direction that is substantially parallel to either of layers 210 and 220. Referring to the cross-section of FIG. 21, strands 230 are positioned between layers 210 and 230, but may be within either of layers 210 and 220. More particularly, strands 230 may be located upon a surface of layered non-woven textile 200, strands 230 may be embedded within first layer 210, or strands 230 may be embedded within second layer 220. A heatbonding process may be utilized to secure strands 230 within layered non-woven textile 200. That is, the thermoplastic polymer material of first layer 210, for example, may be softened or melted to form a heatbond that joins strands 230 to layered non-woven textile 200.

As noted above, strands 230 extend substantially parallel to layers 210 and 220 for a distance of at least five centimeters. An advantage of this configuration is that strands 230 may effectively limit stretch in directions in which they extend. Bends, zigs, stitches, and other elements that interrupt the straight aspect of strands 230 may limit the ability of strands 230 to provide stretch-resistance. Accordingly, by extending strands substantially parallel to layers 210 and 220 for distances of at least five centimeters, their ability to limit stretch is enhanced.

Strands 230 may be formed from any generally one-dimensional material exhibiting a length that is substantially greater than a width and a thickness. Depending upon the material utilized and the desired properties, strands 230 may be individual filaments, yarns that include a plurality of filaments, or threads that include a plurality of yarns. Suitable materials for strands 230 include rayon, nylon, polyester, polyacrylic, silk, cotton, carbon, glass, aramids (e.g., para-aramid fibers and meta-aramid fibers), ultra high molecular weight polyethylene, and liquid crystal polymer, for example. In some configurations, strands 230 may also be metal wires or cables.

In comparison with the thermoplastic polymer materials forming layered non-woven textile 200, many of the materials noted above for strands 230 exhibit greater tensile strength and stretch-resistance. That is, strands 230 may be stronger than layered non-woven textile 200 and may exhibit less stretch than layered non-woven textile 200 when subjected to a tensile force. The combination of layered non-woven textile 200 and strands 230 imparts a structure wherein the composite element may stretch in one direction and is substantially stretch-resistant and has more strength in another direction.

Strands 230 are depicted as being substantially parallel to each other in FIG. 20. In other composite element configurations, strands 230 may be arranged in other orientations and may extend entirely or only partially across layered non-woven textile 200. As examples, strands 230 may cross each other, strands 230 may cross each other at right angles, strands 230 may radiate outward from a central point, ends of strands 230 may be spaced inward from edges of layered non-woven textile 200, or strands 230 may be curved or may have a wavy configuration.

Figure 22:
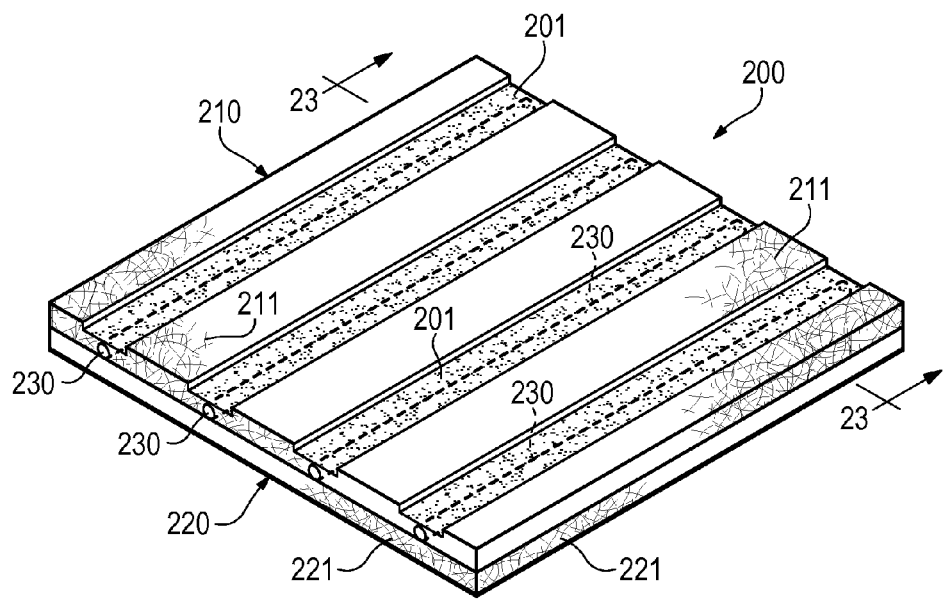
FIG. 22 is a perspective view of a second composite element formed with the layered non-woven textile.
Figure 23:
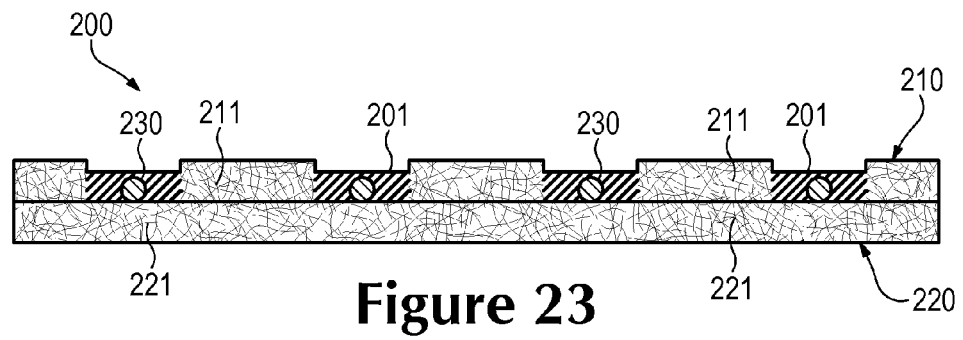
FIG. 23 is a cross-sectional view of the second composite element formed with the layered non-woven textile, as defined by section line 23 in FIG. 22.

In some configurations of the composite element, fused regions 201 may be added to further affect the properties of the composite element. Referring to FIGS. 22 and 23, fused regions 201 extend across layered non-woven textile 200 in the areas of strands 230. Given that fused regions 201 may exhibit more stretch-resistance than other areas of layered non-woven textile 200, the fused regions in FIGS. 22 and 23 may impart additional stretch-resistance in the direction of strands 230. Moreover, fused regions 201 may assist with securing strands 230 within layered non-woven textile 200. Note also that strands 230 are depicted as being embedded within first layer 210 in FIGS. 22 and 23.

Figure 24:
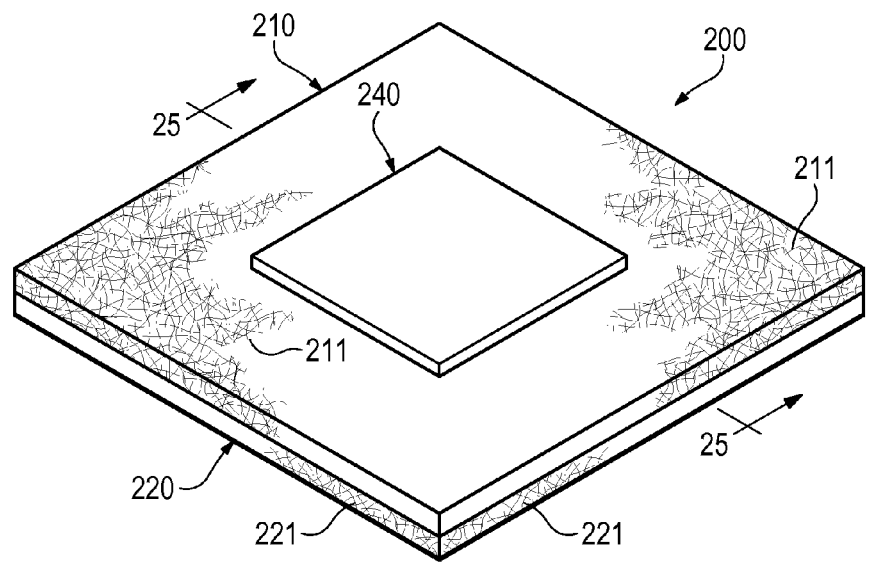
FIG. 24 is a perspective view of a third composite element formed with the layered non-woven textile.
Figure 25:
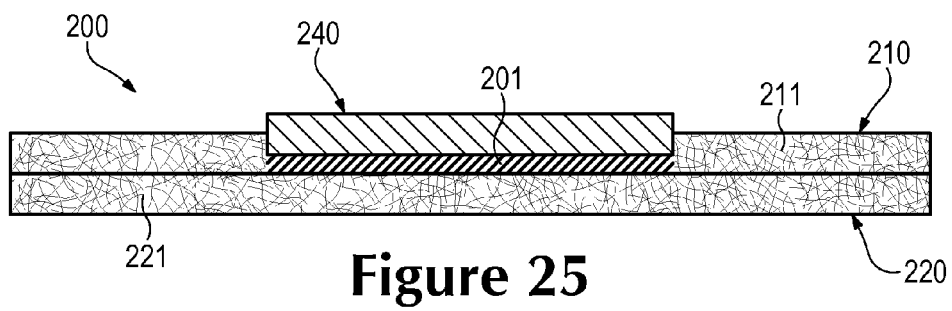
FIG. 25 is a cross-sectional view of the third composite element formed with the layered non-woven textile, as defined by section line 25 in FIG. 24.

Another example of a composite element is depicted in FIGS. 24 and 25, wherein a component 240 is secured to layered non-woven textile 200. This configuration is similar to the composite element disclosed above with reference to FIGS. 10, 11, 13, and 14, except that component 240 is secured to layered non-woven textile 200. By joining layered non-woven textile 200 with component 240, properties of both layered non-woven textile 200 and component 240 are combined in the composite element.

The thermoplastic polymer material in first filaments 211 may be utilized to secure component 240 to layered non-woven textile 200. As discussed above, a thermoplastic polymer material melts when heated and returns to a solid state when cooled sufficiently. Based upon this property of thermoplastic polymer materials, heatbonding processes may be utilized to form a heatbond that joins portions of composite elements, such as layered non-woven textile 200 and component 240. As such, the general manufacturing process discussed with reference to FIGS. 12A-12C may be utilized.

Figure 26:
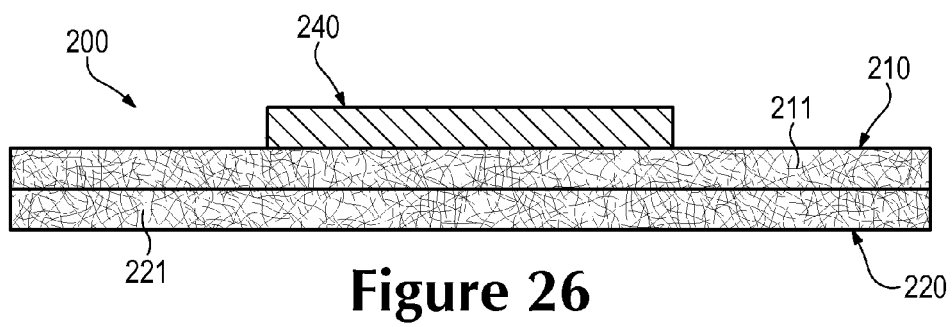
FIG. 26 is a cross-sectional view corresponding with FIG. 25 and depicting another configuration of the third composite element formed with the layered non-woven textile.

Fused regions 201 may be formed in the area where component 240 is secured to layered non-woven textile 200. Referring to FIG. 25, a non-filamentous configuration of fused region 201 is positioned to correspond with the attachment site for component 240. In some processes fused regions 201 may be formed prior to joining component 240 to layered non-woven textile 200. In other processes, however, fused regions 201 may be formed during the heatbonding process that joins component 240 to layered non-woven textile 200 or following the heatbonding process. Referring to FIG. 26, another configuration of the composite element is depicted, wherein layered non-woven textile 200 does not have a fused region 201 in the area where component 240 is joined to layered non-woven textile 200.

IX—Product Configurations

Layered non-woven textile 200, multiple elements of layered non-woven textile 200, or various composite element configurations may be utilized in articles of apparel (e.g., shirts, jackets and other outerwear, pants, footwear), containers, and upholstery for furniture. Various configurations of layered non-woven textile 200 may also be utilized in bed coverings, table coverings, towels, flags, tents, sails, and parachutes, as well as industrial purposes that include automotive and aerospace applications, filter materials, medical textiles, geotextiles, agrotextiles, and industrial apparel. Accordingly, layered non-woven textile 200 may be utilized in a variety of products for both personal and industrial purposes.

Although layered non-woven textile 200 may be utilized in a variety of products, the following discussion provides examples of articles of apparel that incorporate layered non-woven textile 200. That is, the following discussion demonstrates various ways in which layered non-woven textile 200 may be incorporated into a shirt 300 and an article of footwear 400. Moreover, examples of various configurations of shirt 300 and footwear 400 are provided in order to demonstrate various concepts associated with utilizing layered non-woven textile 200 in products. Accordingly, while the concepts outlined below are specifically applied to various articles of apparel, the concepts may be applied to a variety of other products.

Figure 27A:
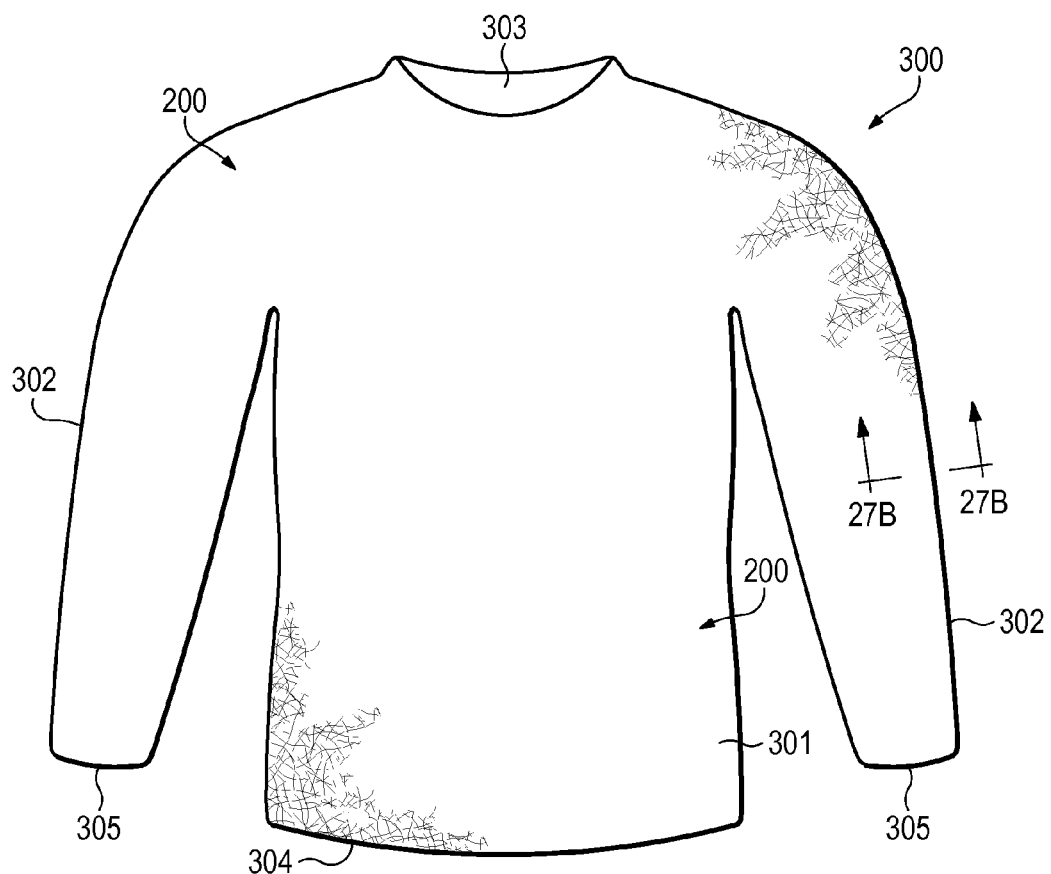
FIG. 27A is an elevational view of a first configuration of a shirt that incorporates the layered non-woven textile.
Figure 28A:
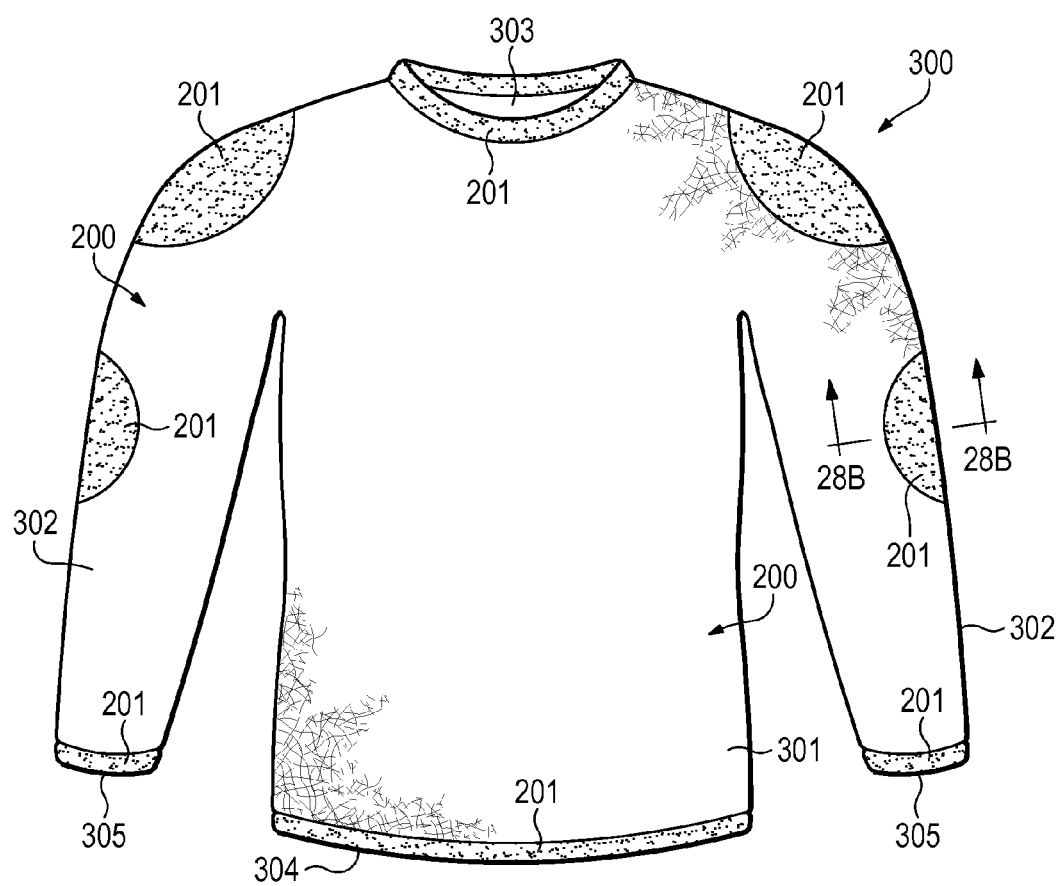
FIG. 28A is an elevational view of a second configuration of the shirt that incorporates the layered non-woven textile.
Figure 29A:
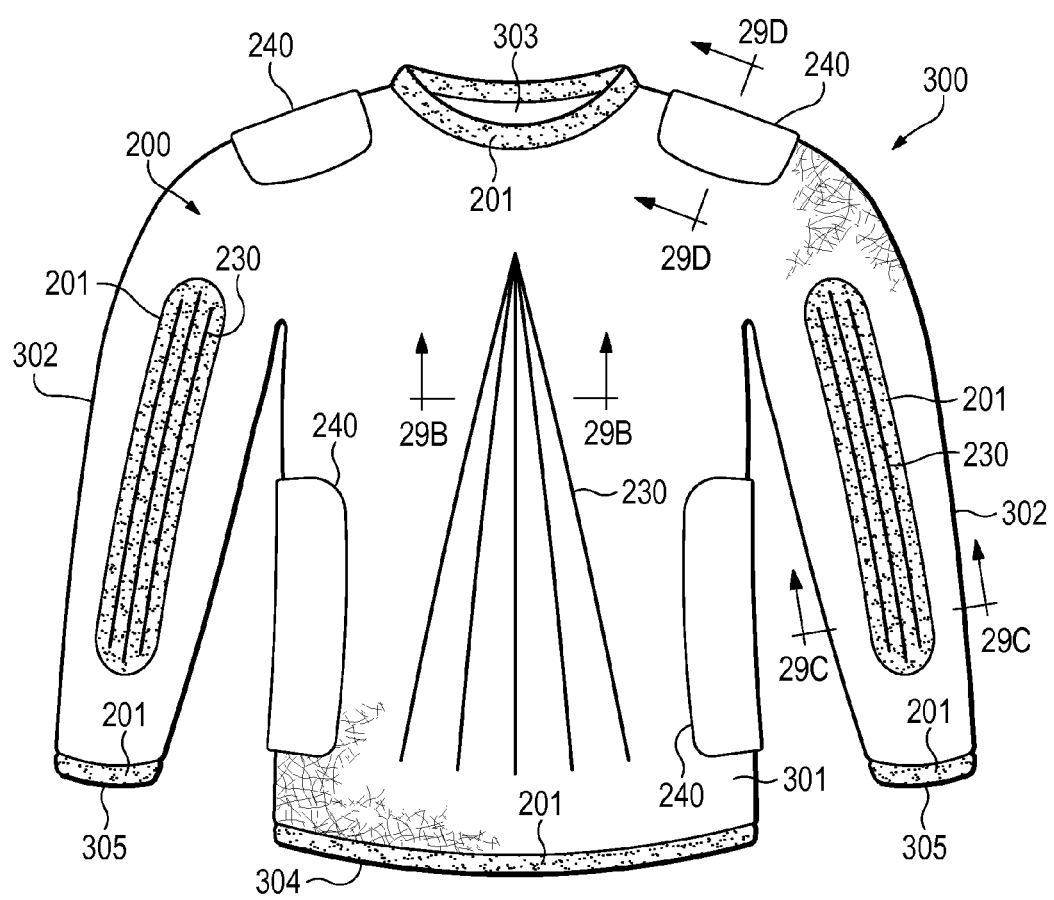
FIG. 29A is an elevational view of a third configuration of the shirt that incorporates the layered non-woven textile.

Various configurations of shirt 300 are depicted in FIGS. 27A, 28A, and 29A as including a torso region 301 and a pair of arm regions 302 that extend outward from torso region 301. Torso region 301 corresponds with a torso of a wearer and covers at least a portion of the torso when worn. An upper area of torso region 301 defines a neck opening 303 through which the neck and head of the wearer protrude when shirt 300 is worn. Similarly, a lower area of torso region 301 defines a waist opening 304 through which the waist or pelvic area of the wearer protrudes when shirt 300 is worn. Arm regions 302 respectively correspond with a right arm and a left arm of the wearer and cover at least a portion of the right arm and the left arm when shirt 300 is worn. Each of arm regions 302 define an arm opening 305 through which the hands, wrists, or arms of the wearer protrude when shirt 300 is worn. Shirt 300 has the configuration of a shirt-type garment, particularly a long-sleeved shirt. In general, shirt-type garments cover a portion of a torso of the wearer and may extend over arms of the wearer. In further examples, apparel having the general structure of shirt 300 may have the configuration of other shirt-type garments, including short-sleeved shirts, tank tops, undershirts, jackets, or coats. Concepts discussed in relation to shirt 300 may also be applied to other articles of apparel, such as jackets and other outerwear, pants, hats, gloves, undergarments, and socks, for example.

Figure 27B:
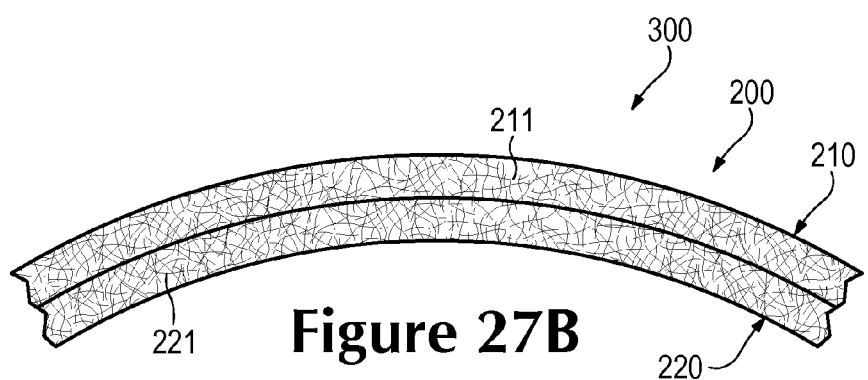
FIG. 27B is a cross-sectional view of the first configuration of the shirt, as defined by section line 27B in FIG. 27A.

A first configuration of shirt 300 is depicted in FIGS. 27A and 27B. A majority of shirt 300 is formed from layered non-woven textile 200. More particularly, torso region 301 and each of arm regions 302 are primarily formed from layered non-woven textile 200. Although shirt 300 may be formed from a single element of layered non-woven textile 200, shirt 300 is generally formed from multiple joined elements of layered non-woven textile 200. Referring to the cross-section of FIG. 27B, layered non-woven textile 200 is oriented such that first layer 210 forms an exterior surface of shirt 300, whereas second layer 220 forms an interior surface of shirt 300.

Figure 28B:
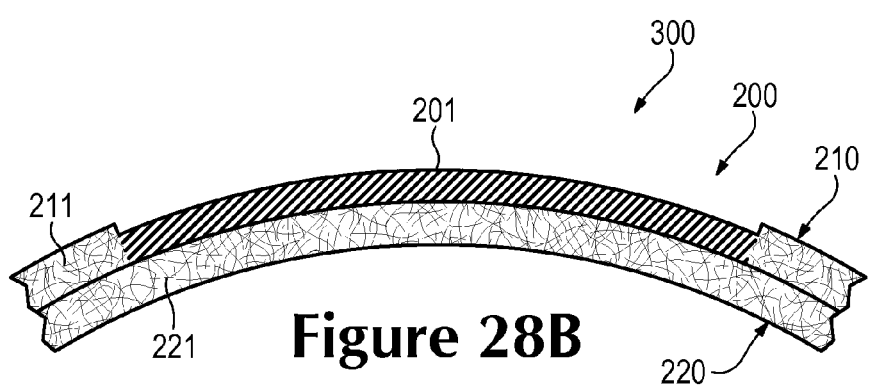
FIG. 28B is a cross-sectional view of the second configuration of the shirt, as defined by section line 28B in FIG. 28A.

A second configuration of shirt 300 is depicted in FIGS. 28A and 28B. As with the configuration of FIG. 27A, a majority of shirt 300 is formed from layered non-woven textile 200. In order to impart different properties to specific areas of shirt 300, various fused regions 201 are formed in layered non-woven textile 200. More particularly, fused regions 201 are formed around neck opening 303, waist opening 304, and each of arm openings 305. Given that each of openings 303-305 may be stretched as shirt 300 is put on an individual and taken off the individual, fused regions 201 are located around openings 303-305 in order to impart greater stretch-resistance to these areas. Fused regions 201 are also located in shoulder and elbow areas to impart wear-resistance or other beneficial properties.

Referring to the cross-section of FIG. 28B, layered non-woven textile 200 is oriented such that first layer 210 forms an exterior surface of shirt 300, whereas second layer 220 forms an interior surface of shirt 300. In this configuration, fused regions 201 are located on the exterior surface of shirt 300. Moreover, second layer 220 remains filamentous and is positioned to form the interior surface, which contacts the wearer. Given that filamentous areas of layered non-woven textile 200 may be more comfortable than fused regions 201 when in contact with the wearer, placing second layer 220 in contact with the wearer ensures that only filamentous areas contact the wearer. Moreover, filamentous areas that are positioned in contact with the wearer may be more likely to absorb perspiration or wick perspiration away from the wearer. Accordingly, the manner in which layered non-woven textile 200 is oriented may impart various advantages to shirt 300.

Although the size of fused regions 201 in shirt 300 may vary significantly, some of fused regions 201 generally have a continuous area of at least one square centimeter. As noted above, various embossing or calendaring processes may be utilized during the manufacturing process for layered non-woven textile 200. Some embossing or calendaring processes may form a plurality of relatively small areas (i.e., one to ten square millimeters) where filaments 211 and 221 are somewhat fused to each other. In contrast with the areas formed by embossing or calendaring, some of fused regions 201 have a continuous area of at least one square centimeter. As examples, and with reference to FIG. 28A, the fused region 201 around neck opening 303 individually forms a continuous area, each of the fused regions 201 in the elbow areas of shirt 300 individually form a continuous area, and each of the fused regions 201 in the shoulder areas of shirt 300 individually form a continuous area. Each of the individual fused regions 201 (i.e., around openings 303-305 and in the shoulder and elbow areas) form a single continuous area, and each have an area greater than one square centimeter.

A third configuration of shirt 300 is depicted in FIGS. 29A-29D. In addition to including various fused regions 201, shirt 300 also incorporates various strands 230 and components 240. More particularly, this configuration includes fused regions 201 in the areas of openings 303-305, strands 230 extending through a portion of torso region 301 and along arm regions 302, and components 240 secured to shoulder and side areas of torso region 301. Whereas strands 230 in torso region 301 are not associated with one of fused regions 201, fused regions 201 are formed in areas of arm regions 302 where strands 230 are embedded.

Strands 230 may be utilized to reduce the stretch in apparel 300, for example. Although strands 230 may reduce stretch in torso region 301, associating strands 320 with fused regions 201 in arm regions 302 may enhance the stretch-resistance, durability, and wear-resistance in the area of strands 230. Components 240 may be polymer foam members, for example, that attenuate impact forces upon the sides and shoulders of the individual wearing shirt 300. As an alternative, components 240 may be plates that also impart protection to the wearer. In each of these areas, heatbonds may be utilized to join strands 230 and components 240 to shirt 300. Moreover, the heatbonds may form fused regions 201 in the areas where components 240 are joined.

Figure 29B:
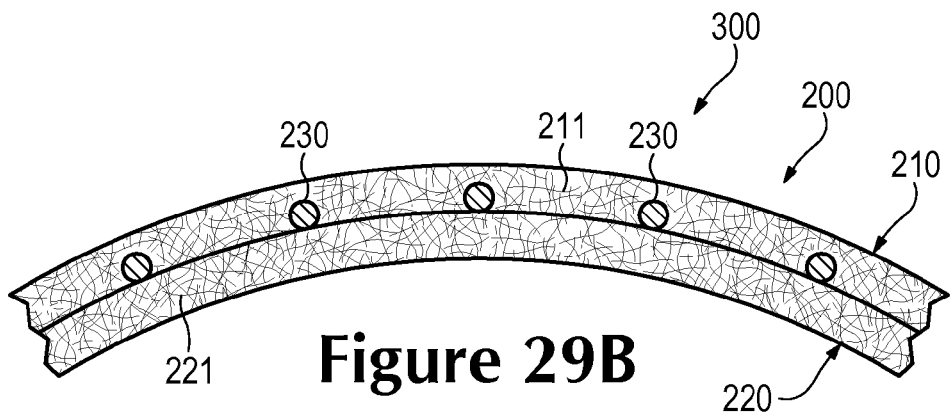
FIGS. 29B-29D are cross-sectional views of the third configuration of the shirt, as respectively defined by section lines 29B-29D in FIG. 29A.
Figure 29C:
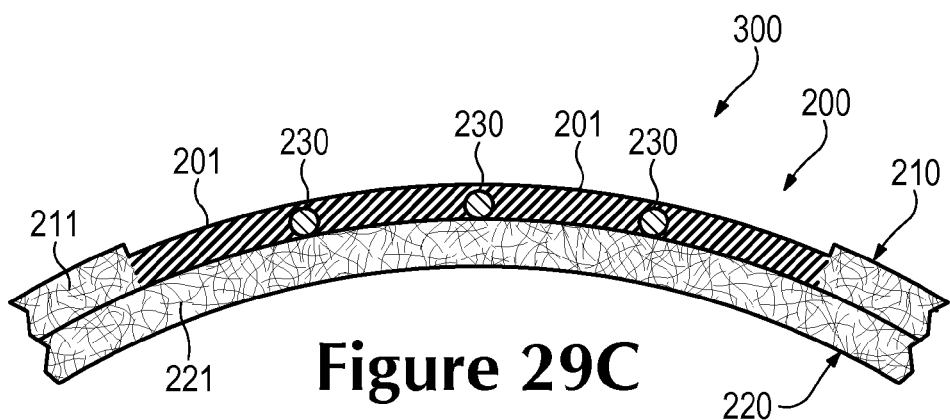
Figure 29D:
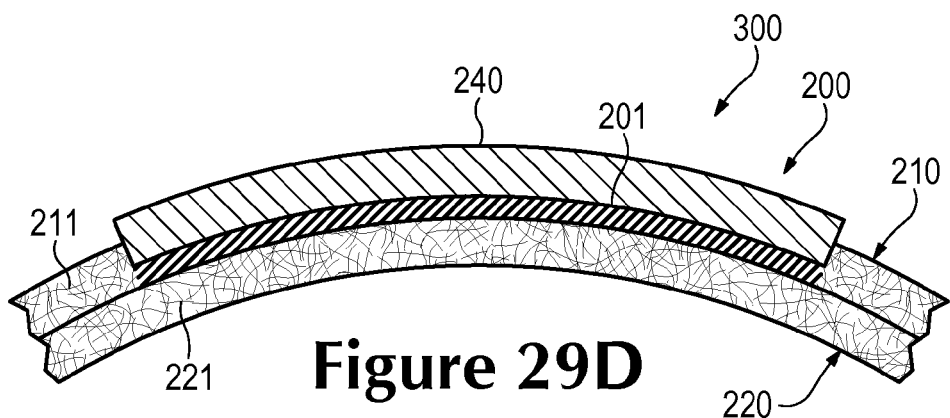

In each of the cross-sections depicted in FIGS. 29B-29D, first layer 210 forms an exterior surface of shirt 300, whereas second layer 220 forms an interior surface of shirt 300. In this configuration, fused regions 201 and components 240 are located on the exterior surface of shirt 300. Moreover, second layer 220 remains filamentous and is positioned to form the interior surface, which contacts the wearer. Given that filamentous areas of layered non-woven textile 200 may be more comfortable than fused regions 201 when in contact with the wearer, placing second layer 220 in contact with the wearer ensures that only filamentous areas contact the wearer. Moreover, filamentous areas that are positioned in contact with the wearer may be more likely to absorb perspiration or wick perspiration away from the wearer. Accordingly, the manner in which layered non-woven textile 200 is oriented may impart various advantages to shirt 300.

Based upon the above discussion, layered non-woven textile 200 may be utilized in an article of apparel, such as shirt 300. In some configurations, shirt 300 may be primarily formed from layered non-woven textile 200, or elements such as strands 230 and components 240 may be added. Moreover, fused regions 201 may be incorporated into shirt 300 to enhance the properties of specific areas. By forming fused regions 201 in layered non-woven textile 200 and combining layered non-woven textile 200 with other components to form composite elements, various properties and combinations of properties may be imparted to different areas of shirt 300. That is, the various concepts disclosed herein may be utilized individually or in combination to engineer the properties of shirt 300 and tailor shirt 300 to a specific purpose. Given that layered non-woven textile 200 incorporates layers 210 and 220 with thermoplastic polymer materials having different melting temperatures, areas that contact the wearer may remain substantially filamentous.

Various configurations of footwear 400 are depicted in FIGS. 30A, 31A, 32A, 33A, and 34A as including a sole structure 410 and an upper 420. Sole structure 410 is secured to upper 420 and extends between the foot of a wearer and the ground when footwear 400 is worn. In addition to providing traction, sole structure 410 may attenuate ground reaction forces when compressed between the foot and the ground during walking, running, or other ambulatory activities. As depicted, sole structure 410 includes a midsole 411 and an outsole 412. Midsole 411 is primarily formed from a polymer foam material, but may incorporate fluid-filled bladders, plates, moderators, or other elements that assist with attenuating ground reaction forces or influencing motions of the foot. Outsole 412 is formed from a rubber material that is textured to enhance traction. This configuration of sole structure 410 may vary significantly to include a variety of other conventional or nonconventional structures.

Upper 420 defines a void within footwear 400 for receiving and securing the foot relative to sole structure 410. More particularly, upper 420 is structured to extend along a lateral side of the foot, along a medial side of the foot, over the foot, and under the foot, such that the void within upper 420 is shaped to accommodate the foot. Access to the void is provided by an ankle opening 421 located in at least a heel region of footwear 400. A lace 422 extends through various lace apertures in upper 420 and permits the wearer to modify dimensions of upper 420 to accommodate the proportions of the foot. Lace 422 also permits the wearer to loosen upper 420 to facilitate entry and removal of the foot from the void. Upper 420 may include a tongue 423 that extends under lace 422 to enhance the comfort or adjustability of footwear 400.

Figure 30B:
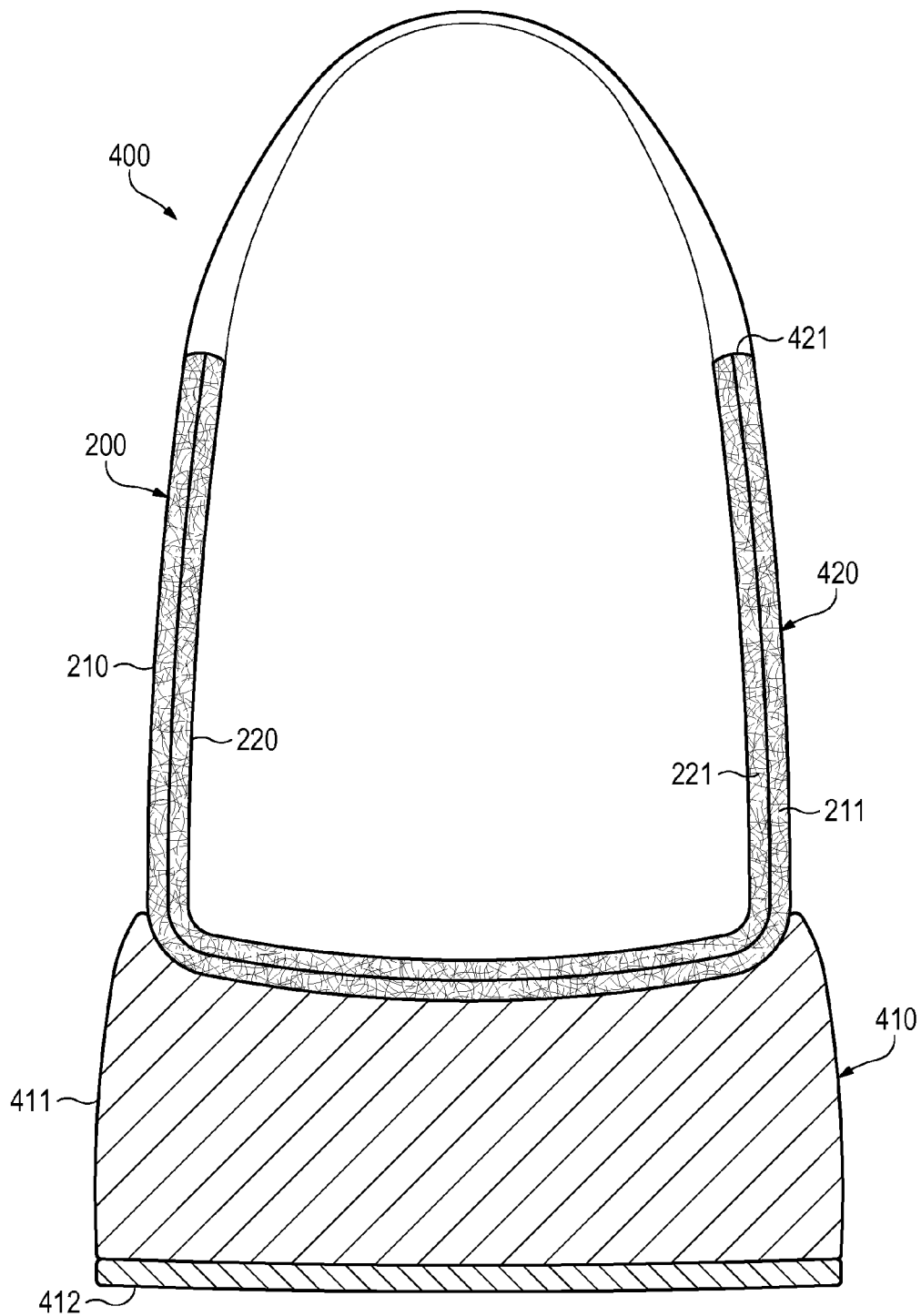
FIG. 30B is a cross-sectional view of the first configuration of the article of footwear, as defined by section line 30B in FIG. 30A.

A first configuration of footwear 400 is depicted in FIGS. 30A and 30B. Portions of upper 420 that extend along sides of the foot, over the foot, and under the foot may be formed from various elements of layered non-woven textile 200. Although not depicted, seams may be used to join the elements of layered non-woven textile 200. In many articles of footwear, stitching or adhesives are utilized to join the upper and sole structure. Sole structure 410, however, may be heatbonded to upper 420 utilizing the thermoplastic polymer materials in layered non-woven textile 200. An advantage of this configuration of footwear 400, therefore, is that a heatbonding process may be utilized to join sole structure 410 and upper 420. In some configurations, stitching or adhesives may be utilized to join sole structure 410 and upper 420, or the heatbond may be supplemented with stitching or adhesives.

Referring to the cross-section of FIG. 30B, layered non-woven textile 200 is oriented such that first layer 210 forms an exterior surface of upper 420, whereas second layer 220 forms an interior surface of upper 420 (i.e., the surface forming the void and in contact with the foot when worn). Additional layers of material, such as foam layers or textile layers, may be located inward of second layer 420 in some configurations. In other configurations where first layer 410 is located inward of second layer 420, first layer 410 may be heatbonded to the foam layers or textile layers. When first layer 410 is heatbonded to the foam layers or textile layers, second layer 420 may form the exterior surface of upper 420 and may remain in a filamentous configuration.

Figure 31B:
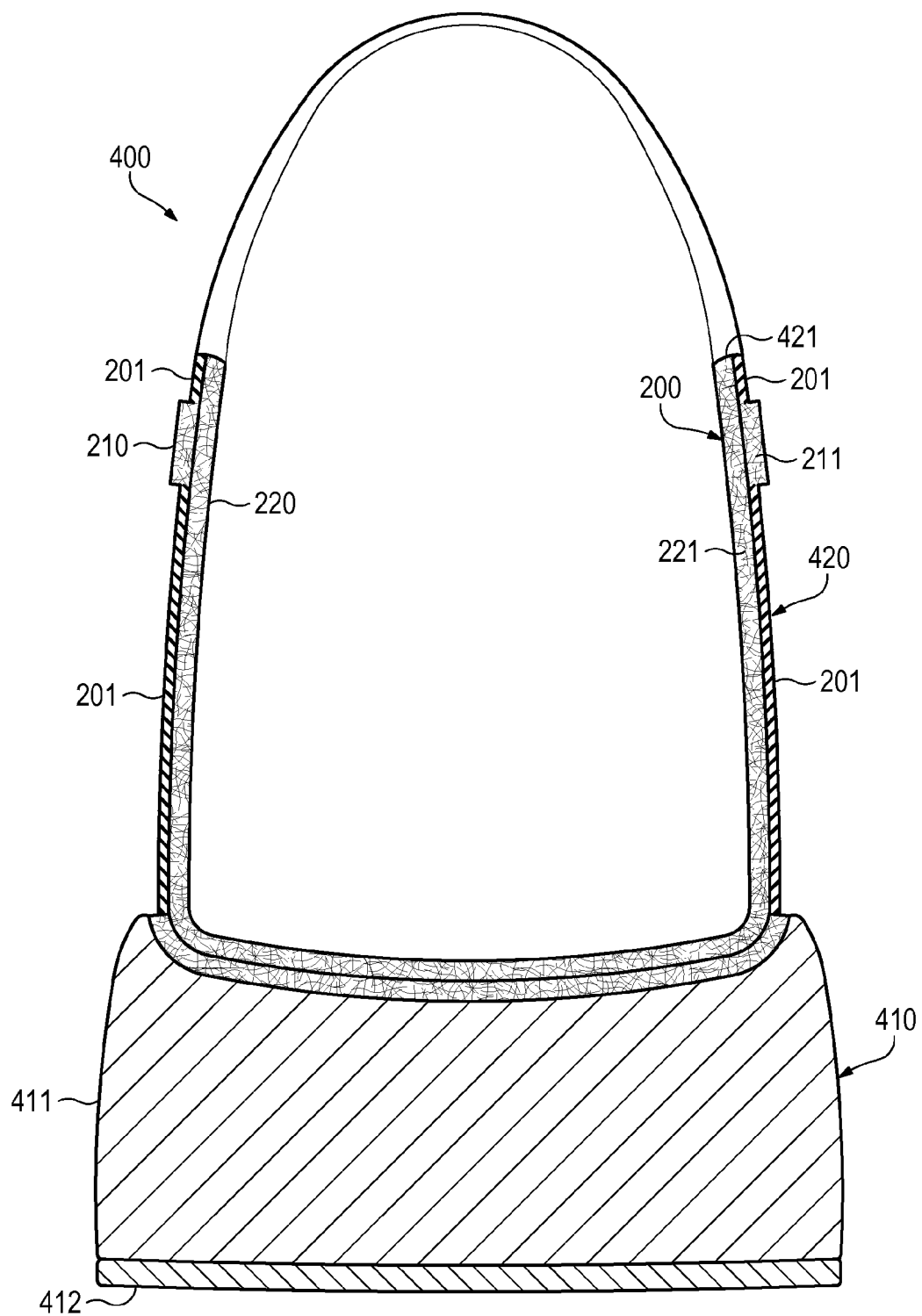
FIG. 31B is a cross-sectional view of the second configuration of the article of footwear, as defined by section line 31B in FIG. 31A.

A second configuration of footwear 400 is depicted in FIGS. 31A and 31B. Various fused regions 201 are formed in layered non-woven textile 200. One of fused regions 201 extends around and is proximal to ankle opening 421, which may add greater stretch-resistance to the area around ankle opening 421 and assists with securely-retaining the foot within upper 420. Another fused region 201 is located in the heel region and extends around a rear area of footwear 400 to form a heel counter that resists movement of the heel within upper 420. A further fused region 201 is located in the forefoot area and adjacent to sole structure 410, which adds greater durability to the forefoot area. More particularly, the forefoot area of upper 420 may experience greater abrasive-wear than other portions of upper 420, and the addition to fused region 201 in the forefoot area may enhance the abrasion-resistance of footwear 400 in the forefoot area. Additional fused regions 201 extend around some of the lace apertures, which may enhance the durability and stretch-resistance of areas that receive lace 422. Fused regions 201 also extend downward from an area that is proximal to lace 422 to an area that is proximal to sole structure 410 in order to enhance the stretch-resistance along the sides of footwear 400. More particularly, tension in lace 422 may place tension in the sides of upper 420. By forming fused regions 201 that extend downward along the sides of upper 420, the stretch in upper 420 may be reduced.

First layer 210 forms an exterior surface of upper 420, whereas second layer 220 forms an interior surface of upper 420 (i.e., the surface forming the void and in contact with the foot when worn). In this configuration, fused regions 201 are located on the exterior surface of footwear 400. Moreover, second layer 220 remains filamentous and is positioned to form the interior surface, which contacts the foot of the wearer. Given that filamentous areas of layered non-woven textile 200 may be more comfortable than fused regions 201 when in contact with the wearer, placing second layer 220 in contact with the wearer ensures that only filamentous areas contact the wearer. Moreover, filamentous areas that are positioned in contact with the wearer may be more likely to absorb perspiration or wick perspiration away from the wearer. Accordingly, the manner in which layered non-woven textile 200 is oriented may impart various advantages to footwear 400.

The size of fused regions 201 in footwear 400 may vary significantly, but fused regions 201 generally have a continuous area of at least one square centimeter. As noted above, various embossing or calendaring processes may be utilized during the manufacturing process for layered non-woven textile 200. Some embossing or calendaring processes may form a plurality of relatively small areas (i.e., one to ten square millimeters) where filaments 211 and 221 are somewhat fused to each other. In contrast with the areas formed by embossing or calendaring, fused regions 201 have a continuous area, as defined above, of at least one square centimeter.

A third configuration of footwear 400 is depicted in FIGS. 32A and 32B. Three fused regions 201 in the side of footwear 400 have the shapes of the letters "A," "B," and "C." As discussed above, fused regions 201 may be utilized to modify various properties of layered non-woven textile 200, including the properties of permeability, durability, and stretch-resistance. In general, various aesthetic properties may also be modified by forming fused regions 201. That is, fused regions 201 may be utilized to form a name or logo of a team or company, the name or initials of an individual, or an esthetic pattern, drawing, or element in layered non-woven textile 200. Similarly, fused regions 201 may be utilized to form indicia in shirt 300 or any other product incorporating layered non-woven textile 200. Moreover, second layer 220 remains filamentous to impart the advantages discussed above.

Figure 33A:
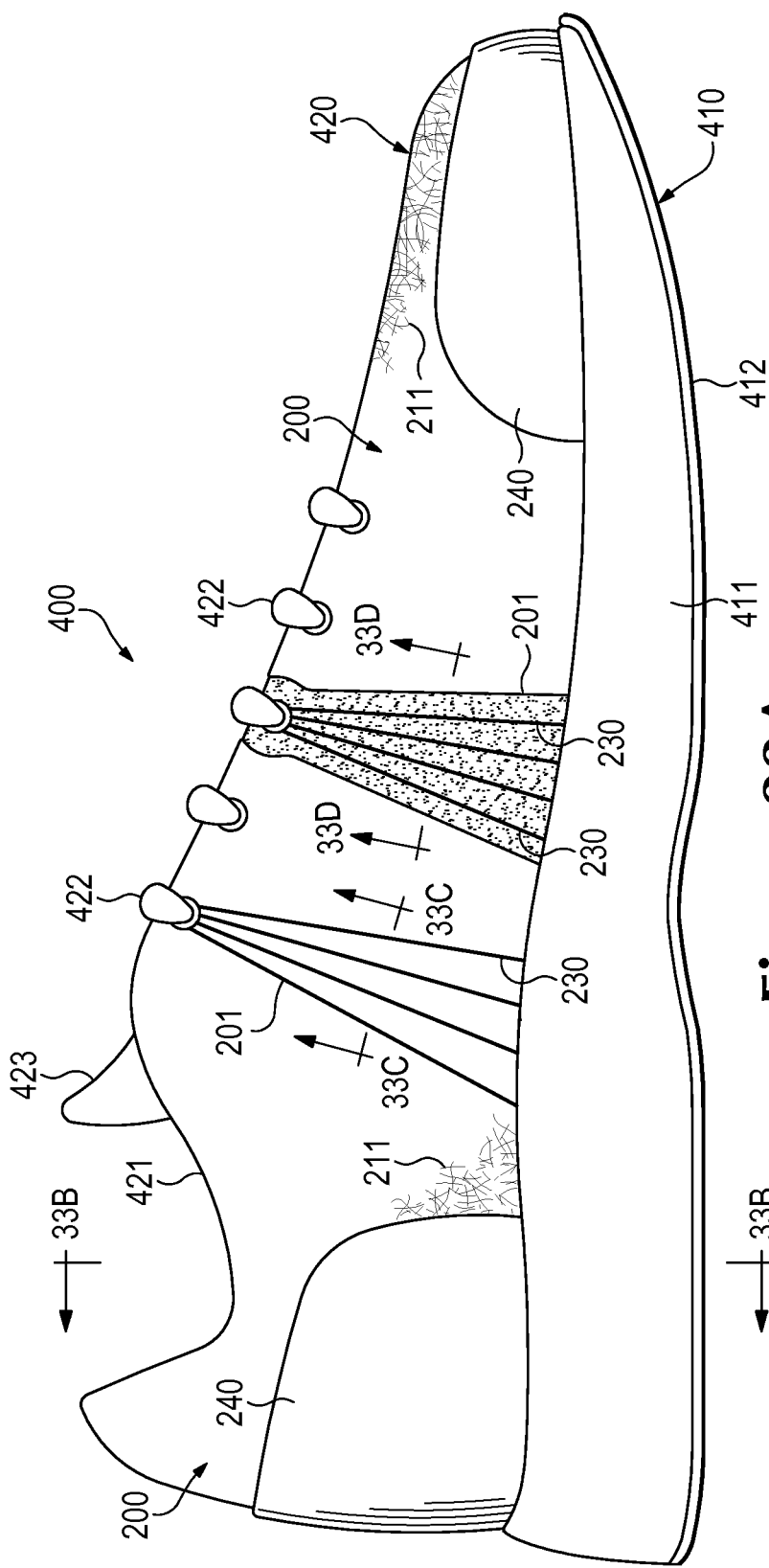
FIG. 33A is a side elevational view of a fourth configuration of the article of footwear.
Figure 33B:
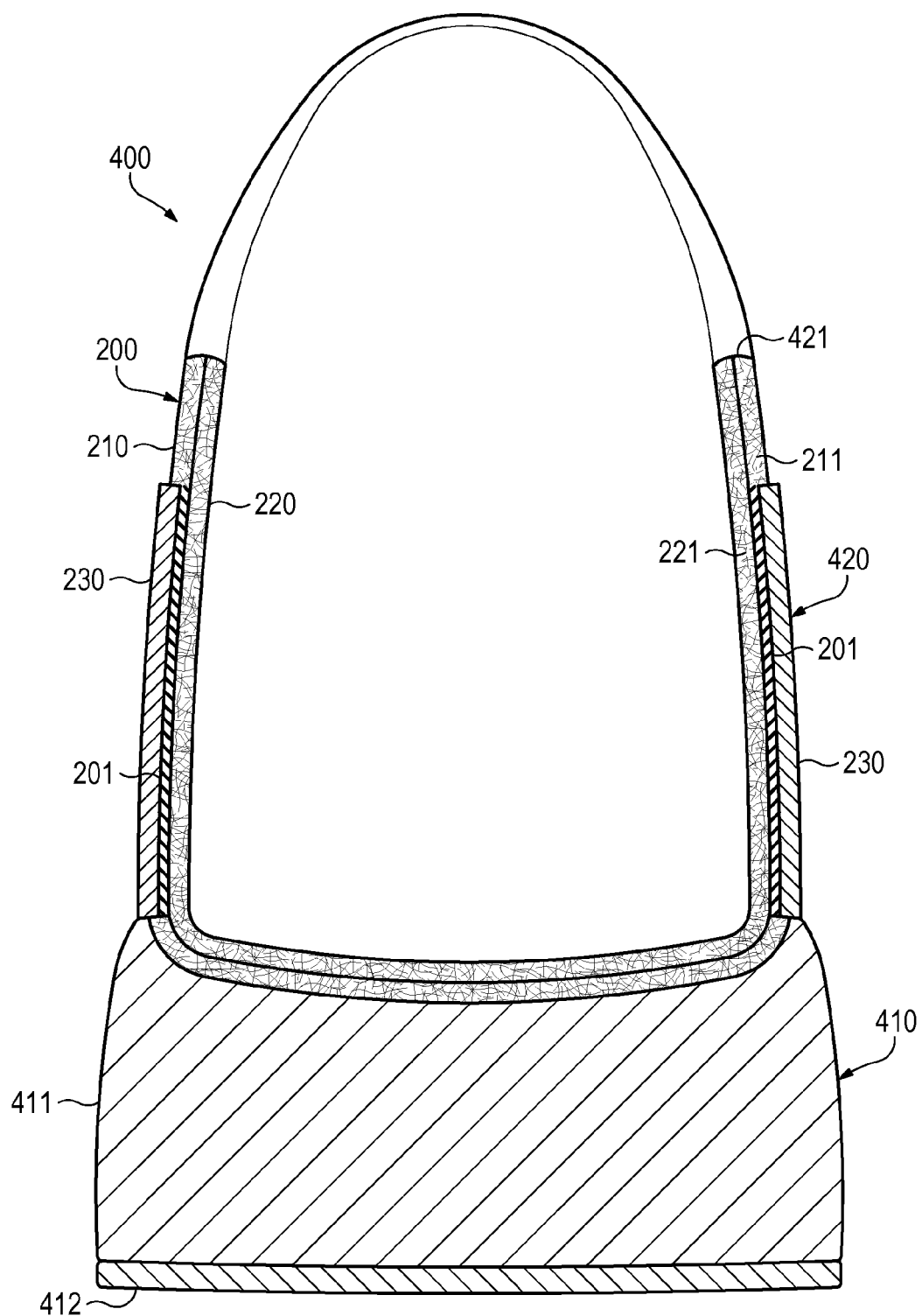
FIGS. 33B-33D are cross-sectional views of the fourth configuration of the article of footwear, as defined by section lines 33B-33D in FIG. 33A.
Figure 33C:
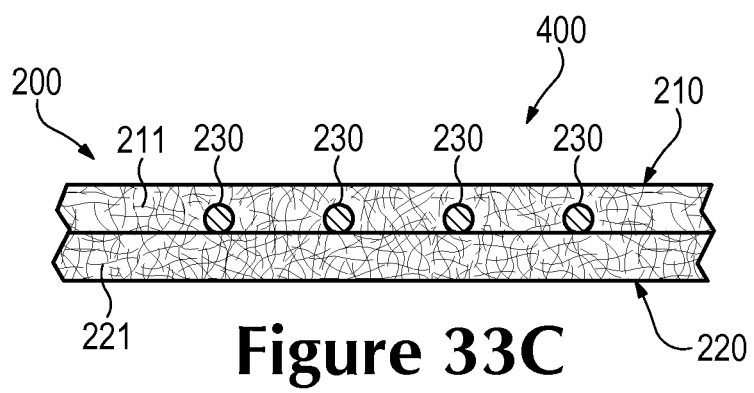
Figure 33D:
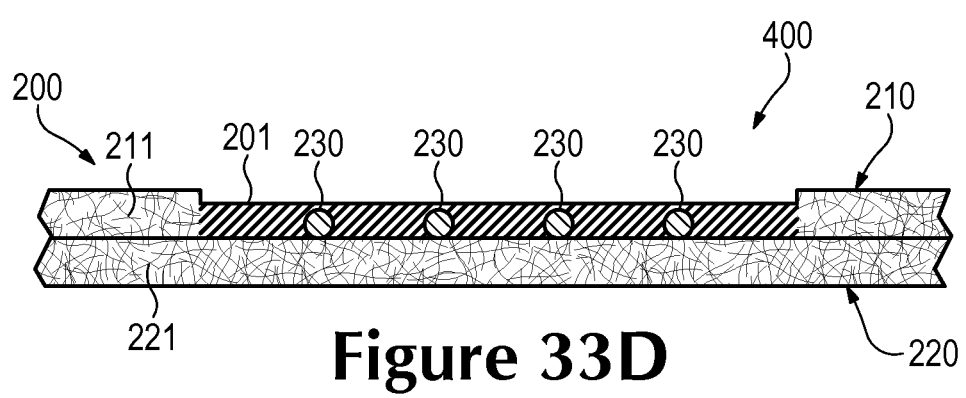

A fourth configuration of footwear 400 is depicted in FIGS. 33A-33D. In this configuration, upper 420 is formed as a composite element that includes both components 240 and strands 230. More particularly, one of components 240 is bonded to layered non-woven textile 200 in the heel region and extends around a rear area of footwear 400 to form a heel counter that resists movement of the heel within upper 420. A cross-section of this area is depicted in FIG. 33B. As a heel counter, component 240 may be a relatively rigid polymer member. A further fused region 201 is bonded to layered non-woven textile 200 in the forefoot area and adjacent to sole structure 410, which provides a toe cap that adds greater durability to the forefoot area. More particularly, the forefoot area of upper 420 may experience greater abrasive-wear than other portions of upper 420, and the addition of component 240 in the forefoot area may enhance the abrasion-resistance of footwear 400 in the forefoot area. As a toe cap, component 240 may be formed as a durable and wear-resistant rubber member. Additionally, strands 230 extend downward from an area that is proximal to lace 422 to an area that is proximal to sole structure 410, which may enhance the stretch-resistance along the sides of footwear 400. More particularly, tension in lace 422 may place tension in the strands 230. By placing strands 230 to extend downward along the sides of upper 420, the stretch in upper 420 may be reduced. Although strands 230 may be embedded within filamentous areas of non-woven textile 200, as depicted in FIG. 33C, strands 230 may also be embedded within a fused region 201, as depicted in FIG. 33D.

A fifth configuration of footwear 400 is depicted in FIGS. 34A and 34B. Three components 240 are bonded to the side of footwear 400 have the shapes of the letters "A," "B," and "C." Although components 240 may be used for structural purposes (e.g., heel counter, toe cap), components 240 may also be utilized to form a name or logo of a team or company, the name or initials of an individual, or an esthetic pattern, drawing, or element in layered non-woven textile 200. Similarly, components 240 may be utilized to form indicia in shirt 300 or any other product incorporating layered non-woven textile 200. Moreover, second layer 220 remains filamentous to impart the advantages discussed above.

Based upon the above discussion, layered non-woven textile 200 may be utilized in apparel having the configuration of a shirt (e.g., shirt 300) and an article of footwear (e.g., footwear 400). In order to impart different properties to areas of the apparel, fused regions 201 may be formed in layered non-woven textile 200, strands 230 may be incorporated into layered non-woven textile 200, or components 240 may be bonded to layered non-woven textile 200. As further variations, fused regions 201 may be formed around strands 240 or components 240 may be selected to be textiles, sheets, foam layers, or plates, for example. Moreover, given the layered aspect of layered non-woven textile 200, first layer 210 may be utilized to form the fused regions 201 or bond with strands 230 or components 240, whereas second layer 220 may remain filamentous.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A non-woven textile comprising:
   a first layer formed from a plurality of first filaments that include a first thermoplastic polymer material with a first melting temperature;
   the first layer including a fused region having a continuous area of at least one square centimeter, wherein the first filaments are fused within the fused region to form a non-filamentous portion of the first layer in the fused region; and
   a second layer located adjacent to the first layer and secured to the first layer, the second layer being formed from plurality of second filaments that include a second thermoplastic polymer material with a second melting temperature, the first melting temperature being lower than the second melting temperature.

2. The non-woven textile recited in claim 1, wherein the first thermoplastic polymer material and the second thermoplastic polymer material are thermoplastic polyurethane materials.

3. The non-woven textile recited in claim 1, wherein the fused region is adjacent a first region and a second region, wherein the first region has a first thickness, the second region has a second thickness, and the fused region has a third thickness, wherein the first thickness and the second thickness are substantially the same, and wherein the third thickness is less than the first thickness.

4. The non-woven textile recited in claim 1, wherein the second layer includes a filamentous region adjacent to the fused region of the first layer.

5. The non-woven textile recited in claim 1, wherein a component is secured to the fused region.

6. The non-woven textile recited in claim 1, wherein a plurality of strands are embedded within the non-woven textile, the strands extending in a direction that is substantially parallel to a surface of the second layer for a distance of at least five centimeters, and wherein the strands are at least partially embedded in the fused region.

7. The non-woven textile recited in claim 6, wherein the strands are located between the first layer and the second layer.

8. The non-woven textile recited in claim 1, wherein the non-woven textile is incorporated into an article of apparel.

9. The non-woven textile recited in claim 1, wherein the non-woven textile is incorporated into an article of footwear.

10. An article of apparel comprising:
    a non-woven textile including (a) a first layer formed from a plurality of first filaments that include a first thermoplastic polymer material with a first melting temperature, wherein the first layer has a first area and (b) a second layer located adjacent to the first layer, the second layer formed from plurality of second filaments that include a second thermoplastic polymer material with a second melting temperature, the first melting temperature being lower than the second melting temperature, wherein the first layer includes at least one fused region having a continuous area of at least one square centimeter, the first filaments being fused to form a non-filamentous portion of the non-woven textile in the fused region; and
    a component attached to the first layer, wherein the component has a component area, the component is aligned with the fused region, and wherein the component area is less than the first area.

11. The article of apparel recited in claim 10, wherein the first layer forms a portion of an exterior surface of the apparel, and the second layer forms a portion of an interior surface of the apparel.

12. The article of apparel recited in claim 10, wherein the second layer includes a filamentous region adjacent to the fused region of the first layer.

13. The article of apparel recited in claim 10, wherein the component is heatbonded to the first layer at the fused region.

14. An article of footwear comprising:
    an upper and a sole structure, the upper comprising a non-woven textile having (a) a first layer formed from a plurality of first filaments that include a first thermoplastic polymer material with a first melting temperature and (b) a second layer located adjacent to the first layer, the second layer formed from plurality of second filaments that include a second thermoplastic polymer material with a second melting temperature, the first melting temperature being lower than the second melting temperature, the first layer being positioned to form at least a portion of an exterior surface of the footwear, and the second layer being positioned inward of the first layer; and
    wherein the first layer includes a fused region having a continuous area of at least one square centimeter, the first filaments being fused to form a fused region, wherein the fused region defines a non-filamentous portion of the non-woven textile and the remainder of the first layer includes a filamentous portion.

15. The article of footwear recited in claim 14, wherein the second layer includes a filamentous region adjacent to the fused region of the first layer.

16. The article of footwear recited in claim 14, wherein a component is heatbonded to the non-woven textile in the fused region.

17. The article of footwear recited in claim 16, wherein the component is selected from a group consisting of a toe cap, a heel counter, and indicia.

18. The article of footwear recited in claim 14, wherein a plurality of strands are embedded within the first layer.

19. The article of footwear recited in claim 18, wherein the strands extend from a lace region of the upper to a region that is adjacent to the sole structure.

20. The article of footwear recited in claim 18, wherein the strands are located at least partially within the fused region.

21. An article of apparel comprising:
    a non-woven textile including (a) a first layer formed from a plurality of first filaments that include a first thermoplastic polymer material with a first melting temperature and (b) a second layer located adjacent to the first layer, the second layer formed from plurality of second filaments that include a second thermoplastic polymer material with a second melting temperature, the first melting temperature being lower than the second melting temperature; and
    wherein the second layer includes at least one fused region comprising a partially filamentous portion and a partially non-filamentous portion of filaments.

22. The article of apparel recited in claim 21, wherein the first layer forms a portion of an interior surface of the apparel, and the second layer forms a portion of an exterior surface of the apparel.

23. The article of apparel recited in claim 21, further comprising a plurality of strands at least partially embedded in the first layer, the strands being formed from a material that is different than the first thermoplastic material and the second thermoplastic material.

24. The article of apparel recited in claim 21, wherein the apparel is footwear.

* * * * *